US008555010B2

(12) United States Patent
Yuhara et al.

(10) Patent No.: US 8,555,010 B2
(45) Date of Patent: Oct. 8, 2013

(54) COMPUTER SYSTEM AND DATA BACKUP METHOD COMBINING FLASHCOPY AND REMOTE COPY

(75) Inventors: Atsushi Yuhara, Yugawara (JP); Hiroshi Kuwabara, Fujisawa (JP); Junichi Hiwatashi, Ooi (JP)

(73) Assignee: Hitachi, Ltd., Tokyo (JP)

( * ) Notice: Subject to any disclaimer, the term of this patent is extended or adjusted under 35 U.S.C. 154(b) by 234 days.

(21) Appl. No.: 13/122,690

(22) PCT Filed: Mar. 24, 2011

(86) PCT No.: PCT/JP2011/001746
§ 371 (c)(1),
(2), (4) Date: Apr. 5, 2011

(87) PCT Pub. No.: WO2012/127537
PCT Pub. Date: Sep. 27, 2012

(65) Prior Publication Data
US 2012/0246424 A1    Sep. 27, 2012

(51) Int. Cl.
*G06F 12/00*    (2006.01)
(52) U.S. Cl.
USPC ........... 711/162; 711/150; 711/159; 711/161; 711/167
(58) Field of Classification Search
None
See application file for complete search history.

(56) References Cited

U.S. PATENT DOCUMENTS

| 7,512,835 B2 * | 3/2009 | Bartfai et al. ............... 714/6.23 |
| 2003/0158869 A1 * | 8/2003 | Micka .......................... 707/203 |
| 2005/0193179 A1 * | 9/2005 | Cochran et al. ............. 711/162 |
| 2005/0216681 A1 * | 9/2005 | Micka et al. ................. 711/162 |
| 2007/0028064 A1 * | 2/2007 | McBrearty et al. .......... 711/162 |
| 2009/0043979 A1 * | 2/2009 | Jarvis ............................ 711/162 |
| 2009/0187613 A1 * | 7/2009 | Spear et al. .................. 707/204 |
| 2010/0235591 A1 * | 9/2010 | Akutsu et al. ................ 711/154 |

FOREIGN PATENT DOCUMENTS

JP    2008-040762    2/2008

* cited by examiner

*Primary Examiner* — Reginald Bragdon
*Assistant Examiner* — Brendan Lillis
(74) *Attorney, Agent, or Firm* — Foley & Lardner LLP

(57) ABSTRACT

One embodiment provides a computer system and data backup method which enable improvements in the response performance of a storage apparatus to a write request from a host apparatus. In a case where, during execution of same intra-enclosure copy processing, a primary storage apparatus receives a write request in which the data write destination is a storage area in a target range for the same intra-enclosure copy processing in a first primary volume in the primary storage apparatus, the primary storage apparatus transmits an advance notification storing an address of a storage area in a secondary storage apparatus which corresponds to the data write destination storage area designated in the write request to the secondary storage apparatus such that an on-demand copy is executed based on the advance notification in the secondary storage apparatus.

10 Claims, 38 Drawing Sheets

FIG.7

| WRITE VOL | WRITE TRACK |
|---|---|
| 0 | 5 |

40A    40B    40

(A)

| Vol# | VOL TYPE | PAIR # |
|---|---|---|
| #0 | Pvol | 1 |
| #1 | not | — |
| #2 | Svol | 1 |
| ⋮ | ⋮ | ⋮ |

41A  41B  41C  41

(B)

| PAIR # | Pvol | Svol | DIFFERENTIAL BITMAP # |
|---|---|---|---|
| 1 | 0 | 2 | 1 |
| 2 | 5 | 8 | 2 |
| 3 | 6 | 4 | 3 |
| ⋮ | ⋮ | ⋮ | ⋮ |

42A  42B  42C  42D  42

(C)

⋮

(A)

| Vol# | VOL TYPE | PAIR # |
|------|----------|--------|
| #0   | Pvol     | 1      |
| #1   | not      | —      |
| #2   | Svol     | 1      |
| ⋮    | ⋮        | ⋮      |

53A  53B  53C  53

(B)

| PAIR # | Pvol | Svol | PRIMARY DIFFERENTIAL BITMAP # | SECONDARY DIFFERENTIAL BITMAP # |
|--------|------|------|-------------------------------|---------------------------------|
| 1      | 0    | 2    | 1                             | 2                               |
| 2      | 5    | 8    | 2                             | 4                               |
| 3      | 6    | 4    | 3                             | 6                               |
| ⋮      | ⋮    | ⋮    | ⋮                             | ⋮                               |

54A  54B  54C  54D  54E  54

(C)

(A)

| Vol# | VOL TYPE | PAIR # |
|---|---|---|
| #0 | Pvol | 1 |
| #1 | not | — |
| #2 | Svol | 1 |
| : | : | : |

56A 56B 56C — 56

(B)

| PAIR # | Pvol | Svol | DIFFERENTIAL BITMAP # |
|---|---|---|---|
| 1 | 0 | 2 | 1 |
| 2 | 5 | 8 | 2 |
| 3 | 6 | 4 | 3 |
| : | : | : | : |

| WRITE VOL | WRITE TRACK | SEQUENTIAL INFORMATION |
|---|---|---|
| 0 | 5 | 1 |

| Vol# | WRITE TRACK | FINAL VALUE |
|---|---|---|
| #0 | 0 | 4 |
| #0 | 5 | 9 |
| ⋮ | ⋮ | ⋮ |

71A    71B    71C    71

(B)

| Vol# | VOL TYPE | PAIR # |
|---|---|---|
| #0 | Pvol | 1 |
| #1 | not | — |
| #2 | Svol | 1 |
| ⋮ | ⋮ | ⋮ |

72

(C)

| PAIR # | Pvol | Svol | DIFFERENTIAL BITMAP # | SECONDARY DIFFERENTIAL BITMAP # |
|---|---|---|---|---|
| 1 | 0 | 2 | 1 | 2 |
| 2 | 5 | 8 | 2 | 4 |
| 3 | 6 | 4 | 3 | 6 |
| ⋮ | ⋮ | ⋮ | ⋮ | ⋮ |

73

(D)

| DIFFERENTIAL BITMAP #1 | 1 | 1 | 1 | 1 | 1 | 0 | 1 | ... | 74 |

| DIFFERENTIAL BITMAP #2 | 1 | 1 | 1 | 1 | 0 | 0 | 1 | ... | 74 |

| Vol# | VOL TYPE | PAIR # |
|---|---|---|
| #0 | Pvol | 1 |
| #1 | not | — |
| #2 | Svol | 1 |
| : | : | : |

75

(B)

| PAIR # | Pvol | Svol | DIFFERENTIAL BITMAP # |
|---|---|---|---|
| 1 | 0 | 2 | 1 |
| 2 | 5 | 8 | 2 |
| 3 | 6 | 4 | 3 |
| : | : | : | : |

76

(C)

| DIFFERENTIAL BITMAP #1 | 1 | 1 | 1 | 1 | 1 | 0 | 1 | ... | 77 |

| DIFFERENTIAL BITMAP #2 | 1 | 1 | 1 | 1 | 0 | 0 | 1 | ... | 77 |

| Vol# | VOL TYPE | PAIR # |
|------|----------|--------|
| #0   | Pvol     | 1      |
| #1   | not      | —      |
| #2   | Svol     | 1      |
| :    | :        | :      |

90

(B)

| PAIR # | Pvol | Svol | PRIMARY DIFFE-RENTIAL BM# | FIRST SECONDARY DIFFERENTIAL BM# | · · | NTH SECONDARY DIFFERENTIAL BM# |
|--------|------|------|---------------------------|----------------------------------|-----|--------------------------------|
| 1      | 0    | 2    | 1                         | 100                              | · · | 200                            |
| 2      | 5    | 8    | 2                         | 101                              | · · | 201                            |
| 3      | 6    | 4    | 3                         | 102                              | · · | 202                            |
| :      | :    | :    | :                         | :                                | · · | :                              |

91A  91B  91C  91D  91E  91E

91

(C)

(A)

| Vol# | VOL TYPE | PAIR # |
|------|----------|--------|
| #0   | Pvol     | 1      |
| #1   | not      | —      |
| #2   | Svol     | 1      |
| :    | :        | :      |

93

(B)

| PAIR # | Pvol | Svol | MTH SECONDARY DIFFERENTIAL BM# | (M+1)TH SECONDARY DIFFERENTIAL BM# | · · | NTH SECONDARY DIFFERENTIAL BM# |
|--------|------|------|-------|-------|-----|-------|
| 1 | 0 | 2 | 1 | 100 | ·· | 200 |
| 2 | 5 | 8 | 2 | 101 | ·· | 201 |
| 3 | 6 | 4 | 3 | 102 | ·· | 202 |
| : | : | : | : | : | ·· | : |

94A 94B 94C  94D  94E  94E  94

(C)

(A)

| Vol# | VOL TYPE | PAIR # |
|---|---|---|
| #0 | Pvol | 1 |
| #1 | not | — |
| #2 | Svol | 1 |
| : | : | : |

96

(B)

| PAIR # | Pvol | Svol | NTH SECONDARY DIFFERENTIAL BM# |
|---|---|---|---|
| 1 | 0 | 2 | 1 |
| 2 | 5 | 8 | 2 |
| 3 | 6 | 4 | 3 |
| : | : | : | : |

| Vol# | WRITE TRACK | FINAL VALUE |
|---|---|---|
| #0 | 0 | 4 |
| #0 | 5 | 9 |
| : | : | : |

110A  110B  110C  —110

(B)

| Vol# | VOL TYPE | PAIR # |
|---|---|---|
| #0 | Pvol | 1 |
| #1 | not | — |
| #2 | Svol | 1 |
| : | : | : |

—111

(C)

| PAIR # | Pvol | Svol | PRIMARY DIFFE-RENTIAL BM# | FIRST SECONDARY DIFFERENTIAL BM# | .. | NTH SECONDARY DIFFERENTIAL BM# |
|---|---|---|---|---|---|---|
| 1 | 0 | 2 | 1 | 100 | .. | 200 |
| 2 | 5 | 8 | 2 | 101 | .. | 201 |
| 3 | 6 | 4 | 3 | 102 | .. | 202 |
| : | : | : | : | : | .. | : |

—112

(D)

| DIFFERENTIAL BITMAP #1 | 1 | 1 | 1 | 1 | 1 | 0 | 1 | ... | —113 |

| DIFFERENTIAL BITMAP #2 | 1 | 1 | 1 | 1 | 0 | 0 | 1 | ... | —113 |

| DIFFERENTIAL BITMAP #3 | 1 | 1 | 1 | 1 | 1 | 0 | 0 | ... | —113 |

:

(A)

| Vol# | WRITE TRACK | FINAL VALUE |
|---|---|---|
| #0 | 0 | 4 |
| #0 | 5 | 9 |
| : | : | : |

114A — 114B — 114C — 114

(B)

| Vol# | VOL TYPE | PAIR # |
|---|---|---|
| #0 | Pvol | 1 |
| #1 | not | — |
| #2 | Svol | 1 |
| : | : | : |

115

(C)

| PAIR # | Pvol | Svol | MTH SECONDARY DIFFERENTIAL BM# | (M+1)TH SECONDARY DIFFERENTIAL BM# | .. | NTH SECONDARY DIFFERENTIAL BM# |
|---|---|---|---|---|---|---|
| 1 | 0 | 2 | 1 | 100 | .. | 200 |
| 2 | 5 | 8 | 2 | 101 | .. | 201 |
| 3 | 6 | 4 | 3 | 102 | .. | 202 |
| : | : | : | : | : | .. | : |

116

(D)

:

(A)

| Vol# | VOL TYPE | PAIR # |
|---|---|---|
| #0 | Pvol | 1 |
| #1 | not | — |
| #2 | Svol | 1 |
| : | : | : |

118A  118B  118C  118

(B)

| PAIR # | Pvol | Svol | NTH SECONDARY DIFFERENTIAL BM# |
|---|---|---|---|
| 1 | 0 | 2 | 1 |
| 2 | 5 | 8 | 2 |
| 3 | 6 | 4 | 3 |
| : | : | : | : |

119

(C)

COMPUTER SYSTEM AND DATA BACKUP METHOD COMBINING FLASHCOPY AND REMOTE COPY

TECHNICAL FIELD

The present invention relates to a storage controller and method thereof and, more particularly, is suitably applied to a computer system which is configured from a primary storage apparatus and a secondary storage apparatus in which a flashcopy (copy within same enclosure) function and a remote copy function are installed.

BACKGROUND ART

In recent years, large-capacity storage apparatuses have been used to manage large amounts data in enterprises and so on. Such storage apparatuses are configured by arranging a multiplicity of storage devices as an array, and the storage devices are each operated using a RAID (Redundant Array of Independent Inexpensive Disks) system, for example. At least one or more logic volumes (hereinafter referred to as 'logical volumes') are formed in a physical storage area provided by a storage device group, and these logical volumes are provided to a host apparatus. The host apparatus is able to write and read data to and from the logical volume by transmitting predetermined commands.

As functions which are installed in this storage apparatus, a remote copy function and a flashcopy function are conventionally widely known.

The remote copy function is a function for copying data stored in a storage apparatus in a local site to a storage apparatus in a remote site provided in a location separate from the local site (hereinafter suitably referred to as a 'remote copy'). As a result of this remote copy function, data backups in the remote site are possible and data loss can be prevented even if a fault is generated in the local-site storage apparatus due to an earthquake or fire or the like.

Furthermore, the flashcopy function is a function for copying data stored in a storage area designated by a host apparatus in a logical volume provided in the storage apparatus to another logical volume in the same storage apparatus (hereinafter suitably referred to as a flashcopy). As a result of this flashcopy function, a static data image (hereinafter called a 'snapshot') of a storage area in a flashcopy target at the point when flashcopy execution is started can be saved in the other logical volume.

CITATION LIST

Patent Literature
PTL 1: Japanese Unexamined Patent Application Publication No. 2008-040762

SUMMARY OF INVENTION

Technical Problem

Furthermore, conventionally, as a data backup method of a computer system, a data backup method which combines the foregoing flashcopy function and remote copy function has been proposed (PTL1, for example).

In actuality, one data backup technique of this type which has conventionally been proposed is to remote-copy data, written to a first logical volume provided to a host apparatus in a first storage apparatus installed in a local site, to a second logical volume in a second storage apparatus installed in a remote site, while, in both the first and second storage apparatuses, flashcopying data, which is stored in a storage area designated by the host apparatus in the first or second logical volume, to a third or fourth logical volume provided in the first and second storage apparatuses.

With this kind of data backup method, data stored in the first logical volume of the first storage apparatus can be backed up to the second logical volume in the second storage apparatus and data which is saved in the third logical volume of the first storage apparatus can be backed up to the fourth logical volume in the second storage apparatus.

Furthermore, with this data backup method, as will be described subsequently, if, while the first and second storage apparatuses are executing a flashcopy, a write request in which the data write destination is a storage area in a flashcopy target range is supplied to the first storage apparatus from the host apparatus, an appropriate time interval (response time) is required until a notification regarding write processing completion in response to the write request is transmitted to the host apparatus from the first storage apparatus after the write request is issued to the first storage apparatus by the host apparatus, and there is a problem in that the response performance of the first storage apparatus to the write request from the host apparatus is reduced.

The present invention was devised in view of the aforementioned problems, and seeks to propose a computer system and a data backup method which enable improvements in the response performance of a storage apparatus to a write request from a host apparatus.

Solution to Problem

In order to achieve the foregoing object, the present invention provides a computer system comprising a primary storage apparatus in which a first primary volume to and from which a host apparatus reads and writes data and a first secondary volume configured as a copy pair to the first primary volume are provided and in which, according to a copy instruction from the host apparatus, first intra-enclosure copy processing is executed to copy, among the data stored in the first primary volume, data which is designated in the copy instruction to the first secondary volume; and a secondary storage apparatus in which a second primary volume configured as a remote-copy copy pair to the first primary volume and a second secondary volume which is configured as a copy pair to the second primary volume are provided and in which, according to an instruction from the primary storage apparatus, second same intra-enclosure copy processing is executed to copy, among the data stored in the second primary volume, data which has been copied to the first secondary volume from the first primary volume, to the second secondary volume, wherein the primary storage apparatus, upon receiving, after an instruction to execute the first same intra-enclosure copy processing is supplied, a write request from the host apparatus in which the data write destination is a storage area in a target range of the first same intra-enclosure copy processing in the first primary volume, transmits an advance notification, which stores an address of a storage area in the secondary storage apparatus corresponding to the data write destination storage area which is designated in the write request, to the secondary storage apparatus and, after transmitting the advance notification to the secondary storage apparatus, writes write target data to the storage area in the first primary volume designated in the write request, and transfers the write request and write target data, in which an address of the data write destination storage area designated in the write request is configured with a corresponding storage area address in the secondary storage apparatus, to the secondary storage apparatus and, wherein the secondary storage apparatus, if the advance notification from the primary storage apparatus is received, when data stored in the storage area at the address designated in the advance notification in the second primary volume has not been copied to the second secondary volume, copies the data to the second secondary volume and, upon receiving the write request from the primary storage apparatus, writes write target data to the storage area at the address designated in the write request in the second primary volume.

Furthermore, the present invention provides a data backup method of a computer system which comprises a primary storage apparatus and a secondary storage apparatus, wherein the primary storage apparatus comprises a first primary volume to and from which a host apparatus reads and writes data and a first secondary volume configured as a copy pair to the first primary volume and, according to a copy instruction from the host apparatus, executes first intra-enclosure copy processing to copy, among the data stored in the first primary volume, data which is designated in the copy instruction to the first secondary volume and wherein the secondary storage apparatus comprises a second primary volume configured as a remote-copy copy pair to the first primary volume and a second secondary volume which is configured as a copy pair to the second primary volume and, according to an instruction from the primary storage apparatus, executes second same intra-enclosure copy processing to copy, among the data stored in the second primary volume, data which has been copied to the first secondary volume from the first primary volume, to the second secondary volume, the data backup method comprising a first step in which the primary storage apparatus, upon receiving, after an instruction to execute the first same intra-enclosure copy processing is supplied, a write request from the host apparatus in which the data write destination is a storage area in a target range of the first same intra-enclosure copy processing in the first primary volume, transmits an advance notification, which stores an address of a storage area in the secondary storage apparatus corresponding to the data write destination storage area which is designated in the write request, to the secondary storage apparatus; a second step in which the primary storage apparatus, after transmitting the advance notification to the secondary storage apparatus, writes write target data to the storage area in the first primary volume designated in the write request, and transfers the write request and write target data, in which an address of the data write destination storage area designated in the write request is configured with a corresponding storage area address in the secondary storage apparatus, to the secondary storage apparatus; a third step in which the secondary storage apparatus, if the advance notification from the primary storage apparatus is received, when data stored in the storage area at the address designated in the advance notification in the second primary volume has not been copied to the second secondary volume, copies the data to the second secondary volume; and a fourth step in which the secondary storage apparatus, upon receiving the write request from the primary storage apparatus, writes write target data to the storage area at the address designated in the write request in the second primary volume.

Advantageous Effects of Invention

The present invention enables improvements in the response performance of a storage apparatus to a write request from a host apparatus.

BRIEF DESCRIPTION OF DRAWINGS

FIG. 7 is a conceptual diagram serving to illustrate an on-demand copy advance notification according to the first, second, and fourth embodiments.

FIG. 17 is a conceptual view serving to illustrate an on-demand copy advance notification according to the third and fifth embodiments.

FIG. 18A is a conceptual view of the configuration of a sequential instruction table held by the primary storage apparatus according to the third embodiment, FIG. 18B is a conceptual view of the configuration of a volume information table held by the primary storage apparatus, and FIG. 18C is a conceptual view of the configuration of a pair information table held by the primary storage apparatus, and FIG. 18D is a conceptual view of the configuration of a differential bitmap held by the primary storage apparatus.

FIG. 19A is a conceptual view of the configuration of a volume information table held by the secondary storage apparatus according to the third embodiment, FIG. 19B is a conceptual view of the configuration of the pair information table held by the secondary storage apparatus, and FIG. 19C is a conceptual view of the configuration of the differential bitmap held by the secondary storage apparatus.

FIG. 33A is a conceptual view of the configuration of a sequential instruction table held by the primary storage apparatus according to the fifth embodiment, FIG. 33B is a conceptual view of the configuration of a volume information table held by the primary storage apparatus, FIG. 33C is a conceptual view of the configuration of a pair information table held by the primary storage apparatus, and FIG. 33D is a conceptual view of the configuration of a differential bitmap held by the primary storage apparatus.

DESCRIPTION OF EMBODIMENTS

An embodiment of the present invention is explained in detail hereinbelow with reference to the drawings.

Figure 1:
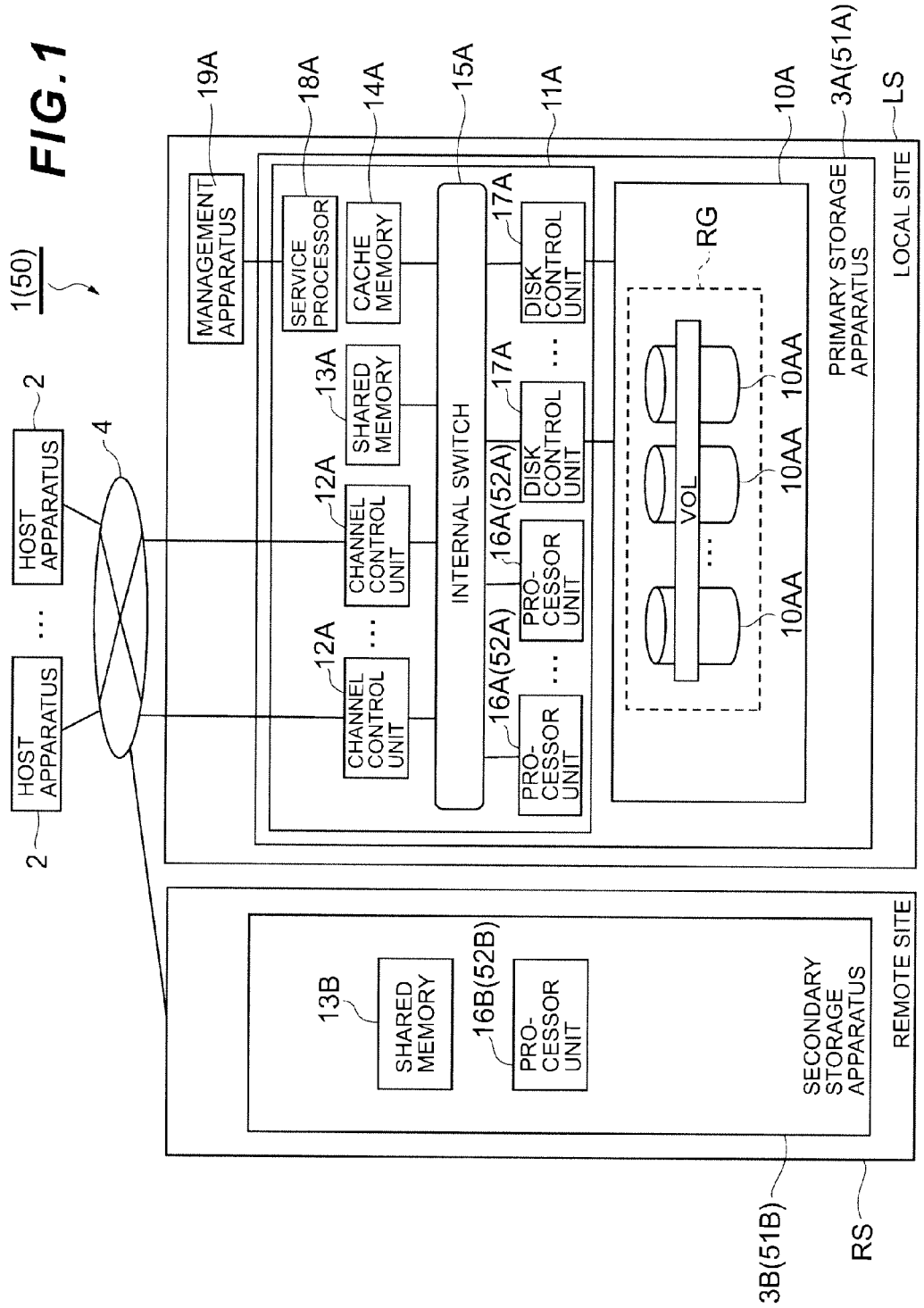
FIG. 1 is a block diagram which shows the overall configuration of a computer system according to first and second embodiments.

(1) Computer System According to this Embodiment (1-1) Configuration of Computer System According to this Embodiment In FIG. 1, 1 denotes the overall computer system 1 according to this embodiment. This computer system 1 is configured as a result of connecting a plurality of host apparatuses 2, a primary storage apparatus 3A which is installed at a local site LS, and a secondary storage apparatus 3B which is installed at a remote site RS via a network 4 formed from a WAN (Wide Area Network), a SAN (Storage Area Network), or the Internet or the like.

Figure 2:
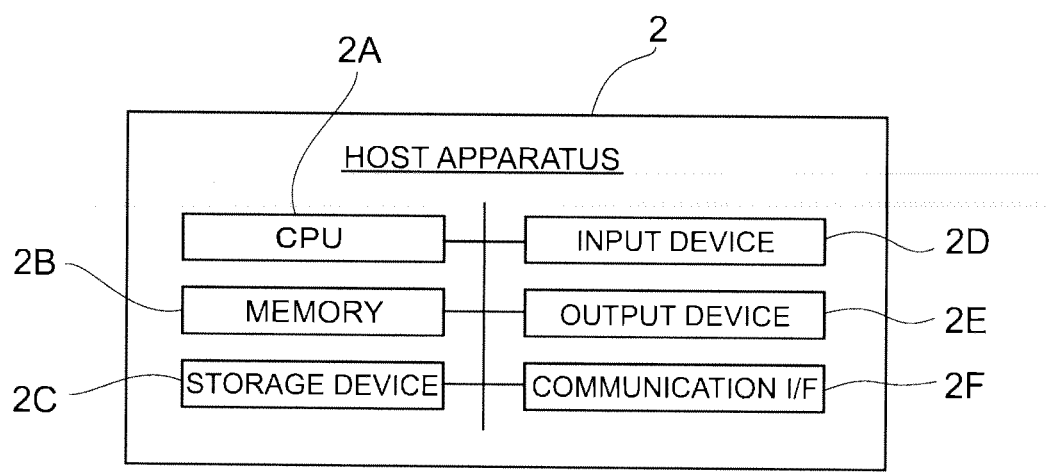
FIG. 2 is a block diagram showing the overall configuration of a host apparatus.

The host apparatus 2 is an information processing device which reads and writes data from/to the primary storage apparatus 3A and which is configured comprising a CPU 2A, a memory 2B, a storage device 2C, an input device 2D, and a communication interface 2F, as shown in FIG. 2.

The CPU 2A is a processor which exercises control of the overall operations of the host apparatus 2. The memory 2B is a semiconductor memory which is used as a working memory of the CPU 2A. Furthermore, the storage device 2C is configured from a hard disk, for example, and stores various programs such as applications and various information used by the user. The programs stored in the storage device 2C are read to the memory 2B when the host apparatus 2 is started up, and various processing corresponding to user operations is executed as a result of the CPU 2A executing these programs. Furthermore, data which is used in this processing is read and written from/to the primary storage apparatus 3A.

The input device 2D is configured from a keyboard switch and pointing device, or the like, for example, and is used by the user to input information to the host apparatuses 2D and supply instructions to the host apparatuses. The output device 2E is a display device for presenting a GUI (Graphical User Interface) and various information to the user, and is configured from a liquid-crystal display or the like, for example. The communication interface 2F is configured from an NIC (Network Interface Card), for example, and functions as an interface during communication with the primary storage apparatus 3A.

The primary storage apparatus 3A is configured from a physical disk unit 10A comprising one or more physical disks 10AA and a control unit 11A which controls the reading and writing of data from/to the physical disk unit 10A.

The physical disks 10AA are configured from high-cost disks such as SCSI (Small Computer System Interface) disks or low-cost disks such as SATA (Serial AT Attachment) disks, for example. A RAID group RG is configured from one or more physical disks 10AA and one or more logical volumes VOL are defined in a physical storage area which is provided by each of the physical disks 10AA forming a single RAID group RG. Furthermore, the data from the host apparatus 2 is stored in logical track units in the logical volume VOL. Here, a 'logical track' indicates a logical track formed by integrating tracks with the same address on each of the physical disks 10AA which form the RAID group RG providing the logical volume VOL.

Unique identifiers (hereinafter called 'LUN' (Logical Unit Numbers) are assigned to each logical volume VOL. In the case of this embodiment, data I/O is implemented by designating, as addresses, addresses which are obtained by combining these LUN with unique logical track numbers (hereinafter called the 'track numbers') which are assigned to these logical tracks respectively.

The control unit 11A is configured from a plurality of channel control units 12A, a shared memory 13A, a cache memory 14A, an internal switch 15A, a plurality of processor units 16A, a plurality of disk control units 17A, and a service processor 18A.

Figure 3:
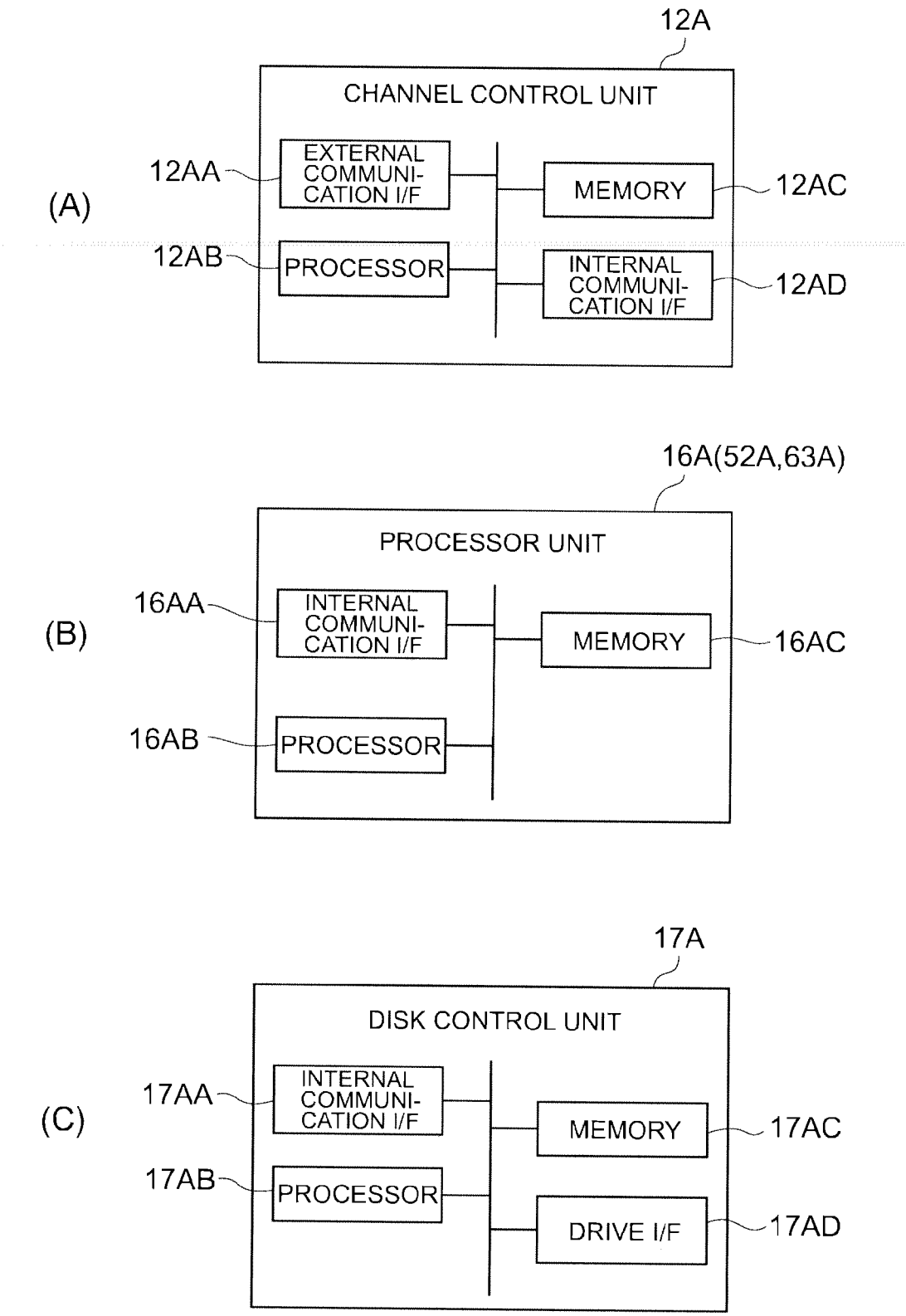
FIG. 3A is a block diagram showing the overall configuration of a channel control unit.
FIG. 3B is a block diagram showing the overall configuration of a processor unit.
FIG. 3C is a block diagram showing the overall configuration of a disk control unit.

The channel control units 12A are adapters which exercise protocol control during communication with the host apparatuses 2 and, as shown in FIG. 3A, are configured comprising an external communication interface 12AA, a processor 12AB, a memory 12AC, and an internal communication interface 12AD. The external communication interface 12AA is an interface during communication with the host apparatuses 2. Furthermore, the processor 12AB is a controller which exercises control of the overall operation of the channel control units 12A. The memory 12AC is a semiconductor memory used to store various programs. The internal communication interface 12AD functions as an interface when the channel control unit 12A communicates with other devices which are connected to the internal switch 15A (the other channel control units 12A, the shared memory 13A, cache memory 14A, processor units 16A, and disk control units 17A).

The shared memory 13A and cache memory 14A are memory shared by the channel control units 12A, the processor units 16A, and the disk control units 17A. The shared memory 13A is mainly used to store control information that is referred to and updated by the processor units 16A. Furthermore, the cache memory 14A is used to temporarily store data which is read from and written to the physical disks 10AA.

The internal switch 15A is configured from a switch such as an ultra high-speed crossbar switch or a bus or the like which performs data transmissions by the highspeed switching, for example. The exchange of data and commands between the channel control units 12A, the shared memory 13A, the cache memory 14A, the processor units 16A and the disk control units 17A is performed via the internal switch 15A.

The processor unit 16A is a device which exercises control of the overall operations of the primary storage apparatus 3A and, as shown in FIG. 3B, is configured comprising an internal communication interface 16AA, a processor 16AB, and a memory 16AC. Among these components, the internal communication interface 16AA is an interface used when the processor unit 16A communicates with the other devices connected to the internal switch 15A (channel control units 12A, shared memory 13A, cache memory 14A, other processor units 16A, or the disk control units 17A). Furthermore, the processor 16AB has a function for controlling the overall operation of the processor unit 16A. The memory 16AC is mainly used to store various programs. Various processing of the whole processor unit 16A, described subsequently, is performed as a result of the processor 16AB executing various programs stored in the memory 16AC.

The disk control units 17A are adapters which control a communication protocol during communication with the physical disks 10AA and, as shown in FIG. 3C, are configured comprising an internal communication interface 17AA, a processor 17AB, a memory 17AC, and a drive interface 17AD. The internal communication interface 17AA is an interface used when the disk control unit 17A communicates with the other devices connected to the internal switch 15A (the channel control units 12A, shared memory 13A, cache memory 14A, processor units 16A or other disk control units 17A). Furthermore, the processor 17AB has a function for exercising control over the overall operation of the disk control units 17A). The memory 17AC is mainly used to store various programs and the drive interface 17AD functions as an interface when the disk control unit 17A communicates with the physical disks 10AA.

Figure 4:
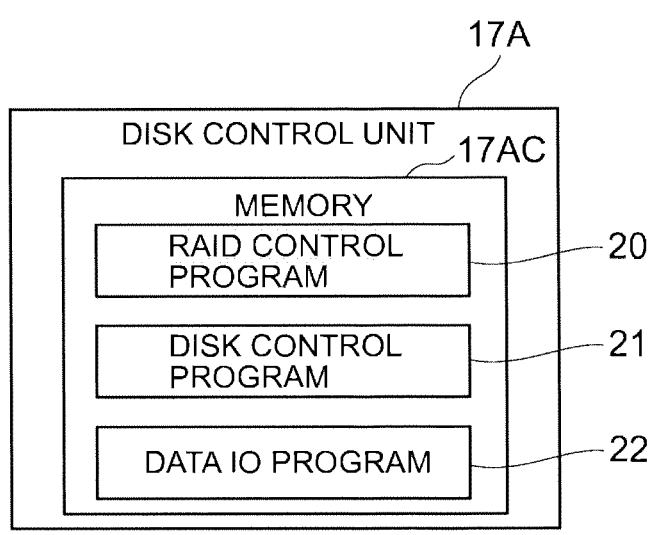
FIG. 4 is a conceptual diagram serving to illustrate programs which are stored in the memory of the disk control unit.

Note that the programs stored in the memory 17AC of the disk control unit 17A include, as shown in FIG. 4, a RAID control program 20, a disk control program 21, and a data IO program 22. The RAID control program 20 is a program for creating and managing the RAID group RG according to an instruction from the user which is supplied via the management apparatus 19A or service processor 18A. Furthermore, the disk control unit program 21 is a program which controls data I/O to/from the physical disk unit 10A, and the data IO program 22 is a program which performs processing in which logical addresses recognized by the host apparatuses 2 are converted into physical addresses on the physical disks 10AA.

The service processor 18A is an information processing device used to service the primary storage apparatus 3A and is configured from a personal computer such as a notebook computer, for example. The service processor 18A collects various information in the primary storage apparatus 3A and notifies the management apparatus 19A and, as subsequently explained, makes various configurations in the primary storage apparatus 3A according to configuration instructions from the management apparatus 19A, as will be described subsequently.

The management apparatus 19A is configured from a computer device such as a personal computer or a workstation, for example, and is connected to the service processor 18A of the primary storage apparatus 3A via a LAN. The management apparatus 19A comprises a display device which displays a GUI (Graphical User Interface) and various information for making various configurations in the primary storage apparatus 3A, an input device such as a keyboard and mouse or the like to enable the operator to perform various operations and various configuration inputs, and a communication device for communicating with the service processor 18A of the primary storage apparatus 3A via the LAN. Furthermore, the management apparatus 19A displays various information which is notified by the service processor 18A of the primary storage apparatus 3A, for example, on the display device, and transmits configuration commands to the service processor 18A of the primary storage apparatus 3A according to various configuration content which is input using the GUI displayed on the display device.

The secondary storage apparatus 3B has the same hardware configuration as the primary storage apparatus 3A and therefore details will not be described here.

(1-2) Data Backup Method According to this Embodiment (1-2-1) Overview of the Data Backup Method According to this Embodiment The data backup method which is executed by this computer system 1 will be explained next. Here, a conventional data backup method which combines a flashcopy function and a remote copy function will first be explained with reference to FIG. 5.

Figure 5:
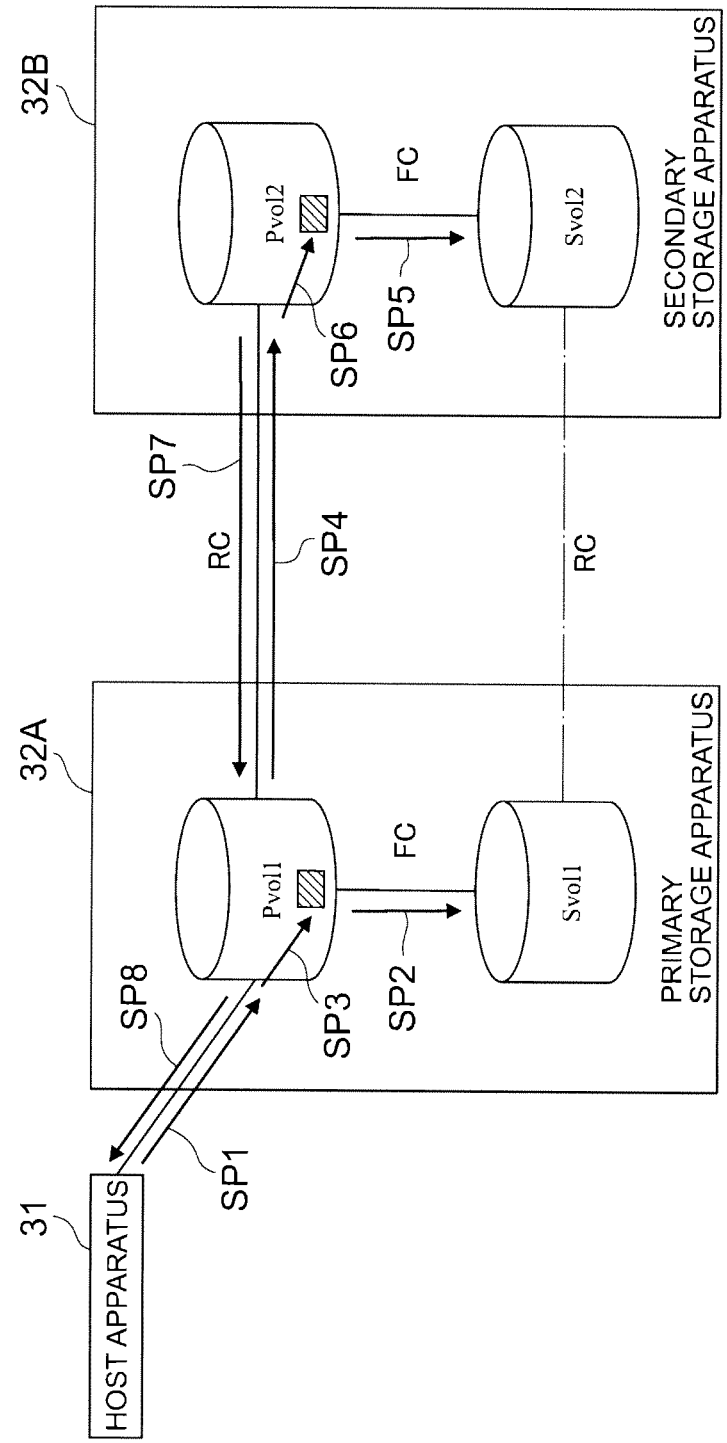
FIG. 5 is a conceptual diagram serving to illustrate a data backup method of a conventional computer system.

FIG. 5 is a configuration example of a conventional computer system 30 which comprises a data backup function which combines a flashcopy function and a remote copy function. In this computer system 30, a primary storage apparatus 32A is a storage apparatus installed at a local site and which contains a logical volume VOL (hereinafter referred to as a primary volume PVOL) from/to which a host apparatus 31 reads and writes data and a volume (hereinafter called 'secondary volume SVOL1') configured as a flashcopy copy pair to the primary volume PVOL1.

Furthermore, the secondary storage apparatus 32B is a storage apparatus which is installed at a remote site and which contains a primary volume PVOL1 of the secondary storage apparatus 32A, a primary volume PVOL2 which is installed in a remote-copy copy pair, and a secondary volume SVOL2 which is configured as a flashcopy copy pair to the primary volume PVOL2.

In this computer system 30, when the host apparatus 31 writes data to the primary volume PVOL1 of the primary storage apparatus 32A, data is transferred to the secondary storage apparatus 32B and copied (remote-copied) to the corresponding primary volume PVOL2 in the secondary storage apparatus 32B by the remote copy function of the primary storage apparatus 32A. Accordingly, data stored in the primary volume PVOL1 of the primary storage apparatus 32A is backed up to the primary volume PVOL2 of the secondary storage apparatus 32B.

Note that the LUN of the remote-copy copy source primary volume in this primary storage apparatus 32A and the track number of the data copy-source logical track in the primary volume are the same as the LUN of the remote-copy copy-destination primary volume in this secondary storage apparatus 32B and the track number of the data copy-destination logical track of the primary volume.

Thereafter, the host apparatus 31 designates the LUN of the primary volume PVOL1 in the primary storage apparatus 32A and the target range in the primary volume PVOL1 (the logical track range which is the flashcopy target), and if an instruction (hereinafter called a 'flashcopy instruction') is supplied to the primary storage apparatus 32A to execute a flashcopy of the data stored in the target range, the data stored in each logical track in the target range is copied to a secondary volume (flashcopy) by means of the flashcopy function of the primary storage apparatus 32A. As a result, the snapshot of data stored in the flashcopy target range in the primary volume PVOL1 designated in the flashcopy instruction is saved in the secondary volume SVOL1.

Furthermore, the flashcopy instruction is transferred from the primary storage apparatus 32A to the secondary storage apparatus 32B. Upon receiving a flashcopy instruction, the secondary storage apparatus 32B uses the flashcopy function to copy (flashcopy) data stored in each of the corresponding logical tracks in the corresponding primary volume PVOL2 in the secondary storage apparatus 32B to the secondary volume SVOL2. Accordingly, a snapshot saved in the secondary volume SVOL1 of the primary storage apparatus 32A is backed up to the corresponding secondary volume SVOL2 in the secondary storage apparatus 32B.

The details regarding data backup processing which is executed in a computer system 30 will now be explained for a case (SP1) where, in a conventional computer system 30 which comprises a backup function obtained by combining the foregoing flashcopy function with the remote copy function, a write request is supplied from the host apparatus 31 while a flashcopy is being executed in the primary storage apparatus 32A and secondary storage apparatus 32B.

In this case, the primary storage apparatus 32A first determines whether or not a logical track designated as the data write destination of the primary volume PVOL1 in the primary storage apparatus 32A designated as a data write destination in this write request is a logical track is a logical track in the target range of a flashcopy which is currently being executed, and whether or not the data stored in the logical track has already been copied to the secondary volume SVOL1.

Furthermore, if the determination result obtained is that the logical track designated as the data write destination in the write request is a logical track in the target range of the flashcopy currently being executed and that the flashcopy to the logical track is incomplete, the primary storage apparatus 32A preferentially copies the data stored in the logical track designated as the data write destination in the write request to the secondary volume SVOL 1 (hereinafter suitably called an 'on-demand copy') (SP2).

Subsequently, the primary storage apparatus 32A writes write target data which is supplied together with the write request to the logical track designated as the data write destination in the write request in the primary volume PVOL1 designated as the data write destination in the write request (SP3), and subsequently transfers the write request and write target data to the secondary storage apparatus 32B (SP4).

Upon receiving the write request and write target data from the primary storage apparatus 32A, the secondary storage apparatus 32B determines whether or not a logical track designated as the data write destination of the primary volume PVOL2 in the secondary storage apparatus 32B designated as a data write destination in this write request is a logical track in the target range of a flashcopy which is currently being executed, and whether or not the data stored in the logical track has already been copied to the secondary volume SVOL2.

Furthermore, if the determination result obtained is that the logical track designated as the data write destination in the write request is a logical track in the target range of the flashcopy currently being executed and that data stored in the logical track has not yet been copied to the secondary volume SVOL2, the secondary storage apparatus 32B on-demand-copies the data stored in the logical track designated as the data write destination in the write request to the secondary volume SVOL 2 (SP5).

Subsequently, the secondary storage apparatus 32B writes write target data which is supplied together with the write request to the logical track designated in the write request in the primary volume PVOL2 designated in the write request (SP6), and subsequently transmits a completion notification to the effect that data write processing according to the write request is complete to the primary storage apparatus 32A (SP7).

Furthermore, upon receiving the completion notification, the primary storage apparatus 32A transmits a write processing completion notification to the effect that write processing is complete in response to the write request received in step SP1 to the host apparatus 31 (SP8). Accordingly, a series of data write processes for the write request issued by the host apparatus 2 in step SP1 ends.

Furthermore, according to the data backup method of the foregoing conventional computer system 30, as mentioned earlier, the on-demand copy (SP2) in the primary storage apparatus 32A and the on-demand copy (SP5) in the secondary storage apparatus 32B are performed separately at different times and hence there is a problem in that a suitable time is required, after the write request is issued by the host apparatus 31 to the primary storage apparatus 32A, until a write processing completion notification for the write request is transmitted from the primary storage apparatus 32A to the host apparatus 31. This problem reduces the response performance of the computer system 30 from the perspective of host apparatus 31 and will likely have an adverse effect on the operation of the host apparatus 31.

Hence, in this computer system 1, if, while a flashcopy is being executed in a primary storage apparatus 3A and a secondary storage apparatus 3B, a write request, in which the data write destination is a logical track which has not been used for a flashcopy and which is contained in the flashcopy target range in each of the primary volumes PVOL1, PVOL2 of the primary storage apparatus 3A and secondary storage apparatus 3B, is supplied to the primary storage apparatus 3A from the host apparatus 2, notification is sent, from the primary storage apparatus 3A to the secondary storage apparatus 3B, of the LUN of the primary volume designated as the data write destination in the write request and the track number of the logical track (this is also referred to hereinbelow as an 'on-demand copy advance notification') before the primary storage apparatus 3A starts an on-demand copy. Furthermore, the secondary storage apparatus 3B executes the on-demand copy in parallel with the primary storage apparatus 3A according to this on-demand copy advance notification.

Figure 6:
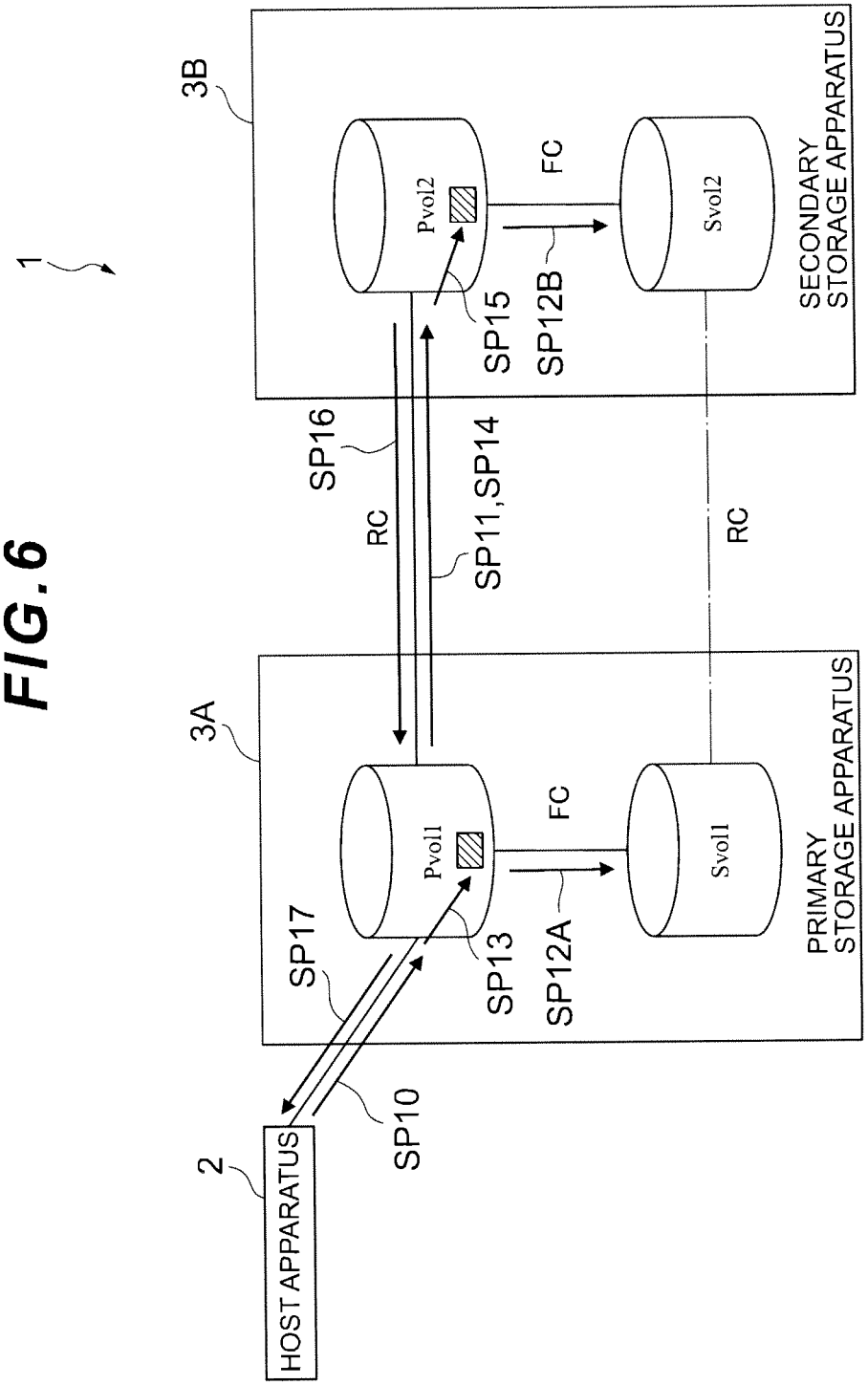
FIG. 6 is conceptual diagram serving to illustrate a data backup method of a computer system according to the first embodiment.

More specifically, in the case of this computer system 1, upon receiving a write request from the host apparatus 2 while a flashcopy is being executed as shown in FIG. 6 (SP10), the primary storage apparatus 3A first determines whether or not the logical track in the primary storage apparatus 3A specified by the track number and the LUN designated in the write request is contained in the flashcopy target range. Furthermore, upon obtaining an affirmative result in this determination, the primary storage apparatus 3A generates an on-demand copy advance notification 40, as shown in FIG. 7, which stores the LUN and track number designated in the write request and transmits the on-demand copy advance notification 40 to the secondary storage apparatus 3B (SP11).

Subsequently, the primary storage apparatus 3A determines whether or not the flashcopy to the logical track specified by the LUN and track number designated in the write request is complete. Furthermore, upon obtaining a negative result in this determination, the primary storage apparatus 3A copies the data stored in the logical track to the corresponding secondary volume SVOL1 (on-demand copy) (SP12A), and writes the write target data to the corresponding logical track in the corresponding primary volume PVOL1 (SP13). Furthermore, the primary storage apparatus 3A subsequently transfers the write request and write target data to the secondary storage apparatus 3B (SP14).

Figure 7:
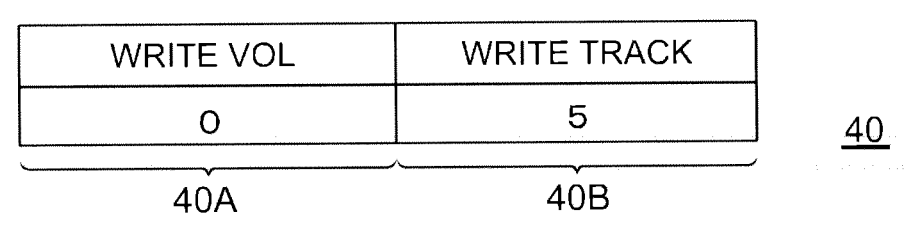

Meanwhile, the secondary storage apparatus 3B which has received the on-demand-copy advance notification 40 determines whether or not the flashcopy to the logical track specified by the LUN and track number designated in the on-demand-copy advance notification 40 (see the write volume number field 40A and write track number field 40B in FIG. 7) is complete. Furthermore, upon obtaining a negative result in this determination, the secondary storage apparatus 3B copies (on-demand-copies) the data stored in the logical track to the corresponding secondary volume SVOL2 (SP12B).

In addition, when the foregoing write request and write target data are subsequently transferred from the primary storage apparatus 3A, the secondary storage apparatus 3B writes this data to the logical track specified by the LUN and track number designated in the write request (which are the same as the LUN and track number designated in the on-demand-copy advance notification 40) (SP15). Furthermore, the secondary storage apparatus 3B subsequently transmits a completion notification to the effect that data write processing corresponding to the write request is complete to the primary storage apparatus 3A (SP16).

Furthermore, upon receiving this completion notification, the primary storage apparatus 3A transmits a write processing completion notification indicating that write processing in response to the write request received in step SP10 is complete to the host 2 (SP17). As a result, a series of data write processes for the write request issued by the host apparatus 2 in step SP10 end.

With the data backup method according to the foregoing embodiment, if a write request to write to a logical track for which a flashcopy has not yet been completed in each of the primary volumes PVOL1, PVOL2 in the primary storage apparatus 3A and secondary storage apparatus 3B is supplied to the primary storage apparatus 3A from the host apparatus 2, an on-demand copy is executed in parallel in both the primary storage apparatus 3A and also the secondary storage apparatus 3B, and therefore the time, after the write request is issued to the primary storage apparatus 3A by the host apparatus 2, until the write processing completion notification for the write request is transmitted from the primary storage apparatus 3A to the host apparatus 2 can be shortened.

Figure 8:
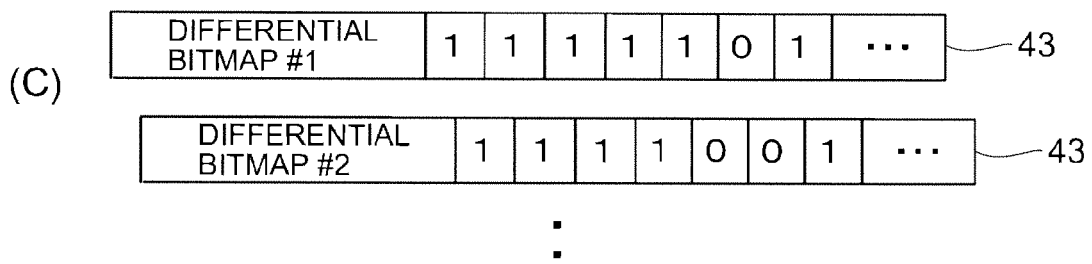
FIG. 8A is a conceptual diagram showing the configuration of a volume information table according to the first embodiment.
FIG. 8B is a conceptual diagram showing the configuration of a pair information table according to the first embodiment.
FIG. 8C is a conceptual diagram showing a differential bitmap according to the first embodiment.

As means for implementing this data backup method, the shared memories 13A, 13B (see FIG. 1) of the primary storage apparatus 3A and secondary storage apparatus 3B each store a volume information table 41, shown in FIG. 8A, a pair information table 42, shown in FIG. 8B, and one or more differential bitmaps 43, shown in FIG. 8C.

The volume information tables 41 are tables which are used [by the primary and secondary storage apparatuses] to manage the logical volumes VOL which are configured in the storage apparatuses and, as shown in FIG. 8A, are configured from a logical volume number field 41A, a volume type field 41B, and a pair number field 41C.

Furthermore, the logical volume number field 41A stores the LUNs of the logical volumes which are each assigned to the logical volumes VOL in the primary storage apparatus 3A or secondary storage apparatus 3B. Furthermore, the volume type field 41B stores information indicating the type of the corresponding logical volume VOL (the primary volume or secondary volume or the like). More specifically, if a logical volume VOL is a primary volume, this field stores 'Pvol', if the logical volume VOL is a secondary volume, this field stores 'Svol', and if the logical volume is not being used as a primary volume or a secondary volume, this field stores 'not.' Furthermore, in cases where the corresponding logical volume VOL forms a copy pair with another logical volume VOL, this field stores an identifier (hereinafter called a 'pair number') which is assigned to the copy pair.

Hence, in the case of FIG. 8A, it can be seen that the logical volume VOL with LUN '0' is configured as the primary volume and a copy pair with the pair number '1' is formed with a logical volume VOL with LUN '2'.

Furthermore, the pair information table 42 is a table which is used [by the storage apparatuses] to manage the copy pairs configured in the storage apparatuses and, as shown in FIG. 8B, is configured from a pair number field 42A, a primary volume number field 42B, a secondary volume number field 42C and a bitmap number field 42D.

Furthermore, the pair number field 42A stores pair numbers assigned to the corresponding copy pairs and the primary volume number field 42B stores the LUN of the logical volumes VOL forming the primary volumes of the copy pairs. Further, the secondary volume number field 42C stores the LUN of the logical volumes VOL forming the secondary volumes of the copy pairs, and the bitmap number field 42D stores identification numbers (hereinafter called the 'bitmap numbers') which are assigned to differential bitmaps 43, described subsequently, associated with the copy pairs.

The differential bitmaps 43 are bitmaps used to manage the flashcopy progress states of the corresponding copy pairs and, as shown in FIG. 8C, are configured comprising one or more differential bits which correspond to each of the logical tracks present in the flashcopy target region in the primary volume. Furthermore, the differential bits are configured as '0' in an initial state directly after the differential bitmap 43 is created and are subsequently updated to '1' at the stage where copying (flashcopying) of the data stored in the corresponding logical tracks to the secondary volume is complete.

(1-2-2) Various Processing Relating to the Data Backup Method According to this Embodiment Specific processing details regarding various processing relating to the data backup method according to this embodiment will be explained next.

(1-2-2-1) Flashcopy Processing

Figure 9:
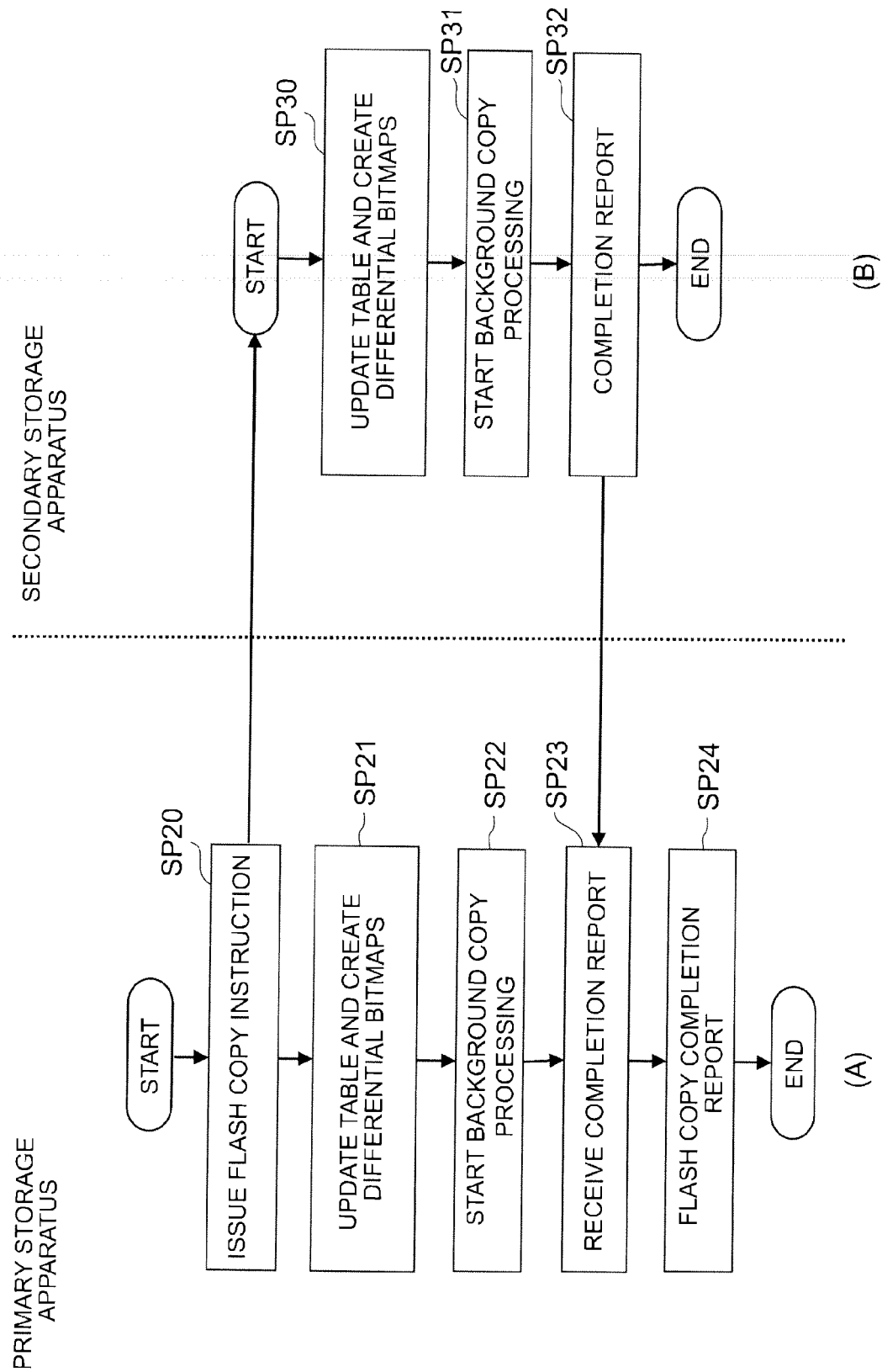
FIG. 9A is a flowchart showing a processing routine for primary flashcopy processing according to the first embodiment.
FIG. 9B is a flowchart showing a processing routine for secondary flashcopy processing according to the first embodiment.

FIG. 9A shows a processing routine for flashcopy processing (hereinafter called 'primary flashcopy processing') which is executed by a processor unit (hereinafter called the 'primary processor unit') 16A of a primary storage apparatus 3A which receives a flashcopy instruction from the host apparatus 2.

Upon receiving the flashcopy instruction issued by the host apparatus 2, the primary processor unit 16A starts the primary flashcopy instruction and first issues a flashcopy execution instruction to the secondary storage apparatus 3B which, in response to the received flashcopy instruction, designates the corresponding primary volume in the primary storage apparatus 3A and the corresponding range in the primary volume (SP20).

Thereafter, the primary processor unit 16A configures, for a primary volume and secondary volume with which a flashcopy, designated in the flashcopy instruction from the host apparatus 2, is to be executed, a copy pair in which the primary volume is the copy source and the secondary volume is the copy destination and registers information relating to the configured copy pair in the pair information table 42 (FIG. 8B) in the storage apparatus of the primary processor unit. Furthermore, the primary processor unit 16A updates the volume information table 41 (FIG. 8A) in the storage apparatus as necessary in accordance with this copy pair configuration and creates the differential bitmap 43 for managing the progress of the flashcopy processing of the copy pair (SP21).

Thereafter, the primary processor unit 16A activates background copy processing which corresponds to the flashcopy instruction from the host apparatus 2 (SP22). The primary processor unit 16A ends this copy processing and, when a completion notification, described subsequently, is transmitted from the processor unit 10 of the secondary storage apparatus 3B (SP23), transmits a flashcopy completion report to the effect that flashcopy processing is complete (SP24), and subsequently ends the primary flashcopy processing.

Note that, to the host apparatus 2, it would appear, from the completion report of the foregoing step S24, that flash copy processing in the primary and secondary storage apparatuses 3A, 3B is complete, but, in reality, the copy processing in the primary and secondary storage apparatuses 3A, 3B is performed continuously in the background.

In addition, FIG. 9B shows a processing routine for flashcopy processing (hereinafter referred to as 'secondary flashcopy processing') which is executed by a processor unit (hereinafter called 'secondary processor unit') 16B (see FIG. 1) of the secondary storage apparatus 3B which receives the foregoing flashcopy instruction issued by the primary storage apparatus 3A in step SP20 of the primary flashcopy processing (FIG. 9A).

Upon receiving a flashcopy instruction from this primary storage apparatus 3A, the secondary processor unit 16B starts the secondary flashcopy processing, first configures, for the primary volume and secondary volume with which the flashcopy designated in the received flashcopy instruction is to be executed, a copy pair in which the primary volume is the copy source and the secondary volume is the copy destination, and registers information relating to the configured copy pair in the pair information table 42 of the storage apparatus of the secondary processor unit 16B. Furthermore, the secondary processor unit 16B updates the volume information table 41 in the storage apparatus thereof as necessary in accordance with this copy pair configuration, and creates a differential bitmap 43 for managing the progress of the flashcopy processing in the copy pair (SP30).

The secondary processor unit 16B then activates background copy processing which corresponds to the flashcopy instruction from the primary storage apparatus 3A (SP31). Furthermore, the secondary processor unit 16B subsequently transmits a completion report to the effect that flashcopy processing according to the flashcopy instruction is complete to the primary storage apparatus 3A (SP32), and subsequently terminates the secondary flashcopy processing.

Note that, to the primary storage apparatus 3A, it would appear, from the completion report of the foregoing step SP32, that flash copy processing in the secondary storage apparatus 3B is complete, but, in reality, the copy processing in the secondary storage apparatus 3B is performed continuously in the background.

Figure 10:
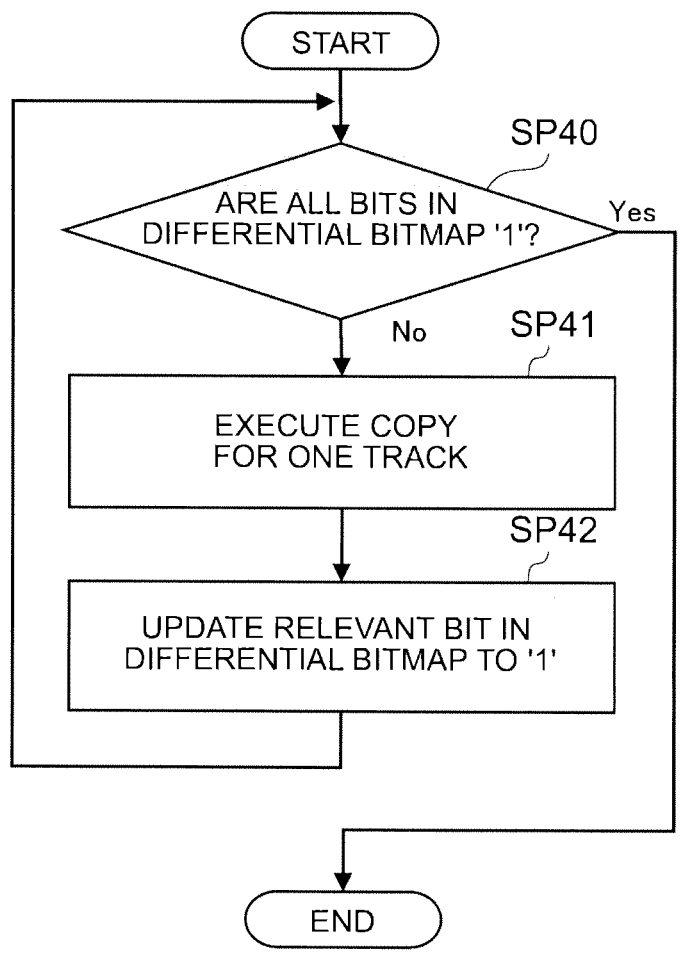
FIG. 10 is a flowchart showing a processing routine for background copy processing.

Note that the specific details regarding the background copy processing executed in step SP22 of the foregoing primary flashcopy processing (FIG. 9A) and in step SP31 of the secondary flashcopy processing (FIG. 9B) are shown in FIG. 10. Hereinafter, this background copy processing will be described as processing by the primary processor unit 16A in step SP22 of the primary flashcopy processing, however, the details regarding the processing by the secondary processor unit 16B in step SP31 of the secondary flashcopy processing are the same.

Upon advancing to step SP22 of the primary flashcopy processing, the primary processor unit 16A starts the copy processing shown in FIG. 10 and first determines whether or not all the bits in the differential bitmap created in step SP21 of the foregoing primary flashcopy processing in FIG. 9A have a value ('1') indicating that copying is complete (SP40).

Further, upon obtaining a negative result in this determination, the primary processor unit 16A refers to the pair information table 42 updated in step SP21 and the differential bitmap 43 and selects one logical track that has not yet been subjected to a flashcopy, that is, a logical track which is in the flashcopy target range in the primary volume designated in the flashcopy instruction from the host apparatus 2, and copies the data stored in the logical track to the corresponding secondary volume (SP41).

Subsequently, the primary processor unit 16A updates the bit corresponding to the logical track for which the copy is executed in step SP41 among the bits in this differential bitmap 43 to a value ('1') indicating that copying is complete (SP42) and returns to step SP40.

In addition, the primary processor unit 16A subsequently executes the same processing for each of the logical tracks not yet subjected to a flashcopy, which are logical tracks contained in the flashcopy target range in the primary volume designated in the flashcopy instruction from the host apparatus 2 (SP40 to SP42-SP40), and when an affirmative result is obtained in step SP40 as a result of copying already being complete for all the tracks contained in the flashcopy target range in the primary volume, terminates the background copy processing.

(1-2-2-2) Backup Copy Processing

Figure 11:
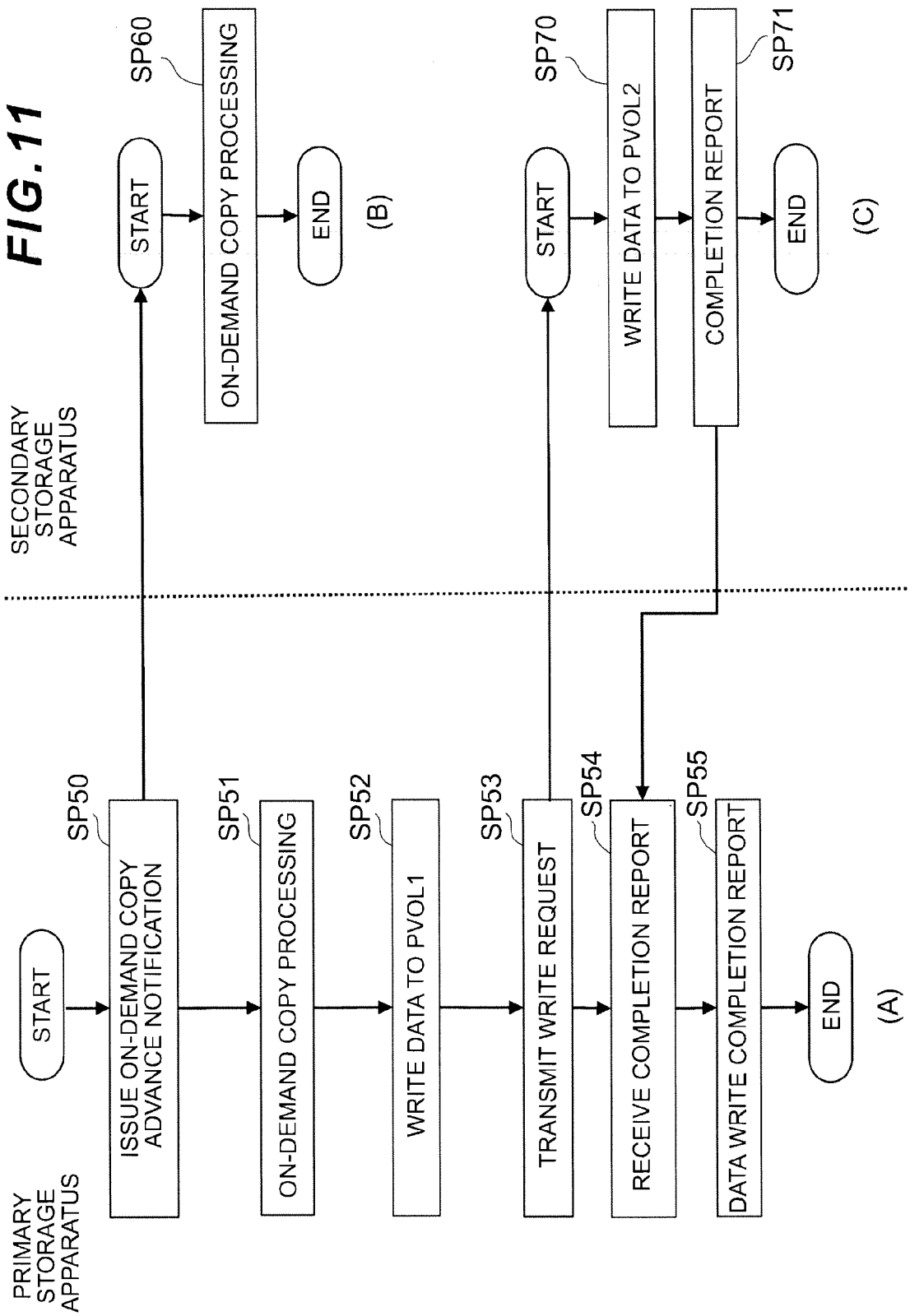
FIG. 11A is a flowchart showing a processing routine for primary backup copy processing according to the first embodiment.
FIG. 11B is a flowchart showing a processing routine for secondary on-demand copy processing advance notification reception processing according to the first embodiment.

FIG. 11A shows a processing routine for backup copy processing (hereinafter called 'primary backup copy processing') which is executed by the primary processor unit 16A if, in a state where the flashcopy processing (FIG. 10) is executed in the primary storage apparatus 3A and secondary storage apparatus 3B, a write request in which the data write destination is a logical track in the flashcopy target range in the primary volume of the primary storage apparatus 3A is transmitted to the primary storage apparatus 3A by the host apparatus 2.

In this case, upon receiving a write request from the host apparatus 2, the primary processor unit 16A transmits an on-demand-copy advance notification 40 (see FIG. 7) storing a LUN and a track number designated as the data write destination in the write request to the secondary storage apparatus 3B (SP50).

In addition, the primary processor unit 16A determines whether or not the flashcopy to the logical track in the primary storage apparatus 3A specified by the LUN and track number designated in the write request is complete. Furthermore, if a copy has not been executed, the primary processor unit 16A executes on-demand copy processing to copy (on-demand copy) the data stored in the logical track of the primary volume to the corresponding secondary volume (SP51).

Thereafter, the primary processor unit 16A writes the write target data supplied from the host apparatus 2 together with this write request to the logical track in the primary storage apparatus 3A specified by the LUN and track number designated in the write request (SP52) and then transfers the write request and write target data to the secondary storage apparatus 3B (SP53).

The primary processor unit 16A subsequently awaits transmission of a data write completion report, described subsequently, from the secondary storage apparatus 3B and, when a data write completion report has already been received (SP54), transmits a data write completion report to the effect that the write target data write processing is complete to the host apparatus 2 (SP55). The primary processor unit 16 then terminates the primary backup copy processing.

Meanwhile, FIG. 11B shows a processing routine for on-demand copy processing advance notification reception processing (hereinafter called 'secondary on-demand copy processing advance implementation notification reception processing') which is executed by the secondary processor unit 16B of the secondary storage apparatus 3B which receives the foregoing on-demand-copy advance notification 40 (FIG. 7) issued by the primary storage apparatus 3A.

Upon receiving this on-demand-copy advance notification 40, the secondary processor unit 16B starts this secondary on-demand copy processing advance notification reception processing and executes on-demand copy processing in accordance with the on-demand-copy advance notification 40 (SP60), and subsequently terminates the secondary on-demand copy processing advance notification reception processing.

Meanwhile, FIG. 11C shows a processing routine for write processing which is executed by the secondary processor unit 16B of the secondary storage apparatus 3B which receives the foregoing write request issued by the primary storage apparatus 3A in step SP53 of the primary backup copy processing (FIG. 11A).

Upon receiving this write request, the secondary processor unit 16B starts the write processing and first writes the write target data (that is, data which is written to the corresponding primary volume in the primary storage apparatus 3A by the host apparatus 2) transmitted from the primary storage apparatus 3A to the corresponding primary volume in the secondary storage apparatus 3B (SP70).

Thereafter, the secondary processor unit 16B transmits a completion report to the effect that data writing is complete to the primary storage apparatus 3A (SP71) and subsequently terminates the write processing.

Figure 12:
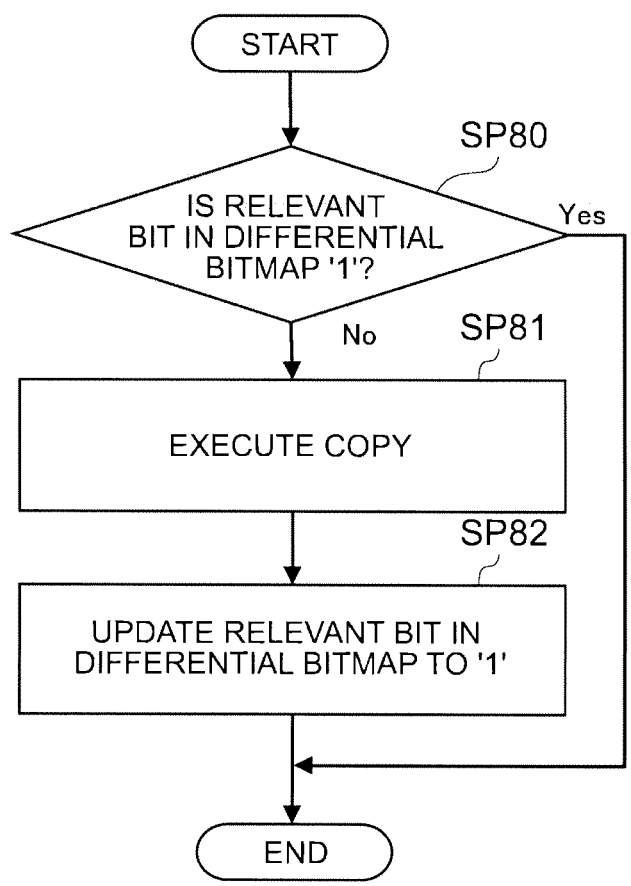
FIG. 12 is a flowchart showing a processing routine for on-demand copy processing.

Note that the specific processing details regarding on-demand copy processing which is executed in step SP51 of the foregoing primary backup copy processing (FIG. 11A) and in step SP60 of the secondary on-demand copy processing advance notification reception processing (FIG. 11(B)) are shown in FIG. 12. Note that, hereinafter, this ondemand copy processing is explained as processing by the primary processor unit 16A in step SP51 of the primary backup copy processing but that the details regarding the processing by the secondary processor unit 16B in step SP60 in the secondary on-demand copy processing advance notification reception processing are the same.

Upon advancing to step SP51 of the primary backup copy processing, the primary processor unit 16A starts the ondemand copy processing shown in FIG. 12, first refers to the volume information table 41 (FIG. 8A), pair information table 42 (FIG. 8B), and the corresponding differential bitmap 43 (FIG. 8C) which are stored in the write request received at the time and in the shared memory 13A (FIG. 1), and determines whether or not the bit corresponding to the logical track specified by the LUN and track number designated in the write request in the differential bitmap 43 is a value ('1') indicating that copying is complete (SP80). Further, upon obtaining an affirmative result in this determination, the primary processor unit 16A ends the on-demand copy processing.

However, when a negative result is obtained in the determination of step SP80, the primary processor unit 16A copies the data stored in the logical track in the primary storage apparatus 3A specified by the LUN and track number designated in the write request to the corresponding secondary volume (SP81).

The primary processor unit 16A subsequently changes the bit corresponding to the logical track of the differential bitmap 43 associated with the copy pair configured by the primary volume and secondary volume to a value ('1') which indicates that the data has been copied (SP82) and subsequently terminates the on-demand copy processing.

(1-3) Effects of the Embodiment

As described hereinabove, with this embodiment, since the required on-demand copy processing is executed in parallel in the primary storage apparatus 3A and the secondary storage apparatus 3B, it is possible to shorten the time required for the series of processes in comparison with a case where on-demand copy processing is performed at different times in the primary storage apparatus 3A and secondary storage apparatus 3B, as was the case conventionally. A computer system which enables the response performance of the storage apparatus to the write request from the host apparatus can thus be implemented.

(2) Second Embodiment (2-1) Configuration of Computer System

In FIG. 1, 50 refers to the whole computer system according to a second embodiment. This computer system 50 is configured in the same way as the computer system 1 according to the first embodiment except for the fact that the conditions whereby a primary storage apparatus 51A for issuing the on-demand-copy advance notification 40 (FIG. 7) to a secondary storage apparatus 51B are different.

In reality, in the computer system 1 according to the first embodiment, if, while the primary storage apparatus 3A and the secondary storage apparatus 3B are executing a flashcopy, a write request in which the data write destination is a logical track contained in the flashcopy target range in each of the primary volumes of the primary storage apparatus 3A and secondary storage apparatus 3B is supplied to the primary storage apparatus 3A from the host apparatus 2, the on-demand-copy advance notification 40 is always transmitted to the primary storage apparatus 3A and the secondary storage apparatus 3B.

Hence, in the secondary storage apparatus 51B, even in a case where the flashcopy to the logical track designated as the data write destination in the write request is complete, the on-demand-copy advance notification 40 is transmitted to the secondary storage apparatus 3B, thus wastefully consuming a proportionate bandwidth in the network 4.

Therefore, in the case of the computer system 50 according to this embodiment, the secondary storage apparatus 51B notifies the primary storage apparatus 51A of the foregoing completion report for step SP32 in FIG. 9C, for example and, in conjunction with the completion report, transmits the differential bitmap representing the progress state of the flashcopy which is then being executed to the primary storage apparatus 51A. The primary storage apparatus 51A stores the differential bitmap in the shared memory 13A.

Furthermore, if, subsequently, a write request in which the data write destination is a logical track in the target range of the flashcopy being executed in the primary storage apparatus 51A and the secondary storage apparatus 51B is supplied by the host apparatus 2, the primary storage apparatus 51B utilizes a differential bitmap of the secondary storage apparatus 51B which is held in the shared memory 13A so that the on-demand-copy advance notification 40 is transmitted to the secondary storage apparatus 51B only in cases where a flashcopy corresponding to the logical track in the secondary storage apparatus 51B specified by the LUN and the track number designated in the write request is incomplete in the secondary storage apparatus 51B.

As means for implementing the data backup method according to this embodiment hereinabove, the shared memory 13A (FIG. 1) of the primary storage apparatus 51A stores a volume information table 53, shown in FIG. 13A, an information table 54, shown in FIG. 13B, and a plurality of differential bitmaps 55, shown in FIG. 13C.

The volume information table 53 is the same as the volume information table 41 (FIG. 8A) according to the first embodiment and a description is therefore omitted here.

Figure 13:
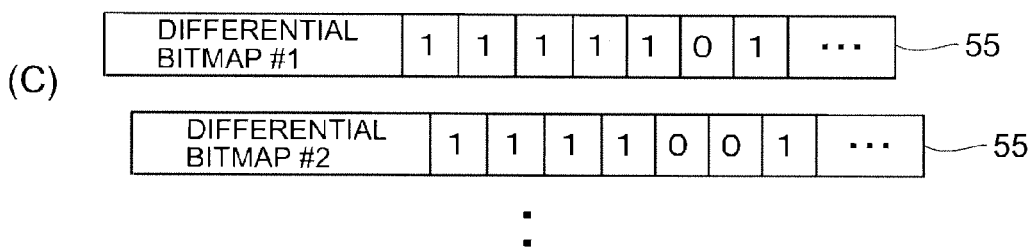
FIG. 13A is a conceptual view of the configuration of a volume information table held by the primary storage apparatus according to the second embodiment.
FIG. 13B is a conceptual view of the configuration of a pair information table held by the primary storage apparatus.
FIG. 13C is a conceptual view of the configuration of a differential bitmap held by the primary storage apparatus.

The pair information table 54 is a table which is used [by the storage apparatuses] to manage the copy pairs configured in the storage apparatuses and, as shown in FIG. 13B, is configured from a pair number field 54A, a primary volume number field 54B, a secondary volume number field 54C, a primary bitmap number field 54D, and a secondary bitmap number field 54E.

Furthermore, the pair number field 54A, primary volume number field 54B, and secondary volume number field 54C store the same information as the information stored in the corresponding fields in the pair information table 42 according to the first embodiment (the pair number field 42A, primary volume number field 42B, or secondary volume number field 42C), and the primary bitmap number field 54D stores the same information as the information stored in the bitmap number field 42D of the pair information table 42 according to the first embodiment.

In addition, the secondary bitmap number field 54E stores the bitmap numbers of the differential bitmaps 55 (FIG. 13C) which are transmitted from the secondary storage apparatus 51B for the corresponding flashcopy copy pair in the primary storage apparatus 51A and the copy pair in the corresponding secondary storage apparatus 51B. Note that 'copy pair in the primary storage apparatus 51A and the copy pair in the corresponding secondary storage apparatus 51B' indicates, among the copy pairs configured in the secondary storage apparatus 51B, a copy pair in which the flashcopy copy source is the primary volume in the secondary storage apparatus 51B to which data written to the primary volume forming the copy pair in the primary storage apparatus 51A is remote-copied.

The differential bitmaps 55 are the same as the differential bitmaps 43 (FIG. 7C) according to the first embodiment, and hence a description is omitted here. However, as mentioned earlier, with this embodiment, the primary storage apparatus 51A holds differential bitmaps 55 which represent the flashcopy progress states in the copy pairs in the secondary storage apparatus 51B which are associated with each of the flashcopy copy pairs which are provided in the primary storage apparatus 51A.

Figure 14:
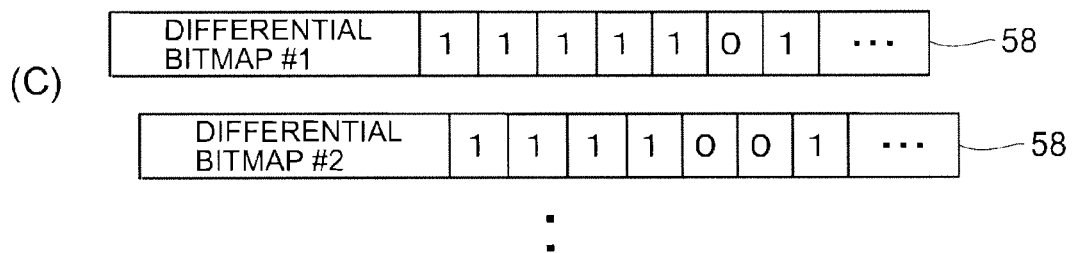
FIG. 14A is a conceptual view of the configuration of a volume information table held by the secondary storage apparatus according to the second embodiment.
FIG. 14B is a conceptual view of the configuration of a pair information table held by the secondary storage apparatus.
FIG. 14C is a conceptual view of the configuration of a differential bitmap held by the secondary storage apparatus.

Meanwhile, the shared memory 13B (FIG. 1) of the secondary storage apparatus 51B stores a volume information table 56, shown in FIG. 14A, a pair information table 57, shown in FIG. 14B, and a plurality of differential bitmaps 58 which are shown in FIG. 14C. The volume information table 56, pair information table 57, and differential bitmaps 58 are the same as the volume information table 41 (see FIG. 8A), the pair information table 42 (see FIG. 8B), and the differential bitmap 43 (FIG. 8C) according to the first embodiment, and hence a description is omitted here.

(2-2) Backup Copy Processing According to this Embodiment

The processing routine for the backup copy processing according to this embodiment will be described next. FIG. 15A shows a processing routine for primary backup copy processing that is executed by a primary processor unit 52A (FIG. 1) of the primary storage apparatus 51A in a case where a write request, in which the data write destination is a logical track in the flashcopy target range, is transmitted to the primary storage apparatus 51A from the host apparatus 2 while a flashcopy is being executed by the primary storage apparatus 51A and secondary storage apparatus 51B.

In this case, upon receipt of a write request from this host apparatus 2, the primary processor unit 52A refers to the write request, volume information table 53 and pair information table 54 which are stored in the shared memory 13A, and the differential bitmaps 55 transmitted from the secondary storage apparatus 51B as mentioned earlier, and determines whether or not the bit corresponding to the logical track in the primary storage apparatus 51A specified by the LUN and track number designated in the write request, in the differential bitmap 55, is a value ('1') indicating that copying is complete (SP90).

Upon receiving a negative result, the primary processor unit 52A generates, for the secondary storage apparatus 51B, the on-demand-copy advance notification 40 which stores the LUN and track number designated in the write request from the host apparatus 2, and transmits the on-demand-copy advance notification 40 to the secondary storage apparatus 51B (SP91). Further, the primary processor unit 52A subsequently advances to step SP92.

However, when an affirmative result is obtained in the determination of step SP90, by executing the foregoing on-demand copy processing for FIG. 12, the primary processor unit 52B copies (on-demand-copies) the data stored in the logical track specified by the LUN and track number designated in this write request to the corresponding secondary volume (SP92).

Thereafter, the primary processor unit 52B writes the write target data which is supplied from the host apparatus 2 together with this write request to a logical track in the primary storage apparatus 51A specified by the LUN and track number designated in the write request (SP93) and subsequently transfers the write request and write target data to the secondary storage apparatus 51B (SP94).

Subsequently, the primary processor unit 52B awaits the transmission of a data write completion report, described subsequently, and the data of the corresponding differential bitmap 58 (FIG. 14C) from the secondary storage apparatus 51B. Note that, here, the 'corresponding differential bitmap' refers to the differential bitmap 58 which is held by the secondary storage apparatus 51B for managing flashcopy pairs in which the copy source is the primary volume designated as the data write destination in the write request and the flashcopy progress state in the copy pair in the corresponding secondary storage apparatus 51B.

Furthermore, when the data write completion report and the data of the differential bitmap 58 have already been received (SP95), the primary processor unit 52B updates the corresponding secondary differential bitmap 55 to copy the differential bitmap received at this time (SP96). Note that, here, 'corresponding secondary differential bitmap' refers to a differential bitmap 55 provided in the primary storage apparatus 51A in correspondence with the foregoing 'corresponding differential bitmap.'

Thereafter, the primary processor unit 52B transmits a data write completion report to the effect that the data write processing in response to the write request is complete to the host apparatus 2 (SP97) and subsequently terminates the primary backup copy processing.

Meanwhile, FIG. 15B shows a processing routine for secondary on-demand copy processing advance notification reception processing which is executed by the secondary processor unit 52B (FIG. 1) of the secondary storage apparatus 51B which received the foregoing on-demand-copy advance notification 40 (FIG. 7) issued by the primary storage apparatus 51A.

Upon receiving this on-demand-copy advance notification 40, the secondary processor unit 52B starts the secondary on-demand copy processing advance notification reception processing and executes the on-demand copy processing according to the on-demand copy advance notification (SP100), and subsequently terminates the secondary on-demand copy processing advance notification reception processing.

Meanwhile, FIG. 15C shows a processing routine for write processing which is executed by the secondary processor unit 52B of the secondary storage apparatus 51B which received the foregoing write request issued by the primary storage apparatus 51A in step SP94 of the primary backup copy processing (FIG. 15A).

Upon receiving this write request, the secondary processor unit 52B starts the write processing, and first writes write target data transmitted from the primary storage apparatus 51A (that is, the data written to the corresponding primary volume in the primary storage apparatus 51A by the host apparatus 2) to the corresponding primary volume in the secondary storage apparatus 51B (SP110).

Subsequently, the secondary processor unit 52B transmits a completion report to the effect that data writing is complete together with the differential bitmap 58 which represents the current progress state of the corresponding flash copy being executed to the primary storage apparatus 51A (SP111) and then terminates this write processing.

Note that, in this embodiment, when the secondary storage apparatus 51B transmits a completion report to the effect that the write processing according to the write request is complete to the previous-stage primary storage apparatus 51A as described earlier, the corresponding differential bitmap 58 of the secondary storage apparatus 51B is also transmitted together with the completion report to the primary storage apparatus 51A, but the secondary storage apparatus 51B may transmit the differential bitmap 58 to the previous-stage primary storage apparatus 51A at regular intervals, for example.

Figure 39:
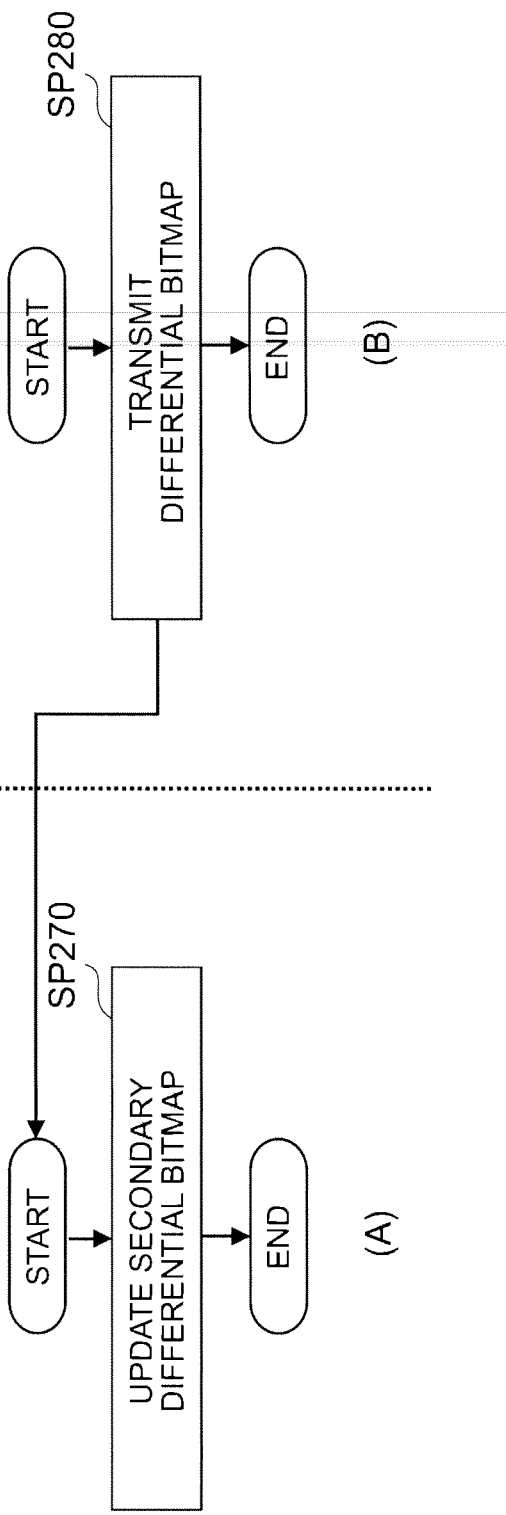
FIG. 39A is a flowchart showing a processing routine for primary differential bitmap update processing according to the second and third embodiments.
FIG. 39B is a flowchart showing a processing routine for secondary differential bitmap transmission processing.

FIG. 39B shows secondary differential bitmap transmission processing which is executed by the secondary processor unit 52B of the secondary storage apparatus 51B in a case where the secondary storage apparatus 518 transmits the differential bitmap 58 to the previous-stage primary storage apparatus 51A at regular intervals, and FIG. 39A shows a processing routine for primary differential bitmap update processing which is executed by the primary processor unit 52A of the primary storage apparatus 51A at the time.

The secondary processor unit 52B of the secondary storage apparatus 51B starts the secondary differential bitmap transmission processing shown in FIG. 39B at regular intervals and transmits the differential bitmap 58 which represents the current progress state of the corresponding flashcopy being executed in the secondary storage apparatus 51B to the primary storage apparatus 51A (SP280). The secondary processor unit 52B subsequently terminates the secondary differential bitmap transmission processing.

Meanwhile, upon receiving this differential bitmap 58, the primary processor unit 52A of the primary storage apparatus 51A starts the primary differential bitmap update processing shown in FIG. 39A, copies the received differential bitmap 58, and updates the corresponding secondary differential bitmap 55 (SP270). Furthermore, the primary processor unit 52A of the primary storage apparatus 51A subsequently terminates this differential bitmap update processing.

(2-3) Effect of the Embodiment

As described earlier, with the present embodiment, transmission of any unnecessary on-demand-copy advance notifications 40 from the primary storage apparatus 51A to the secondary storage apparatus 51B can be prevented beforehand. Accordingly, it is possible to implement a computer system which enables an effect whereby the bandwidth of the network 4 can be utilized effectively in addition to the effects obtained by the computer system 1 according to the first embodiment.

(3) Third Embodiment (3-1) Computer System Configuration

Figure 16:
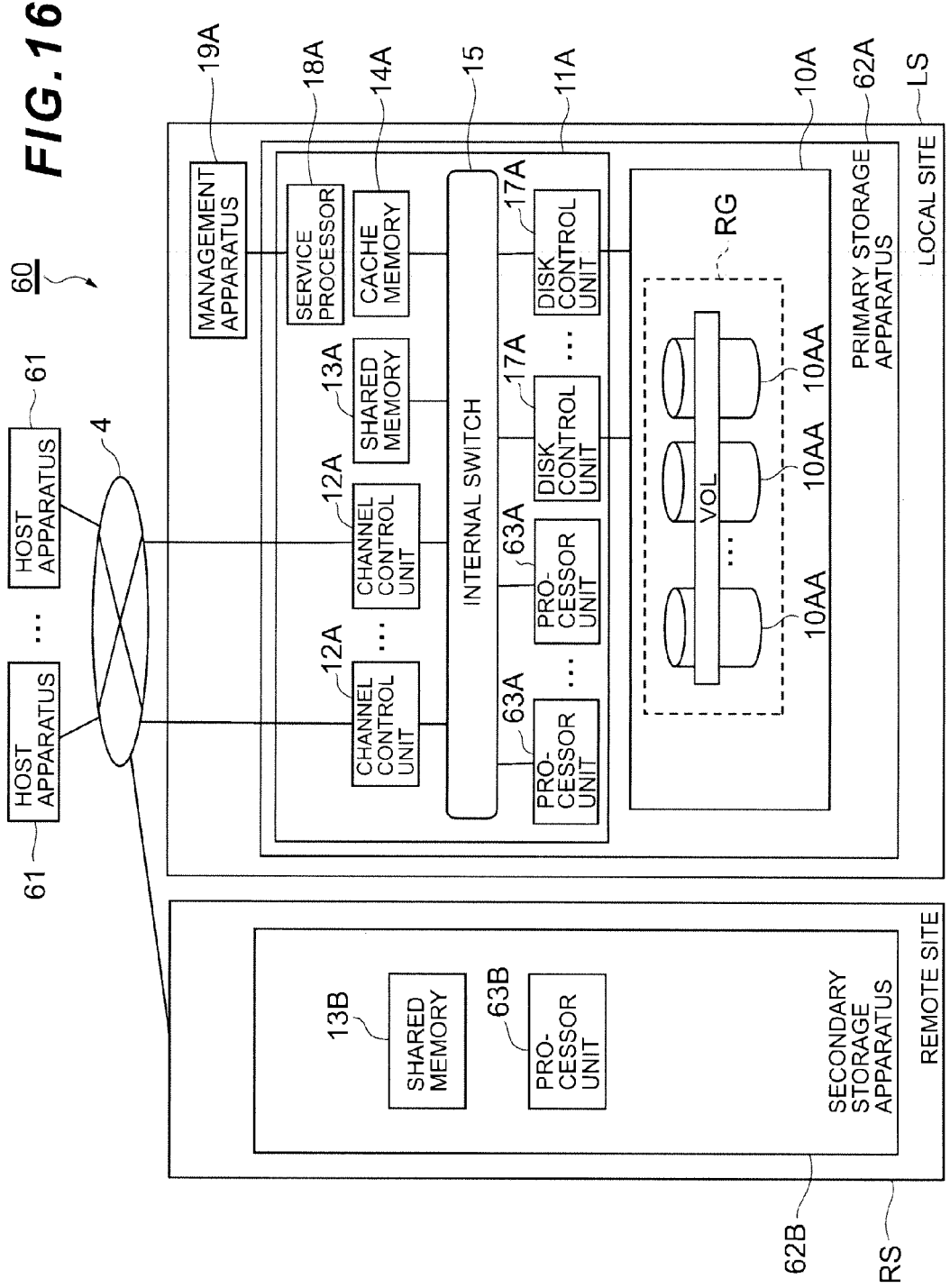
FIG. 16 is a block diagram showing the overall configuration of a computer system according to a third embodiment.

In FIG. 16, in which those parts which correspond to those in FIG. 1 are shown with the same reference signs, 60 denotes the whole computer system according to a third embodiment. This computer system 60 is configured in the same way as the computer system 50 according to the second embodiment except for the fact that, if the write request supplied to a primary storage apparatus 62A by a host apparatus 61 is a sequential write request, a corresponding on-demand-copy advance notification is supplied to a secondary storage apparatus 62B from the primary storage apparatus 62A and on-demand copy processing is executed in a plurality of track units based on the on-demand-copy advance notification.

In reality, in the case of the computer system 60, the host apparatus 61 embeds a code, indicating the fact that the write request is a sequential write request, in a predetermined position of the write request (hereinafter called 'sequential code embed position') if transmitting a sequential write request (hereinafter called 'sequential write request') to the primary storage apparatus 62A. Note that, here, 'sequential write request' refers to a write request for scheduling the designation, as the data write destination in at least the write request next issued, of a logical track which physically succeeds the logical track designated as the data write destination in the current write request.

Upon receiving a write request from the host apparatus 2 while the primary storage apparatus 62A and the secondary storage apparatus 62B are executing a flashcopy, the primary storage apparatus 62A refers to the sequential code embed position of the write request to determine whether or not the write request is a sequential write request.

In addition, the primary storage apparatus 62A transmits an on-demand-copy advance notification 70 to the secondary storage apparatus 62B shown in FIG. 17, for example, if the write request is a sequential write request, if the logical track designated as the data write destination in the write request is in the target range of the flashcopy currently being executed, and if, in the secondary storage apparatus 62B, a flashcopy of all the logical tracks of a predetermined number ('5' in this embodiment as will be explained hereinbelow), which run consecutively from the logical track with the track number designated as the data write destination in the write request, is incomplete.

As is also clear from FIG. 17, the on-demand-copy advance notification 70 comprises a write volume number field 70A, a write track number field 70B, and a sequential information field 70C. Furthermore, the write volume number field 70A stores the LUN of the primary volume designated as the data write destination in the write request from the host apparatus 61 and the write track number field 70B stores the track number of the logical track designated as the data write destination in the write request. Furthermore, the sequential information field 70C stores information indicating whether or not the write request is a sequential write request (hereinafter called 'sequential information'). More specifically, if the write request is a sequential write request, the sequential information field 70C stores '1', and if the write request is not a sequential write request, '0' is stored in the sequential information field 70C.

If the on-demand-copy advance notification 70 is received, the secondary storage apparatus 62B first refers to sequential information stored in the on-demand-copy advance notification 70 and determines whether or not the write request transmitted from the host apparatus 61 to the primary storage apparatus 62A is a sequential write request. Furthermore, upon obtaining an affirmative result in this determination, the secondary storage apparatus 62B executes an on-demand copy to logical tracks for which the flashcopy is incomplete among a predetermined number of consecutive logical tracks in which the header is the logical track in the secondary storage apparatus 62B specified by the LUN and track number designated in the on-demand copy advance notification 70.

Note that, in the case of this embodiment, if the sequential information in the on-demand-copy advance notification 70 is '1', the secondary storage apparatus 62B is configured such that the number of logical tracks targeted for the on-demand copy is '5'. Accordingly, in this embodiment, if write requests in which the consecutive logical tracks are designated respectively as the data write destination are supplied in sequence by the host apparatus 2, the primary storage apparatus 62A transmits an on-demand-copy advance notification 70 in which the sequential information is configured as '1' in a ratio of one out of five of these write requests to the secondary storage apparatus 62B.

As means for implementing a data backup method according to the foregoing embodiment, the shared memory 13A of the primary storage apparatus 62A according to this embodiment stores a sequential instruction table 71, shown in FIG. 18A, a volume information table 72, shown in FIG. 18B, a pair information table 73, shown in FIG. 18C, and a plurality of differential bitmaps 74, which are shown in FIG. 18D.

The sequential instruction table 71 is a table which, if write requests in which the foregoing consecutive logical tracks are designated respectively as the data write destination are supplied in sequence by the host apparatus 61, is used to transmit the on-demand-copy advance notification 70 in which the sequential information is configured as '1' in a ratio of one out of five of these write requests to the secondary storage apparatus 62B and, as shown in FIG. 18A, is configured from a volume number field 71A, a write track number field 71B, and a final value field 71C.

Furthermore, the volume number field 71A stores the LUN of the primary volume which is designated as the data write destination in the on-demand-copy advance notification 70 when an on-demand-copy advance notification 70 in which the sequential information is configured as '1' is transmitted to the secondary storage apparatus 70B. Furthermore, the write track number field 71B stores the track number of a logical track designated as the data write destination in the on-demand-copy advance notification 70, and the final value field 71C stores the track number (a value obtained by adding four to a numerical value stored in the write track field 71B) of the last logical track among the five consecutive logical tracks which undergo on-demand copying in the secondary storage apparatus 62B as a result of the on-demand-copy advance notification 70 being supplied to the secondary storage apparatus 62B.

The volume information table 72, the pair information table 73, and the differential bitmaps 74 are the same as the volume information table 41 (FIG. 8A), pair information table 42 (FIG. 8B), or differential bitmap 43 (FIG. 8C) of the first embodiment and hence are not described here.

Meanwhile, the shared memory 13B (FIG. 16) of the secondary storage apparatus 62B stores the volume information table 75 shown in FIG. 19A, the pair information table 76 shown in FIG. 19B, and a plurality of differential bitmaps 77, shown in FIG. 19C. In this case, the volume information table 75, the pair information table 76, and the differential bitmap 77 are also the same as the volume information table 41, pair information table 42, or differential bitmap 43 of the first embodiment and hence are not described here.

(3-2) Backup Copy Processing According to this Embodiment

The processing routine for backup copy processing according to this embodiment will be explained next.

(3-2-1) Primary Backup Copy Processing

Figure 20:
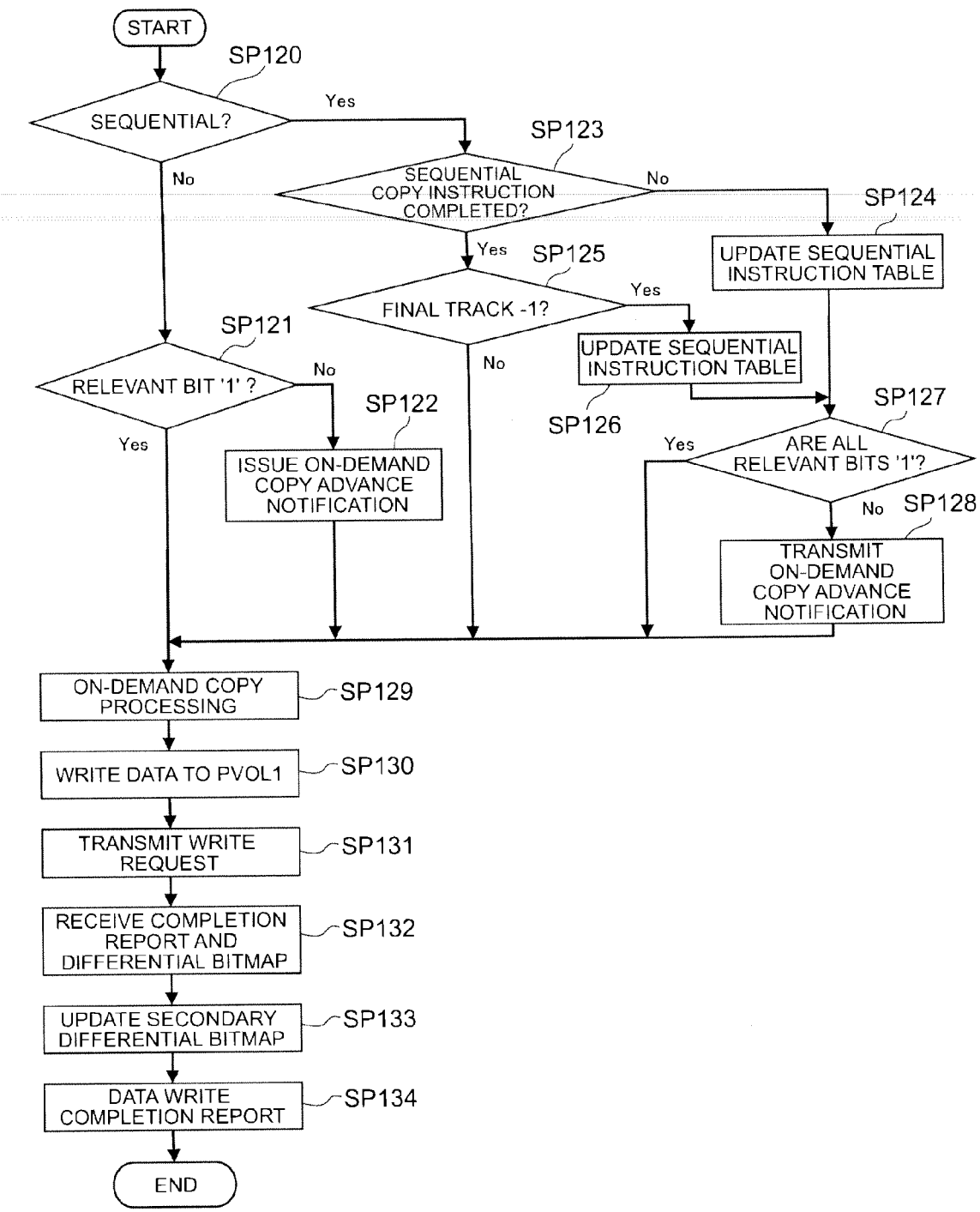
FIG. 20 is a flowchart showing the processing routine for primary backup copy processing according to the third embodiment.

FIG. 20 shows a processing routine for primary backup copy processing which is executed by a primary processor unit 63A of the primary storage apparatus 62A if, while a flashcopy is being executed by the primary storage apparatus 62A and the secondary storage apparatus 62B, a write request in which the data write destination is a logical track in the flashcopy target range is issued by the host apparatus 61 to the primary storage apparatus 62A.

In this case, upon receiving the write request from the host apparatus 61, the primary processor unit 63A refers to the sequential code embed position in the write request to determine whether or not the write request is a sequential write request (SP120).

Upon obtaining a negative result in this determination, the primary processor unit 63A refers to the write request, the volume information table 72 stored in the shared memory 13A, the pair information table 73, and the corresponding differential bitmap 74, and determines, based on the value of the corresponding bit in the differential bitmap 74, whether or not the flashcopy to the logical track in the secondary storage device 62B correspond to the logical track in the primary storage apparatus 62A specified by the LUN and track number designated in the write request (SP121).

Upon obtaining an affirmative result in this determination, the primary processor unit 63A advances to step SP129. However, upon obtaining a negative result in this determination, the primary processor unit 63A transmits the on-demand-copy advance notification 70 (FIG. 17) storing the LUN and track number designated in the write request to the secondary storage apparatus 62B (SP122). Note that the sequential information field 70C of the on-demand-copy advance notification 70 at this time stores '0', which indicates that the write request from the host apparatus 61 is a sequential write request.

Figure 15:
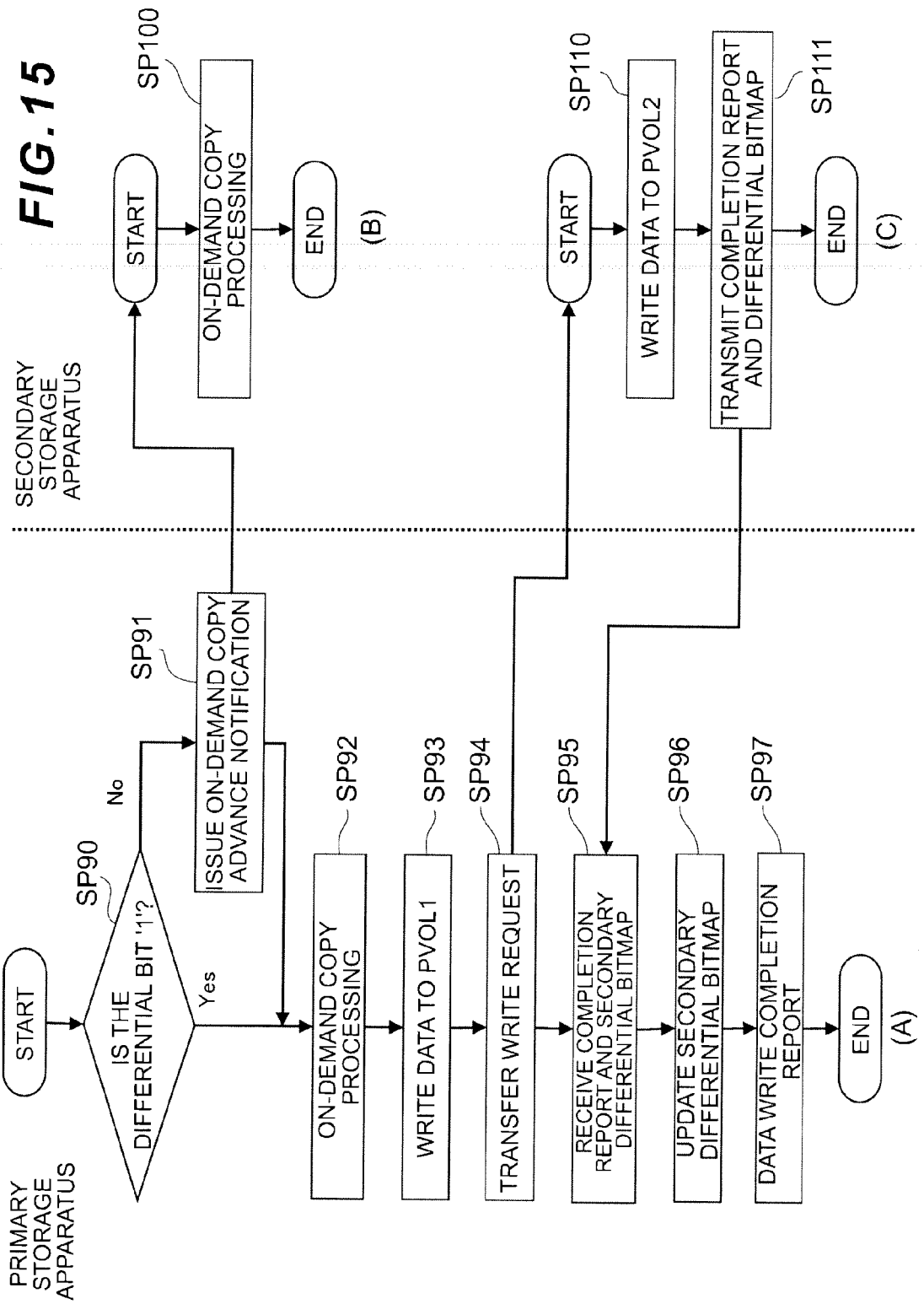
FIG. 15A is a flowchart showing a processing routine for primary backup copy processing according to the second embodiment.
FIG. 15B is a flowchart showing a processing routine for a secondary on-demand copy processing advance notification reception processing according to the second embodiment.

The primary processor 63A subsequently executes on-demand copy processing as necessary by processing the processing of steps SP129 to SP134 in the same way as the steps SP92 to SP97 in the primary backup copy processing according to the foregoing second embodiment in FIG. 15, writes write target data to the logical track in the primary storage apparatus 62A specified by the LUN and track number designated in the write request and subsequently terminates the primary backup copy processing.

However, upon obtaining an affiimative result in the determination of step SP120, the primary processor unit 63A refers to the sequential instruction table 71 (FIG. 18A) to determine whether or not the on-demand-copy advance notification 70 (FIG. 17) in which the sequential information is configured as '1' (FIG. 17) has been transmitted to the secondary storage apparatus 62A (SP123).

Furthermore, upon obtaining a negative result in this determination, the primary processor unit 63A determines the primary volume and the logical tracks (5 tracks' worth) in the primary volume with which the on-demand copy in the secondary storage apparatus 62B is to be executed and registers the determination result in the sequential instruction table 71 (SP124). More specifically, the primary processor unit 63A reserves one entry (row) in the sequential instruction table 71, stores the LUN designated in the write request in the volume number field 71A of this entry, and stores the track number designated in the write request in the write track number field 71B. Furthermore, the primary processor unit 63A stores a numerical value which is obtained by adding 4 to the track number stored in the write track number field 71B in the final value field 71C of this entry. The primary processor unit 63A subsequently advances to step SP127.

Furthermore, upon obtaining an affirmative result in the determination of step SP123, the primary processor unit 63A determines whether or not the track number designated in the write request is a track number which is one less than the track number of the last logical track among the plurality of logical tracks already subjected to the on-demand copy in the secondary storage apparatus 62B (SP125). More specifically, the primary processor unit 63A refers to the sequential designation table 71 to determine whether or not the track number of the logical track designated as the data write destination in the write request contains '1' less entry (row) than the track number which is stored in the final value field 71C.

Obtaining a negative result in this determination indicates that the current on-demand-copy advance notification 70 transmitted to the secondary storage apparatus 62B is unnecessary. Thus, the primary processor unit 63A then advances to step SP129 and subsequently, after processing steps SP129 to SP134, terminates the primary backup copy processing.

However, obtaining an affirmative result in the determination of step SP125 means that the sequential information of the current on-demand-copy advance notification 70 which is transmitted to the secondary storage apparatus 62B should be configured as '1'. Thus, the primary processor unit 63A then determines the primary volume which is to undergo execution of the on-demand copy in the secondary storage apparatus 62B volume and the logical tracks (5 tracks' worth) in the primary volume, and registers the determination result in the sequential instruction table 71 (SP126). More specifically, the primary processor unit 63A reserves one entry (row) in the sequential instruction table 71 and stores the LUN designated in the write request in the volume number field 71A of this entry and stores a numerical value, obtained by adding 2 to the track number designated in the write request, in the write track number field 71B. Further, the primary processor unit 63A stores a numerical value, obtained by adding 4 to the track number stored in the write track number field 71B, in the final value field 71C of this entry.

Subsequently, the primary processor unit 63A refers to the corresponding differential bitmap 74 transmitted from the secondary storage apparatus 62B as described earlier and determines whether or not, in this differential bitmap 74, the values of all the bits corresponding respectively to the five logical tracks in the secondary storage apparatus 62B determined as the logical tracks which are to undergo on-demand copy execution in step SP124 or SP126 are '1' (SP127).

Obtaining a negative result in this determination means that a flashcopy of the data stored in all five of these logical tracks has already been completed. Thus, at this time, the primary processor unit 63A advances to step S129 and, after processing steps S129 to SP134, terminates the primary backup copy processing.

However, obtaining an affirmative result in the determination of step SP127 indicates that a flashcopy of the data stored in at least one logical track among these five logical tracks has not been completed. Thus, at this point the primary processor unit 63A generates an on-demand-copy advance notification 70 (FIG. 17) according to the registered content that has been newly registered in the sequential instruction table 71 in step SP124 or SP126, and transmits the generated on-demand copy advance notification 70 to the secondary storage apparatus 62B (SP128). More specifically, the primary processor unit 63A stores the LUN and track number, stored in the volume number field 71A of the entry which is newly registered in the sequential instruction table 71 in step SP124 or SP126, in the write volume number field 70A (FIG. 17) and write track field 70B (FIG. 17) respectively, generates an on-demand-copy advance notification 70 which has '1' stored in the sequential information field 70C (FIG. 17), and transmits this notification to the secondary storage apparatus 62B.

Furthermore, the primary processor unit 63A subsequently processes steps SP129 to SP134 and then terminates the primary backup copy processing.

Figure 21:
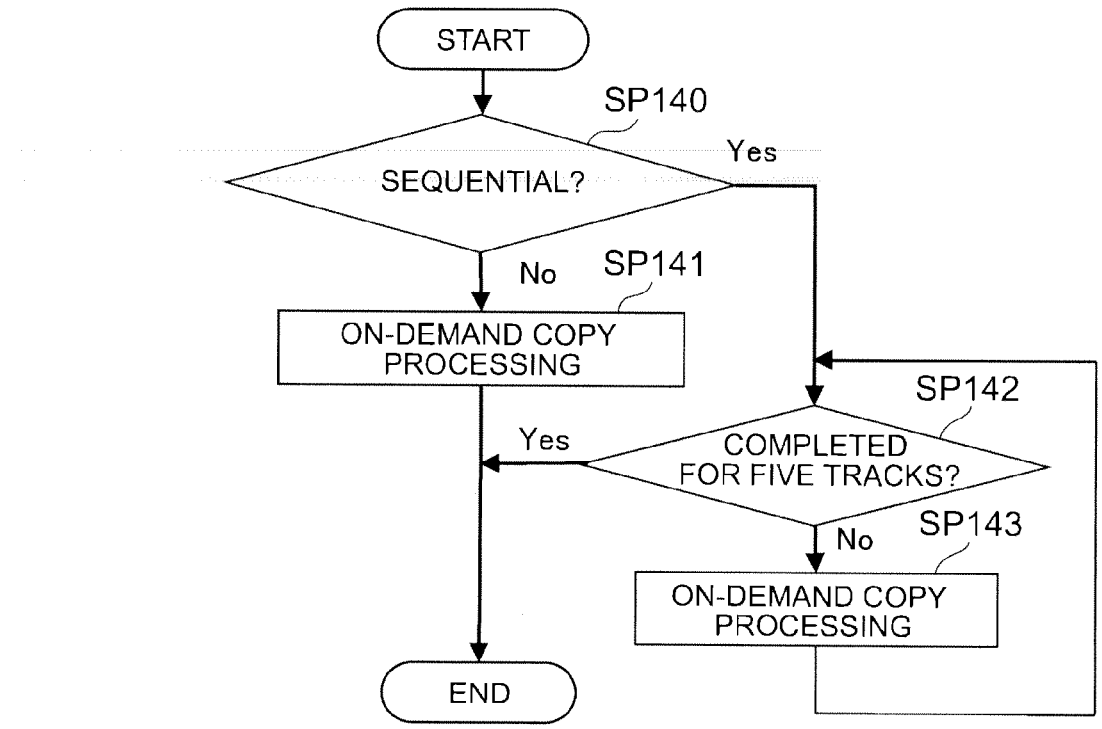
FIG. 21 is a flowchart showing the processing routine for secondary on-demand copy processing advance notification reception processing according to the third embodiment.

(3-2-2) Secondary On-demand Copy Processing Advance Notification Reception Processing and Secondary Write Processing Meanwhile, FIG. 21 shows a processing routine for on-demand copy processing advance notification reception processing (hereinafter called 'secondary on-demand copy processing advance notification reception processing') which is executed by the secondary processor unit 63B of the secondary storage apparatus 62B which receives the foregoing on-demand-copy advance notification 70 (FIG. 17) issued by the primary storage apparatus 62A in step SP128 of the foregoing primary backup copy processing (FIG. 20).

Upon receiving this on-demand-copy advance notification 70, the secondary processor unit 63B starts the secondary on-demand copy processing advance notification reception processing and first refers to the sequential information in the on-demand-copy advance notification 70 to determine whether or not the write request transmitted to the primary storage apparatus 62A by the host apparatus 61 is a sequential write request (SP140).

Upon obtaining a negative result in this determination, the secondary processor unit 63B executes the on-demand copy processing described earlier in FIG. 12 by targeting the logical track in the secondary storage apparatus 62B specified by the LUN and track number designated in the on-demand-copy advance notification 70 (SP141), and subsequently terminates the secondary on-demand copy processing advance notification reception processing.

However, upon obtaining an affirmative result in the determination of step SP140, the secondary processor unit 63B refers to the on-demand-copy advance notification 70, the volume information table 75 (FIG. 19A) stored in the shared memory 13B (FIG. 16), the pair information table 76 (FIG. 19B), and the corresponding differential bitmap 77 (FIG. 19C) to determine whether or not the values of all the bits, corresponding to the five consecutive logical tracks the first of which is the logical track in the secondary storage apparatus 62B specified by the LUN and track number designated in the on-demand-copy advance notification 70 in the differential bitmap 77 are '1' (SP142).

Obtaining an affirmative result in the determination of step SP142 indicates that a flashcopy of the data stored in these five logical tracks is already complete. The secondary processor unit 63B accordingly then terminates the secondary on-demand copy processing advance notification reception processing.

However, obtaining a negative result in the determination of step SP142 means that a flashcopy of at least one logical track among these five logical tracks has not been completed. Accordingly, the secondary processor 63B refers to the volume information table 75, the pair information table 76, and the corresponding differential bitmap 77, selects one logical track for which a flashcopy has not been completed among the five logical tracks and, after executing on-demand copy processing to copy (on-demand-copy) the data stored in the selected logical track to the corresponding secondary volume (SP143), returns to step SP142.

Furthermore, the secondary processor unit 63B subsequently executes the same processing for each logical track for which a flashcopy has not been completed (SP142-SP143-SP142), and terminates this on-demand copy processing upon obtaining an affirmative result in step SP142 as a result of completing a flashcopy or on-demand copy of these five logical tracks.

Figure 22:
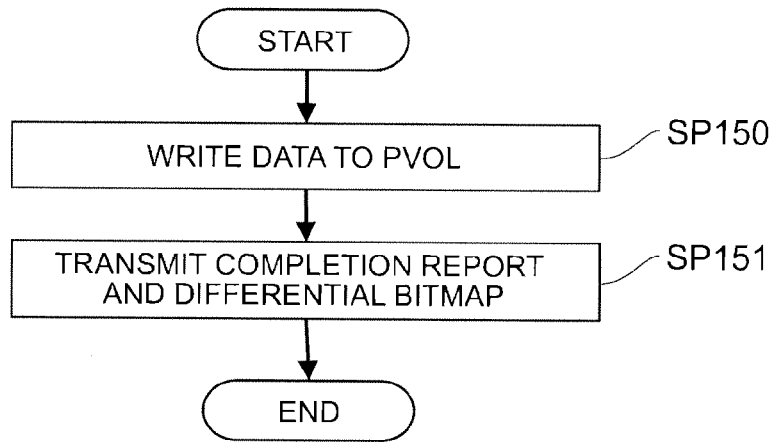
FIG. 22 is a flowchart showing a processing routine for secondary write processing according to the third embodiment.

Meanwhile, FIG. 22 shows a processing routine for secondary write processing which is executed by the secondary processor unit 63B of the secondary storage apparatus 62B which receives the foregoing write request issued by the primary storage apparatus 62A in step SP131 in the foregoing primary backup copy processing in FIG. 20.

Upon receiving this write request, the secondary processor unit 63B starts the secondary write processing and first writes the write target data transmitted from the primary storage apparatus 62A to the logical track in the secondary storage apparatus 62B specified by the LUN and track number designated in the write request (SP150).

Thereafter, the secondary processor unit 63B transmits a completion report to the effect that data write processing according to this write request is complete and a differential bitmap indicating the current progress state of the corresponding flashcopy being executed at the time to the primary storage apparatus 62A (SP151) and subsequently terminates the secondary write processing.

Note that, in this embodiment, when the secondary storage apparatus 62B transmits a completion report to the effect that the write processing according to the write request is complete to the previous-stage primary storage apparatus 62A as described earlier, the corresponding differential bitmap 77 of the secondary storage apparatus 62B is also transmitted together with the completion report to the primary storage apparatus 62A, but the secondary storage apparatus 62B may, for example, transmit the differential bitmap 77 to the previous-stage primary storage apparatus 62A at regular intervals by executing the processing of the foregoing primary differential bitmap update processing (FIG. 39A) and the secondary differential bitmap transmission processing (FIG. 39B).

(3-3) Effect of the Embodiment

With this embodiment, as described hereinabove, the on-demand-copy advance notification 70 from the primary storage apparatus 62A to the secondary storage apparatus 62B is transmitted only at the rate of one in five of the sequential write requests, and hence it is possible to prevent transmission of unnecessary on-demand-copy advance notifications 40 from the primary storage apparatus 51A to the secondary storage apparatus 51B to an even greater extent than the computer system 50 according to the second embodiment. Accordingly, in addition to the effects obtained by the computer system 1 according to the first embodiment, it is possible to implement a computer system that provides an effect whereby the network 4 can be more effectively utilized.

Figure 23:
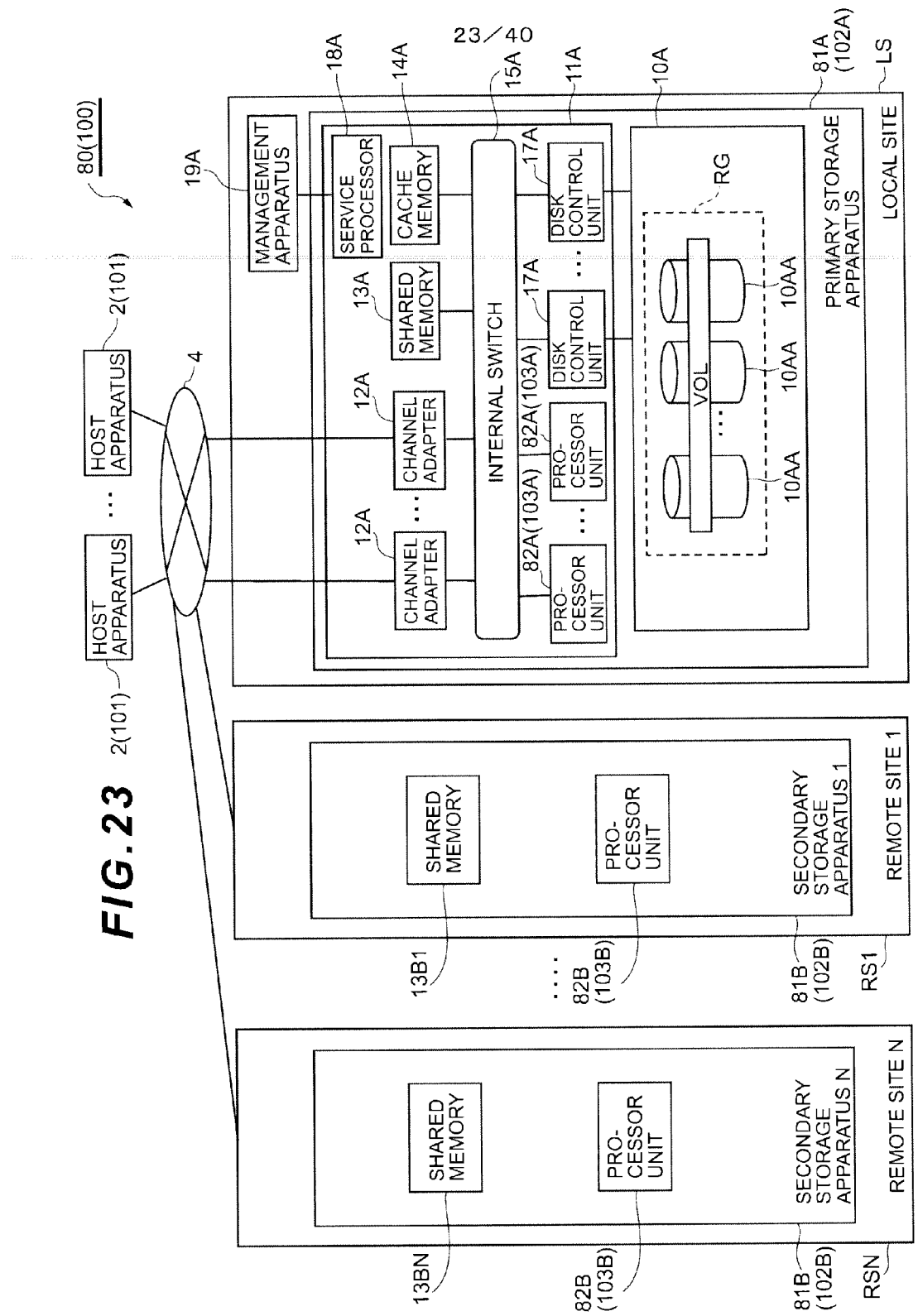
FIG. 23 is a block diagram showing the overall configuration of a computer system according to the fourth and fifth embodiments.

(4) Fourth Embodiment (4-1) Configuration of Computer System According to Fourth Embodiment FIG. 23, in which parts corresponding to those in FIG. 1 are shown with the same reference numerals assigned, shows a computer system according to the fourth embodiment. This computer system 80 is configured comprising a primary storage apparatus 81A which is installed in the local site LS and a plurality (hereinafter N) of secondary storage apparatuses 81B installed in different remote sites RS. Furthermore, the primary storage apparatus 81A and the plurality of secondary storage apparatuses 81B are physically connected via the network 4 as shown in FIG. 23 and logically cascade-connected as shown in FIG. 24.

Note that, in the following description, among the secondary storage apparatuses 81B respectively installed in each of the remote sites RS, the secondary storage apparatus 81B, which is cascade-connected to the primary storage apparatus 81A in the M (M=1, 2, . . . , N)th position, is sometimes called the 'Mth secondary storage apparatus 81BM. Furthermore, in the following description, the local site RS where the Mth secondary storage apparatus 81BM is installed is sometimes referred to as the Mth local site RSM.

Figure 24:
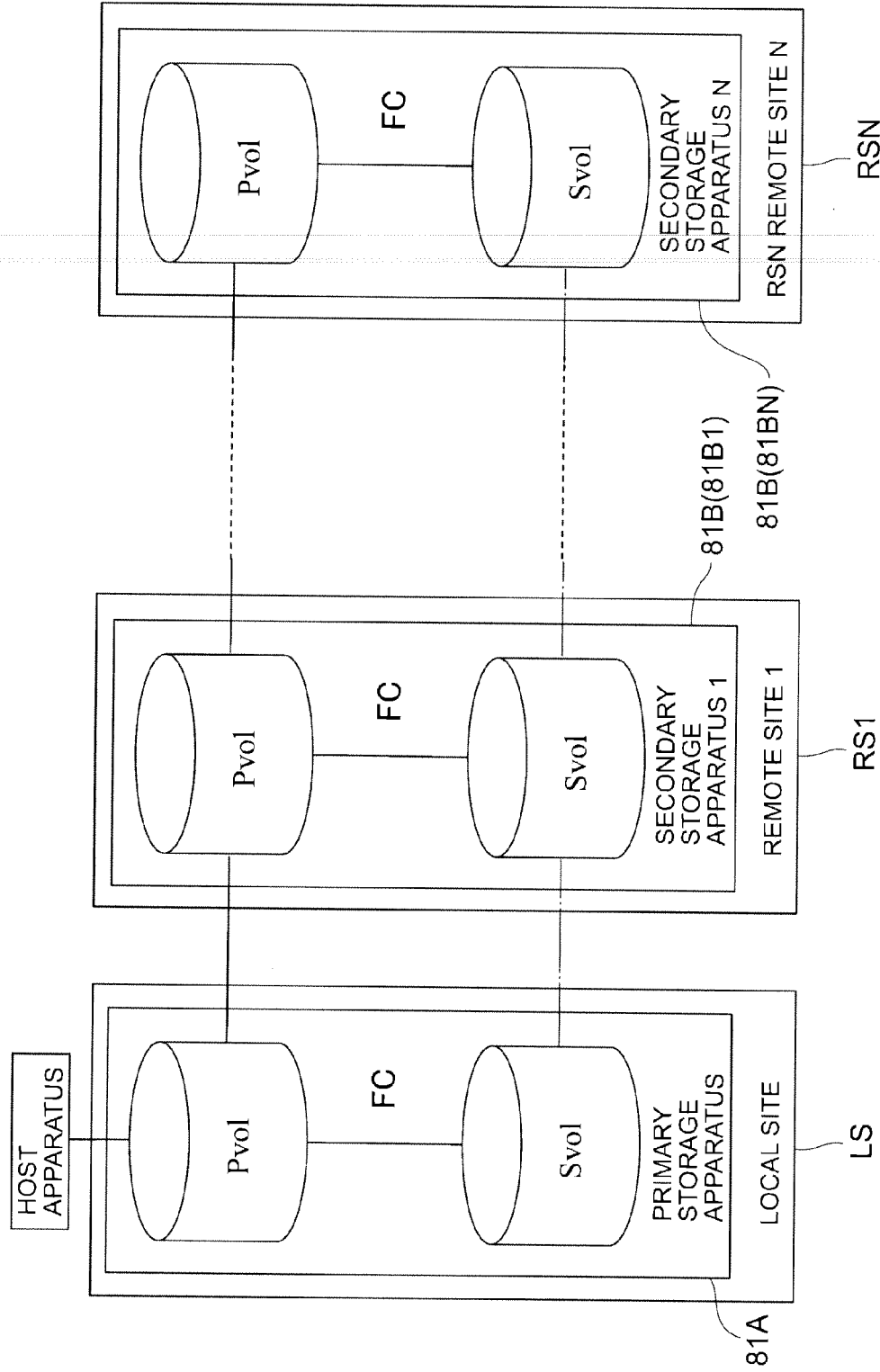
FIG. 24 is a conceptual view serving to illustrate a data backup method of the computer system according to the fourth embodiment.

In this computer system 80 according to this embodiment with the foregoing configuration, a remote copy function is built into the primary storage apparatus 81A and secondary storage apparatuses 81B respectively and, as shown in FIG. 24, a primary volume PVOL is provided in the primary storage apparatus 81A and secondary storage apparatuses 81B respectively. Furthermore, the primary volumes PVOL provided in each of the secondary storage apparatuses 81B are configured as sequential remote-copy copy pairs to the corresponding primary volume PVOL in the previous-stage primary storage apparatus 81A or secondary storage apparatus 81B respectively in the cascade-connection connection order.

However, in the following description, the same LUN as the primary volumes PVOL in the primary storage apparatus 81A are assigned to the primary volumes PVOL in each of the primary volumes PVOL in the primary storage apparatus 81A and in the secondary storage apparatuses 81B configured directly or indirectly as copy pairs as mentioned earlier. Furthermore, in a remote copy between secondary storage apparatuses 81B or between a primary storage apparatus 81A and secondary storage apparatus 81B, the data stored in the logical track in the copy-source primary volume PVOL is described as being copied to the logical track with the same track number as the track number of the logical track in the copy-destination primary volume PVOL (the logical track in the copy-source primary volume PVOL).

Accordingly, in this computer system 80, when the host apparatus 2 writes data to the primary volume PVOL in the primary storage apparatus 81A, in the same way as the case described earlier in FIG. 6, the data is remote-copied to the corresponding primary volume PVOL in a first secondary storage apparatus 81B1 and, subsequently, this data is sequentially remote-copied to the corresponding primary volume PVOL in each of the second secondary storage apparatus and the subsequent-stage secondary storage apparatuses 81B in the cascade-connection connection order. The same data as the data written to the primary volume PVOL in the primary storage apparatus 81A are backed up to each of the primary volumes PVOL in each of the secondary storage apparatuses 81B.

Furthermore, in the case of the computer system 80, a flashcopy function is installed in the primary storage apparatus 81A and each of the secondary storage apparatuses 81B respectively and, as shown in FIG. 24, secondary volumes SVOL which are configured as flashcopy copy pairs to the foregoing primary volumes PVOL in the same storage apparatus respectively are provided.

Further, when a flashcopy instruction designating the primary volume PVOL and the target range in the primary volume PVOL is supplied by the host apparatus 2, the primary storage apparatus 81A copies (remote-copies) the data stored in each of the logical tracks in the target range designated in the flashcopy instruction in the primary volume PVOL designated in the flashcopy instruction to the corresponding secondary volume SVOL.

Furthermore, the flashcopy instruction is transferred from the primary storage apparatus 81A to the first secondary storage apparatus 81B1. The first secondary storage apparatus 81B1 then, upon receiving the foregoing flashcopy instruction transmitted from the primary storage apparatus 81A, copies (flashcopies) the data stored respectively in each of the logical tracks in the range designated in the flashcopy instruction in the primary volume PVOL designated in the flashcopy instruction to the corresponding secondary volume SVOL in the same way as the primary storage apparatus 81A. In addition, the first secondary storage apparatus 81B1 transfers this flashcopy instruction to the second secondary storage apparatus. The same processing is also executed for the second secondary storage apparatus and each of the secondary storage apparatuses 81B in a subsequent stage to the second secondary storage apparatus.

Accordingly, the data stored in each of the logical tracks which are to be targeted in the primary volume PVOL of the primary storage apparatus 81A designated in the flashcopy instruction is backed up to the secondary volume SVOL configured as a flashcopy copy pair to the primary volume PVOL, and the same data as this data is also backed up to the corresponding secondary volumes SVOL in each of the secondary storage apparatuses 81B.

In addition to the foregoing configuration, in the case of this computer system 80, the secondary storage apparatuses 81B each suitably transmit a differential bitmap representing the flashcopy progress state to the previous-stage primary storage apparatus 81A or secondary storage apparatus 81B while executing a flashcopy.

Furthermore, upon receiving the foregoing differential bitmap transmitted from the subsequent-stage secondary storage apparatuses 81B, the secondary storage apparatuses 81B each transfer this differential bitmap to the previous-stage primary storage apparatus 81A or secondary storage apparatus 81B, while storing the differential bitmap in the shared memory 13A, 13B in their own storage apparatuses.

Therefore, in the case of this computer system 80, the primary storage apparatus 81A and each of the secondary storage apparatuses 81B save, in addition to the differential bitmaps for managing flash copies executed in their own storage apparatuses, differential bitmaps which represent flashcopy progress states being executed by the secondary storage apparatus 81B, for all the secondary storage apparatuses 81B located in a subsequent cascade-connection stage.

Furthermore, the primary storage apparatus 81A subsequently refers to the differential bitmaps for each of the secondary storage apparatuses 81B which are saved as described earlier in cases where a write request, in which the data write destination is a logical track in the target range of the flashcopy being executed in the primary storage apparatus 81A and each of the secondary storage apparatuses 81B, is supplied from the host apparatus 2, and thus determines whether or not there is a secondary storage apparatus 81B for which the flashcopy to the logical track designated in the write request has not been completed, and if an affirmative result is obtained, the primary storage apparatus 81A transmits the on-demand-copy advance notification 40 described earlier in FIG. 7 to the first secondary storage apparatus 81B1.

If the flashcopy to a logical track in the first secondary storage apparatus 81B1 specified by the LUN and track number designated in the on-demand-copy advance notification 40 has not been completed, the first secondary storage apparatus 81B1 immediately copies (on-demand-copies) the data stored in the logical track to the corresponding secondary volume SVOL.

In addition, the first secondary storage apparatus 81B1 refers to the differential bitmap of each of the secondary storage apparatuses 81B at a subsequent-stage to its own storage apparatus and held in the shared memory 13B as mentioned earlier and, if, in at least one secondary storage apparatus 81B among these secondary storage apparatuses 81B, the flashcopy to the logical track in the secondary storage apparatus 81B which is specified by the LUN and track number designated in the on-demand-copy advance notification 40 has not been completed, the first secondary storage apparatus 81B1 transfers the on-demand-copy advance notification 40 to a second secondary storage apparatus 81B2.

Furthermore, the second secondary storage apparatus 81B2 and each of the subsequent-stage secondary storage apparatuses 81B also execute the same processing as the first secondary storage apparatus. If, as a result of this processing, a write request, in which the data write destination is a logical track in the target range of the flashcopy being executed in the primary storage apparatus 81A and each of the secondary storage apparatuses 81B, is supplied from the host apparatus 2 to the primary storage apparatus 81A, an on-demand copy of data stored in the logical track is executed in all the secondary storage apparatuses 81B for which a flashcopy to the logical track of the track number designated in the write request in the primary volume to which the LUN designated in the write request is assigned has not been completed.

Figure 25:
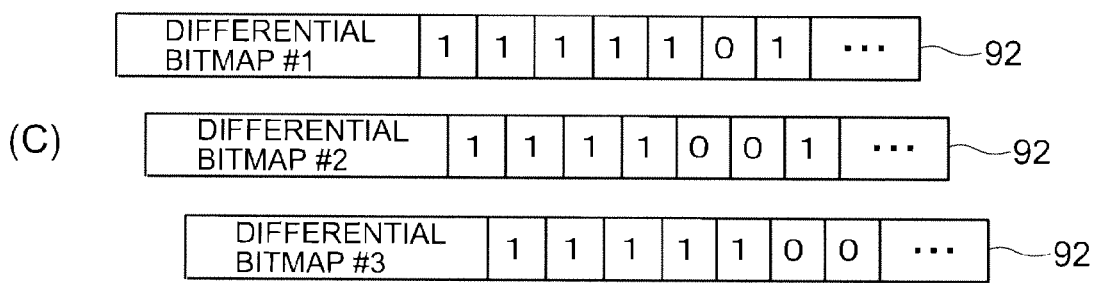
FIG. 25A is a conceptual view of the configuration of the volume information table held by the primary storage apparatus according to the fourth embodiment.
FIG. 25B is a conceptual view of the configuration of the pair information table held by the primary storage apparatus.
FIG. 25C is a conceptual view of the configuration of the differential bitmap held by the primary storage apparatus.

As means for implementing the backup copy method according to this embodiment described above, the shared memory 13A of the primary storage apparatus 81A stores a volume information table 90, shown in FIG. 25A, a pair information table 91, shown in FIG. 25B, and a plurality of differential bitmaps 92, shown in FIG. 25C.

The volume information table 90 is the same as the volume information table 53 according to the second embodiment (FIG. 13A) and hence a detailed description thereof is not included.

The pair information table 91 is a table used to manage copy pairs configured in the primary storage apparatus 81A and copy pairs in each of the subsequent-stage secondary storage apparatuses 81B corresponding to these copy pairs. Note that, 'copy pairs in each of the subsequent-stage secondary storage apparatuses 81B corresponding to the copy pairs in the primary storage apparatus 81A' denote copy pairs, among the copy pairs configured in the subsequent-stage secondary storage apparatus 81B, in which the flashcopy copy source is the primary volume in the subsequent-stage secondary storage apparatus 81B to which data written to the primary volume forming the copy pair in the primary storage apparatus 81A is directly or indirectly remote-copied.

This pair information table 91 is configured, as shown in FIG. 25B, from a pair number field 91A, a primary volume number field 91B, a secondary volume number field 91C, a primary bitmap number field 91D, and a plurality of secondary bitmap number fields 91E which are provided to correspond to each of the secondary storage apparatuses 81B in a subsequent-stage to their storage apparatus.

Furthermore, the pair number field 91A, primary volume number field 91B, secondary volume number field 91C, and primary bitmap number field 91D store the same information as the information stored in the corresponding fields of the pair information table 54 (FIG. 13B) according to the second embodiment (the pair number field 54A, the primary volume number field 54B, the secondary volume number field 54C, or the primary bitmap number field 54D).

In addition, the secondary bitmap number fields 91E each store bitmap numbers of the differential bitmaps 92 transmitted from the secondary storage apparatuses 81B for the corresponding copy pairs provided in the secondary storage apparatuses 81B corresponding to these secondary bitmap number fields 91E.

Therefore, for example, in FIG. 25B, it can be seen that the bitmap number of the differential bitmap 92 associated with the copy pair with pair number '1', in which the primary volume is the logical volume with the volume number '0' in the primary storage apparatus 81A holding the pair information table 91 and the secondary volume is the logical volume with the volume number '2', is '1', and that the bitmap numbers of the differential bitmaps 92 which are transmitted from each of the secondary storage apparatuses 81B for the copy pairs corresponding to the copy pairs in each of the secondary storage apparatuses 81B at a subsequent stage to the primary storage apparatus 81A (the first secondary storage apparatus 81B1, . . . , Nth secondary storage apparatus 81N) are '100', . . . , '200' respectively.

The differential bitmaps 92 all have the same configuration as the differential bitmaps 55 according to the second embodiment (FIG. 13C). However, in the case of this embodiment, as described earlier, the primary storage apparatus 81A also holds differential bitmaps 92 representing the progress states of flash copies being executed in each of the secondary storage apparatuses 81B.

Figure 26:
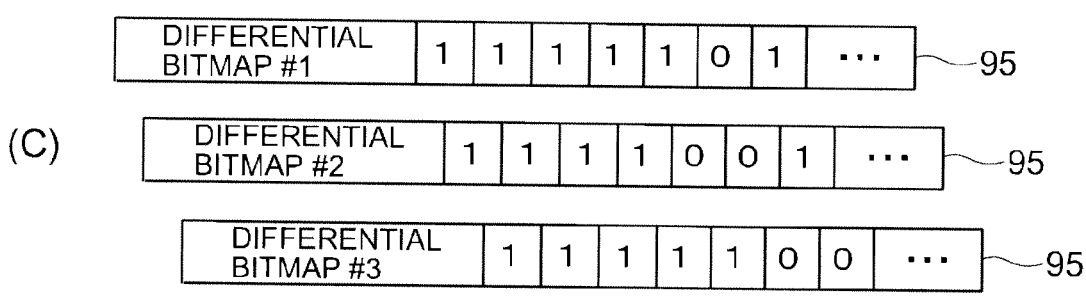
FIG. 26A is a conceptual view of the configuration of the volume information table held by a secondary storage apparatus other than that in the final stage of a cascade connection according to the fourth embodiment.
FIG. 26B is a conceptual view of the configuration of the pair information table held by the secondary storage apparatus.
FIG. 26C is a conceptual view of the configuration of a differential bitmap held by the secondary storage apparatus.

Meanwhile, the shared memory 13B (FIG. 23) in each of the secondary storage apparatuses 81B other than the secondary storage apparatus 81B (Nth secondary storage apparatus 81BN) in the final cascade-connection stage stores a volume information table 93 shown in FIG. 26A, a pair information table 94 shown in FIG. 26B, and a plurality of differential bitmaps 95, shown in FIG. 26C. Note that FIG. 26 shows an example of the configuration of the volume information table 93, the pair information table 94, and the differential bitmaps 95 held by the primary storage apparatus 81A and the Mth cascade-connected secondary storage apparatus 81B (Mth secondary storage apparatus 81BM).

The volume information table 93 is the same as the volume information table 56 (FIG. 14A) according to the second embodiment and hence a detailed description is not included.

The pair information table 94 is a table which is used to manage the copy pair configured in the Mth storage apparatus 81BM and the copy pairs in each of the subsequent-stage secondary storage apparatuses 81B corresponding to these copy pairs and, as shown in FIG. 26B, is configured from a pair number field 94A, a primary volume number field 94B, a secondary volume number field 94C, an own storage bitmap number field 94D, and a plurality of subsequent-stage storage bitmap number fields 94E which are provided to correspond to each of the subsequent-stage secondary storage apparatuses 81B.

Furthermore, the pair number field 94A, primary volume number field 94B, secondary volume number field 94C, and own storage bitmap number field 94D store the same information as the information stored in the corresponding fields of the pair information table 57 according to the second embodiment (FIG. 14B) (the pair number field 57A, primary volume number field 57B, secondary volume number field 57C, or bitmap number field 57D).

In addition, each of the subsequent-stage storage bitmap number fields 94E stores the bitmap numbers of the differential bitmaps 95 which represent the progress states of the flash copies being executed in the corresponding copy pairs provided in the secondary storage apparatuses 81B and transmitted from the corresponding secondary storage apparatuses 81B.

Therefore, in FIG. 26B, for example, it can seen that the bitmap number of the differential bitmap 95 associated with the copy pair with the pair number '2', in which the logical volume with the volume number '5' in the Mth secondary storage apparatus 81BM is the primary volume and the logical volume with the volume number '8' is the secondary volume, is '2', and that the bitmap numbers of the differential bitmaps 95 representing the progress states of the flash copies executed in the corresponding copy pairs in each of the secondary storage apparatuses 81B ((M+1)th secondary storage apparatus 81BM (M+1), . . . , the Nth secondary storage apparatus 81BN) in a subsequent stage to the Mth secondary storage apparatus 81BM are '100', . . . , '200'.

The differential bitmaps 95 all have the same configuration as the differential bitmap 58 according to the second embodiment (FIG. 14C). However, in the case of this embodiment, as described earlier, the secondary storage apparatus 81B also holds differential bitmaps 95 representing the progress states of flash copies being executed in each of the subsequent-stage secondary storage apparatuses 81B.

Figure 27:
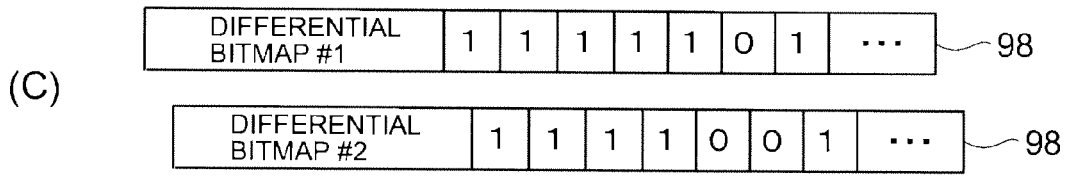
FIG. 27A is a conceptual view of the configuration of a volume information table held by the secondary storage apparatus in the final cascade-connection stage according to the fourth embodiment.
FIG. 27B is a conceptual view of the configuration of a pair information table held by the secondary storage apparatus.
FIG. 27C is a conceptual view of the configuration of a differential bitmap held by the secondary storage apparatus.

Meanwhile, the shared memory 13B (FIG. 23) in the final cascade-connection stage secondary storage apparatus 81B (the Nth secondary storage apparatus 81BN) stores a volume information table 96, shown in FIG. 27A, a pair information table 97, shown in FIG. 27B, and one or more differential bitmaps 98, shown in FIG. 27C.

The volume information table 96 is the same as the volume information table 56 (FIG. 14A) according to the second embodiment and hence a detailed description thereof is not included.

The pair information table 97 is a table which is used to manage the copy pair configured in the Nth storage apparatus 81BN and, as shown in FIG. 27B, is configured from a pair number field 97A, a primary volume number field 97B, a secondary volume number field 97C, and an own storage bitmap number field 97D.

Furthermore, the pair number field 97A, the primary volume number field 97B, the secondary volume number field 97C, and own storage bitmap number field 97D store the same information as the information stored in the corresponding fields of the pair information table 57 according to the second embodiment (FIG. 14B) (the pair number field 57A, primary volume number field 57B, secondary volume number field 57C, or bitmap number field 57D).

Therefore, in FIG. 27B, for example, it can seen that the bitmap number of the differential bitmap 98 which represents the progress state of the flashcopy being executed in the copy pair with the pair number '1', in which the logical volume with the volume number '0' in the Nth storage apparatus 81BN is the primary volume and the logical volume with the volume number '2' is the secondary volume, is '1'.

The differential bitmaps 98 all have the same configuration as the differential bitmap 58 according to the second embodiment (FIG. 14C) and hence a detailed description thereof is not included.

Figure 28:
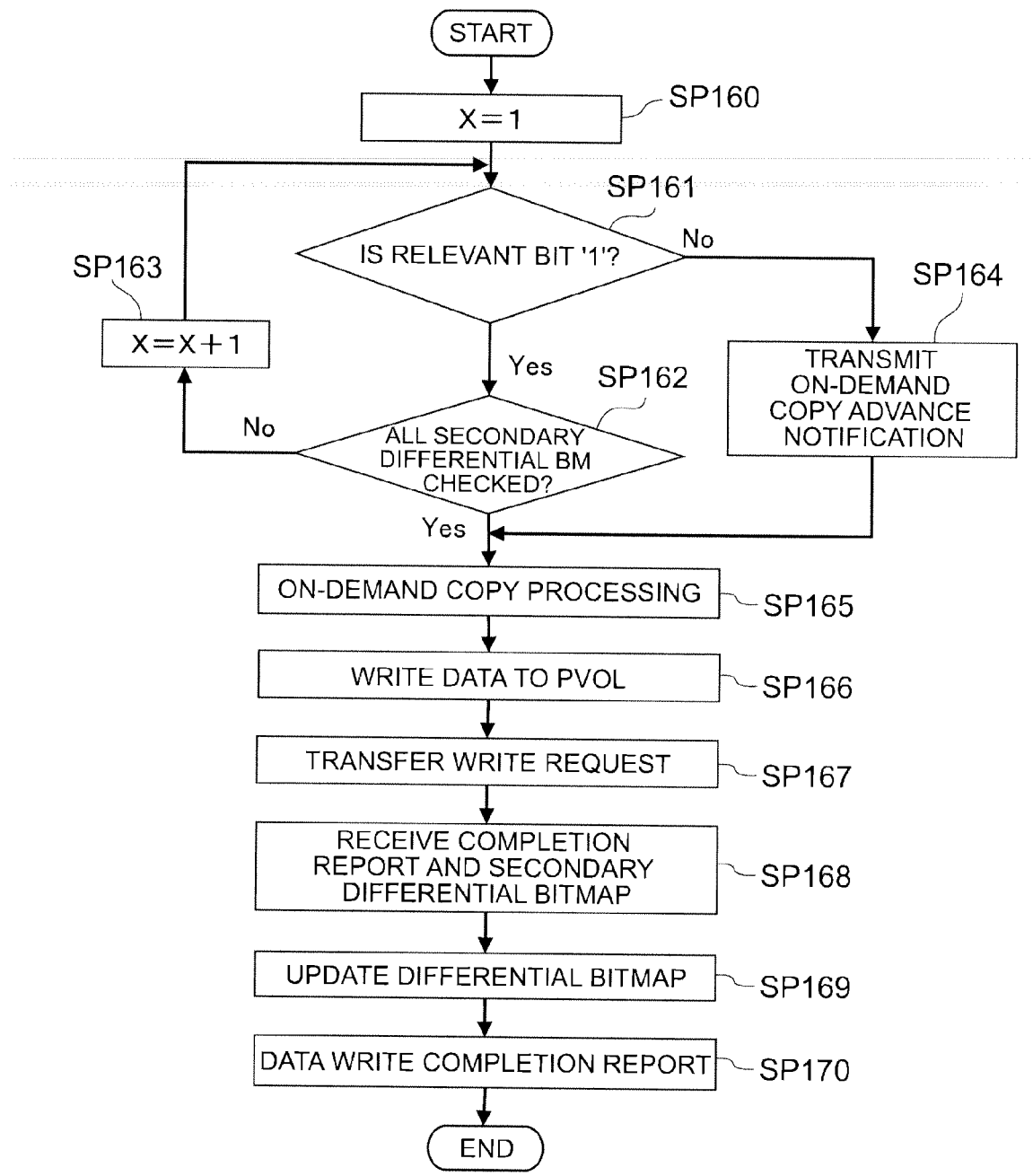
FIG. 28 is a flowchart showing a processing routine for a primary backup copy processing according to the fourth embodiment.

(4-2) Backup Copy Processing According to this Embodiment (4-2-1) Primary Backup Copy Processing A processing routine for the backup copy processing according to this embodiment will be explained next. FIG. 28 shows a processing routine for primary backup copy processing which is executed by a primary processor unit 82A (FIG. 23) of the primary storage apparatus 81A in cases where a write request, in which the data write destination is a logical track in the flashcopy target range while flashcopy processing (FIG. 10) is being executed in the primary storage apparatus 81A and each of the secondary storage apparatuses 81B, is issued to the primary storage apparatus 81A by the host apparatus 2.

In this case, upon receiving this write request from the host apparatus 2, the primary processor unit 82A starts the primary backup copy processing and configures (initializes) a parameter x, which indicates in which position of the cascade connection the secondary storage apparatus 81B targeted at this time is connected to the primary storage apparatus 81A, as '1' (SP160). Hence, if x is '1', for example, the secondary storage apparatus 81B targeted at the time is the first secondary storage apparatus 81B1 and, if x is '2', the secondary storage apparatus 81B being targeted is the second secondary storage apparatus 81B2.

The primary processor unit 82A subsequently refers to the write request, the volume information table 90 stored in the shared memory 13A, the pair information table 91, and the corresponding differential bitmap 92, and determines whether or not, in the differential bitmap 92 corresponding to the secondary storage apparatus 81B being targeted, the bit corresponding to the logical track in the secondary storage apparatus 81B specified by the LUN and the track number designated in the write request is '1' (SP161).

Obtaining a negative result in this determination means that a flashcopy to the logical track specified by the LUN and track number designated in the write request in the secondary storage apparatus 81B being targeted has not been completed. Accordingly, the primary processor unit 82A at the time transmits the on-demand-copy advance notification 40 storing the LUN and track number designated in the write request to the first secondary storage apparatus 81B (SP164) and subsequently advances to step SP165.

However, obtaining an affirmative result in the determination of step SP161 indicates that a flashcopy to the logical track specified by the LUN and track number designated in the write request in the secondary storage apparatus 81B being targeted is already complete. Accordingly, at this point, the primary processor unit 82A determines whether or not the processing of step SP161 has been executed for all the secondary storage apparatuses 81B (SP162).

Upon obtaining a negative result in this determination, the primary processor unit 82A increments parameter x (adds one to the value of x) (SP163) and then returns to step SP161. The primary processor unit 82A subsequently repeats the same processing (SP161 to SP163 and then SP161).

Furthermore, if the primary processor unit 82A finishes executing the processing of SP161 to SP163 for all the secondary storage apparatuses 81B without obtaining an affirmative result in step SP161 (that is, the flashcopy to the logical track specified by the LUN and track number designated in the write request is completed for all the secondary storage apparatuses 81B), the primary processor unit 82A advances to step SP165.

Further, the primary processor unit 63A subsequently executes on-demand copy processing as necessary by processing the processing of steps SP165 to SP170 in the same way as the steps SP92 to SP97 of the primary backup copy processing according to the foregoing second embodiment in FIG. 15, and writes the write target data to the logical track in the primary storage apparatus 81A specified by the LUN and track number designated in the write request. The primary processor unit 63A subsequently ends the primary backup copy processing.

Figure 29:
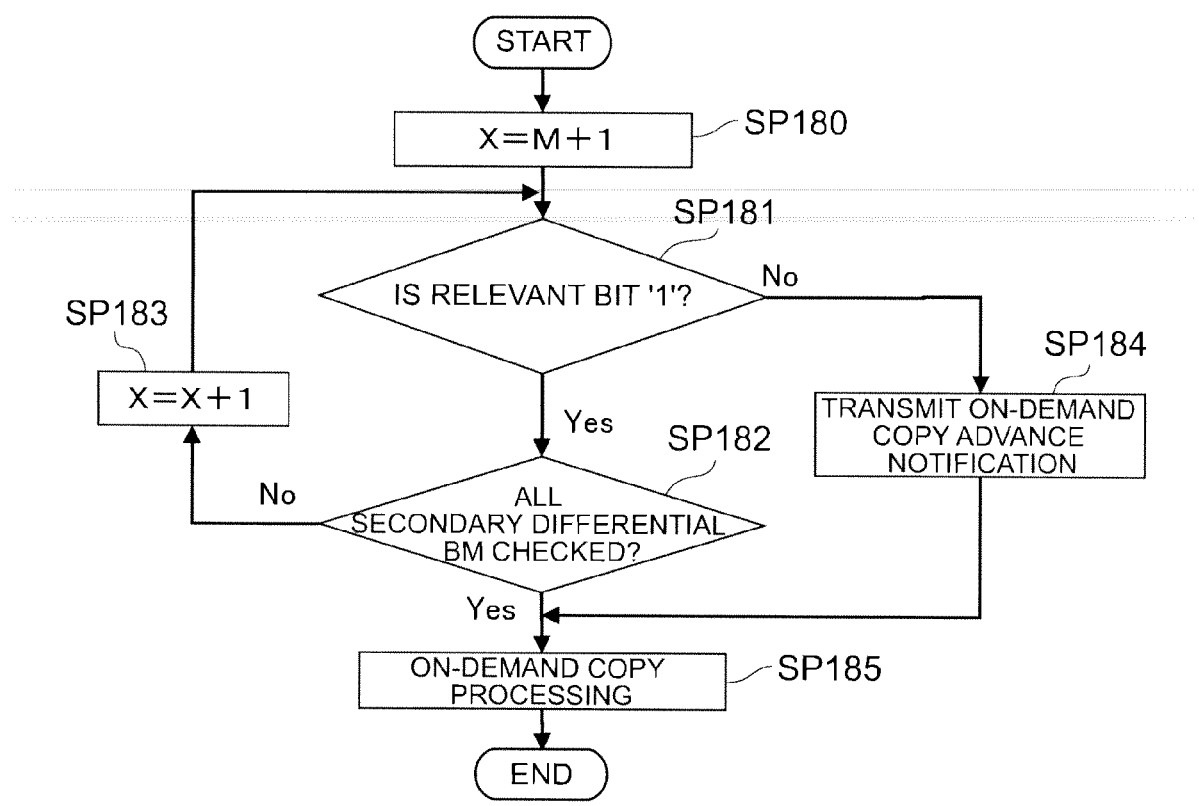
FIG. 29 is a flowchart showing a processing routine for first secondary on-demand copy processing advance notification reception processing according to the fourth embodiment.

(4-2-2) Secondary On-demand Copy Processing Advance Notification Reception Processing and Secondary Write Processing According to this Embodiment Meanwhile, FIG. 29 shows a processing routine for the first secondary on-demand copy processing advance notification reception processing which is executed by a secondary processor unit 82B (FIG. 23) of the Mth storage apparatus 81BM (M=1, 2, . . . , N−1) which receives the foregoing on-demand-copy advance notification 40 (FIG. 7) issued by the primary storage apparatus 81A or the previous-stage secondary storage apparatus 81B.

Upon receiving the on-demand-copy advance notification 40, the secondary processor unit 82B starts the first secondary on-demand copy processing advance notification reception processing and first configures (initializes) parameter x, which indicates in which position of the cascade connection the secondary storage apparatus 81B being targeted is connected to the primary storage apparatus 81A, as 'M+1' (SP180). Hence, if x is 'M+1', for example, the secondary storage apparatus 81B targeted at the time is the (M+1)th secondary storage apparatus 81B (M+1) and, if x is 'M+2', the secondary storage apparatus 81B being targeted is the (M+2)th secondary storage apparatus 81B (M+2).

The secondary processor unit 82B subsequently refers to the on-demand-copy advance notification 40, the volume information table 93 stored in the shared memory 13B, the pair information table 94, and the corresponding differential bitmap 95, and determines whether or not, in the differential bitmap 95 corresponding to the secondary storage apparatus 81B being targeted, the bit corresponding to the logical track designated as the write destination in the primary volume designated as the data write destination in the on-demand-copy advance notification 40 is '1' (SP181).

Obtaining a negative result in this determination means that a flashcopy to the logical track specified by the LUN and track number designated in the on-demand-copy advance notification 40 in the secondary storage apparatus 81B being targeted has not been completed. Accordingly, the secondary processor unit 82B at the time transmits the on-demand-copy advance notification 40 transmitted from the previous-stage primary storage apparatus 81A or the secondary storage apparatus 81B to the subsequent-stage secondary storage apparatus 81B (SP184) and subsequently advances to step SP185.

However, obtaining an affirmative result in the determination of step SP181 indicates that a flashcopy to the logical track specified by the LUN and track number designated in the on-demand-copy advance notification 40 in the secondary storage apparatus 81B being targeted is already complete. Accordingly, at this point, the secondary processor unit 82B determines whether or not the processing of step SP181 has been executed for all the secondary storage apparatuses 81B in a subsequent stage to its own storage apparatus (SP182).

Upon obtaining a negative result in this determination, the secondary processor unit 82B increments parameter x (adds one to the value of x) (SP183) and then returns to step SP181. The secondary processor unit 82B subsequently repeats the same processing (SP181 to SP183 and then SP181).

Furthermore, if the secondary processor unit 82B finishes executing the processing of SP181 to SP183 for all the secondary storage apparatuses 81B without obtaining an affirmative result in step SP181 (that is, the flashcopy to the logical track specified by the LUN and track number designated in the write request is completed for all the secondary storage apparatuses 81B in a subsequent stage to its own storage apparatus), the secondary processor unit 82B advances to step SP185.

The secondary processor unit 82B subsequently executes the foregoing on-demand copy processing in FIG. 12 (SP185), and subsequently ends the first secondary on-demand copy processing advance notification reception processing.

Figure 30:
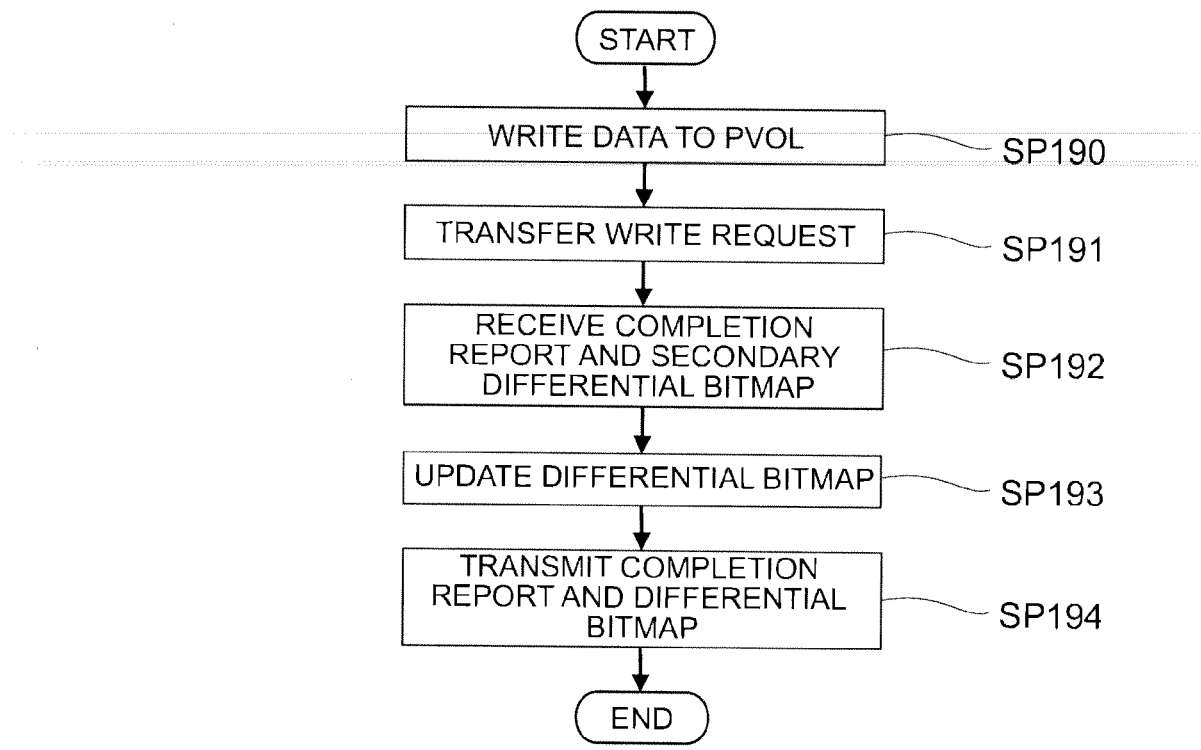
FIG. 30 is a flowchart showing a processing routine for a first secondary write processing according to the fourth embodiment.

However, FIG. 30 shows a processing routine for secondary write processing which is executed by the secondary processor unit 82B of the secondary storage apparatus 81B, which receives the write request transferred from the primary storage apparatus 81A in step SP167 of the foregoing primary backup copy processing in FIG. 28 and the write requests transferred sequentially via each of the previous-stage secondary storage apparatuses 81B. Note that FIG. 30 is a processing routine for first secondary write processing which is executed by the secondary processor unit 82B of the secondary storage apparatus 81B (Mth secondary storage apparatus 81BM) which is cascade-connected in the M (M=1, 2, . . . , N−1)th position to the primary storage apparatus 81A.

In this case, upon receiving this write request which is transferred from a previous-stage primary storage apparatus 81A or secondary storage apparatus 81B, the secondary processor unit 82B starts the first secondary write processing, first writes the write target data supplied together with the write request to the logical track in the secondary storage apparatus 81B specified by the LUN and track number designated in the write request (SP190) and subsequently transfers the write request and write target data to the subsequent-stage secondary storage apparatus 81B (SP191).

The secondary processor unit 82B subsequently awaits transmission of the completion report, described subsequently, and data of the differential bitmap 95 (FIG. 26C or FIG. 27C) from the subsequent-stage secondary storage apparatus 81B.

Furthermore, when the completion report and data of the differential bitmap 95 have already been received (SP192), the secondary processor unit 82B copies the differential bitmap and updates the differential bitmaps 95 corresponding to the secondary storage apparatuses 81B saved thus far (SP193).

The secondary processor unit 82B subsequently transmits the data write completion report to the effect that data write processing according to the write request is complete, the differential bitmap 95 for managing the progress states of the corresponding flashcopies being executed by its own storage apparatus, and all the differential bitmaps 95 received in step S192 to the previous-stage primary storage apparatus 81A and secondary storage apparatuses 81B (SP194), and then terminates the first secondary write processing.

Figure 31:
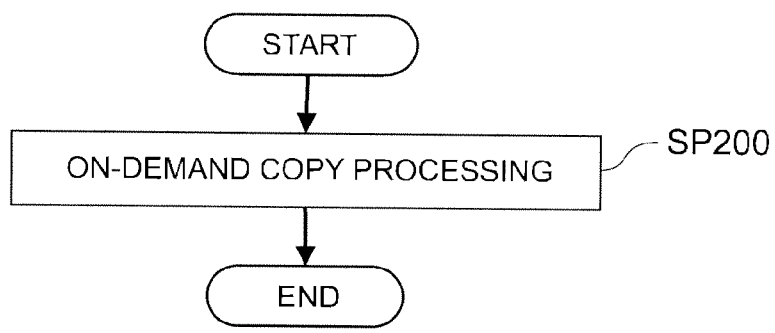
FIG. 31 is a flowchart showing a processing routine for a second secondary on-demand copy processing advance notification reception processing according to the fourth embodiment.

Meanwhile, FIG. 31 shows a processing routine for second secondary on-demand copy processing advance notification reception processing which is executed by the secondary processor unit 82B (FIG. 23) of the final-stage secondary storage apparatus 81B (the Nth secondary storage apparatus 81BN) which receives the foregoing on-demand-copy advance notification 40 (FIG. 7) transferred from the previous-stage secondary storage apparatus 81B.

Upon receiving this on-demand-copy advance notification 40, the secondary processor unit 82B starts the second secondary on-demand copy processing advance notification reception processing and executes an on-demand copy according to the on-demand-copy advance notification 40 by executing the on-demand copy processing described earlier in FIG. 12 (SP200), and then terminates the second secondary on-demand copy processing advance notification reception processing.

Figure 32:
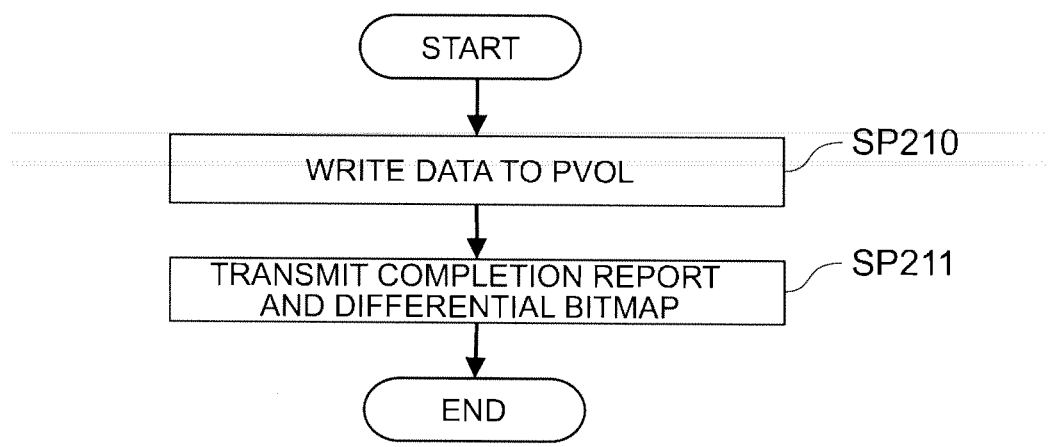
FIG. 32 is a flowchart showing a processing routine for a second secondary write processing according to the fourth embodiment.

However, FIG. 32 shows a processing routine for second secondary write processing which is executed by the secondary processor unit 82B of the final-stage secondary storage apparatus 81B (Nth secondary storage apparatus 81BN) which receives the write requests transferred sequentially via each of the previous-stage secondary storage apparatuses 81B after being transferred from the primary storage apparatus 81A in step SP167 of the primary backup copy processing described earlier in FIG. 28.

In this case, upon receiving a write request from the previous-stage secondary storage apparatus 81B, the secondary processor unit 82B starts this write processing, and first writes the write target data supplied together with the write request (that is, the data written to the corresponding primary volume in the primary storage apparatus 81A by the host apparatus 2) to the logical track in the relevant secondary storage apparatus 81B specified by the LUN and track number designated in the write request (SP210).

The secondary processor unit 82B subsequently transmits a completion report to the effect that the data write processing according to the write request is complete and the differential bitmap 98 for managing the progress states of the corresponding flashcopy being executed in its own storage apparatus to the previous-stage secondary storage apparatus 81B ((N−1)th secondary storage apparatus 81B (N−1)) (SP211), and subsequently terminates the second secondary write processing.

Note that, in this embodiment, when each secondary storage apparatus 81B transmits a completion report to the effect that the write processing according to the write request is complete to the previous-stage primary storage apparatus 81A or the previous-stage secondary storage apparatus 81B as described earlier, the corresponding differential bitmap 95, 98 of the secondary storage apparatus 81B and the differential bitmap 95, 98 which is transferred from the subsequent-stage secondary storage apparatus 102B are transmitted together with the completion report to the primary storage apparatus 81A or the secondary storage apparatus 81B, but each secondary storage apparatus 81B may, for example, transmit the differential bitmap 95, 98 to the previous-stage primary storage apparatus 81A or the previous-stage secondary storage apparatus 81B at regular intervals.

Figure 40:
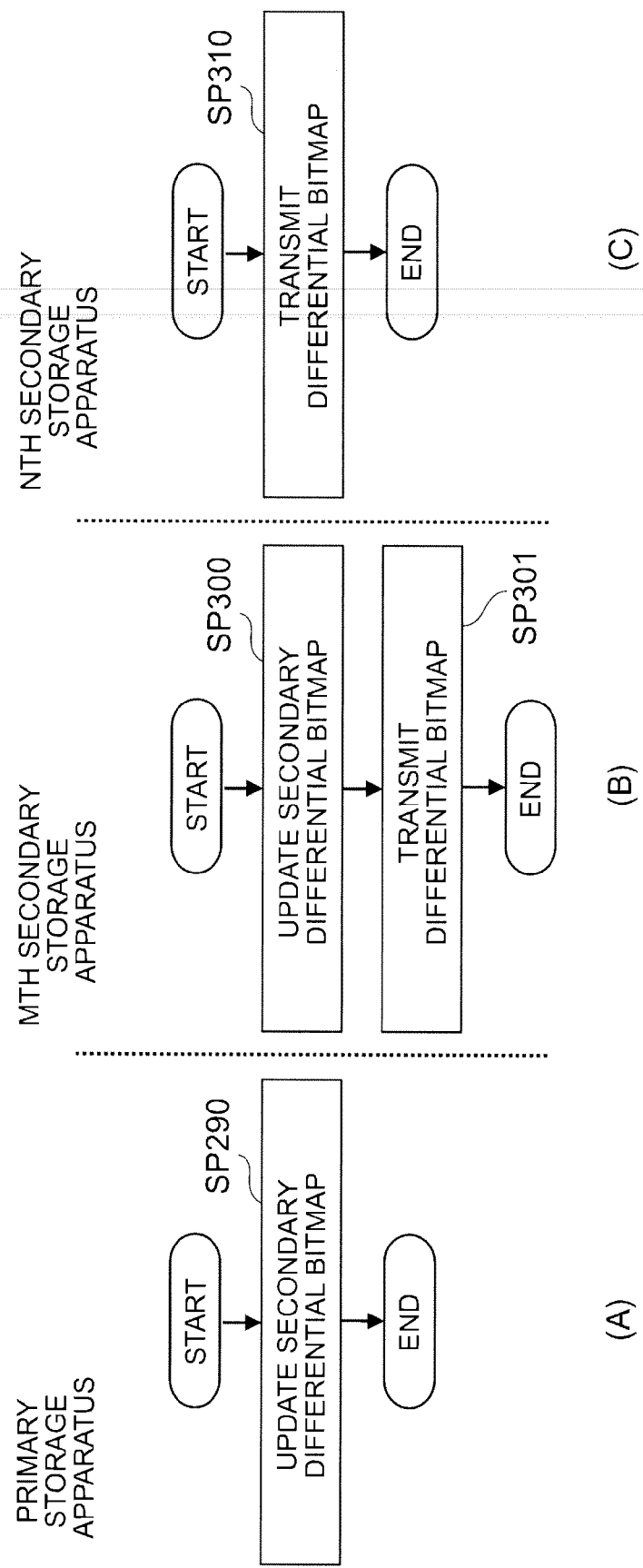
FIG. 40A is a flowchart showing a processing routine for primary differential bitmap update processing according to the fourth and fifth embodiments.
FIG. 40B is a flowchart showing a processing routine for first secondary differential bitmap transmission processing.
FIG. 40C is a flowchart showing a processing routine for second secondary differential bitmap transmission processing.

FIG. 40C shows second secondary differential bitmap transmission processing which is executed by the secondary processor unit 82B of the Nth secondary storage apparatus 81BN in a case where the Nth secondary storage apparatus 81BN transmits the differential bitmap 98 to the previous-stage secondary storage apparatus 81B, FIG. 40B shows first secondary differential bitmap transmission processing which is executed by the secondary processor unit 82B of the Mth secondary storage apparatus 81BM (M=1, 2, ..., N−1) in a case where the Mth secondary storage apparatus 81BM (M=1, 2, ..., N−1) transmits the differential bitmap 95, 98 at regular intervals to the previous-stage primary storage apparatus 81A and previous-stage secondary storage apparatus 81B, and FIG. 40A shows a processing routine for primary differential bitmap update processing which is executed by the primary processor unit 82A of the primary storage apparatus 81A at the time.

The secondary processor unit 82B of the Nth secondary storage apparatus 81BN starts the second secondary differential bitmap transmission processing shown in FIG. 40C at regular intervals and transmits the differential bitmap 98 which represents the current progress state of the corresponding flashcopy being executed in the Nth secondary storage apparatus 81BN to the previous-stage secondary storage apparatus 81B (SP310). The secondary processor unit 82B subsequently terminates the second secondary differential bitmap transmission processing.

Meanwhile, upon receiving this differential bitmap 95, 98 from the subsequent-stage secondary storage apparatus 81B, each secondary processor unit 82B of the Mth secondary storage apparatus 81BM (M=1, 2, ..., N−1) starts the first secondary differential bitmap transmission processing shown in FIG. 40B, copies the received differential bitmap 95, 98, and updates the corresponding secondary differential bitmap 95 (SP300). Furthermore, the secondary processor unit 82B of the Mth secondary storage apparatus 81BM (M=1, 2, ..., N−1) subsequently transmits the differential bitmap 95 which represents the current progress state of the corresponding flash copy being executed in the Mth secondary storage apparatus 81BM (M=1, 2, ..., N−1) to the primary storage apparatus 81A and the previous-stage secondary storage apparatus 81B, and the differential bitmap 95, 98 received from the subsequent-stage secondary storage apparatus (SP301). The secondary processor unit 82B subsequently terminates the first secondary differential bitmap transmission processing.

Meanwhile, upon receiving this differential bitmap 95, 98, the primary processor unit 82A of the primary storage apparatus 81A starts the primary differential bitmap update processing shown in FIG. 40A, copies the received differential bitmap 95, 98, and updates the corresponding secondary differential bitmap 92 (SP290). Furthermore, the primary processor unit 82A of the primary storage apparatus 81A subsequently terminates this differential bitmap update processing.

(4-3) Effects of the Embodiment

According to this embodiment as described above, even in cases where the second storage apparatus 81B exists in a plurality, because the required on-demand copy is performed in parallel in the plurality of secondary storage apparatuses 3B and the primary storage apparatus 3A, the time required for the series of processes can be shortened. Accordingly, a computer system which enables improvements in the response performance of the storage apparatus to the write request from the host apparatus 2 can be implemented.

(5) Fifth Embodiment
(5-1) Configuration of Computer system according to Fifth Embodiment In FIG. 23, 100 refers to the whole computer system according to a fifth embodiment. The computer system 100 is configured similarly to the computer system 80 according to the fourth embodiment except for the fact that, in cases where the write request issued by the host apparatus 101 is a sequential write request, the corresponding on-demand-copy advance notification 70 (FIG. 17) is supplied from a primary storage apparatus 102A to a first secondary storage apparatus 102B1, that the on-demand-copy advance notification 70 is sequentially transferred from the first secondary storage apparatus 102B1 to each of the subsequent-stage secondary storage apparatuses 102B, and that the secondary storage apparatuses 102B each execute on-demand copy processing in a plurality of track units based on this on-demand copy processing 70.

Note that, in the following description, the same LUN as the primary volume in the primary storage apparatus 102A is assigned to the primary volumes in each of the secondary storage apparatuses 102B which are configured directly or indirectly as copy pairs to the primary volume in the primary storage apparatus 102A. Furthermore, in a remote copy between the primary storage apparatus 102A and a secondary storage apparatus 102B or between secondary storage apparatuses 102B, the data which is stored in the logical track in the copy-source primary volume is described as being copied to the logical track with the same track number as the track number of the logical track in the copy-destination primary volume (the logical track in the copy-source primary volume).

In addition, in the following description, among the secondary storage apparatuses 102B installed respectively in each of the remote sites RS, the secondary storage apparatus 102B which is cascade-connected in the M (M=1, 2, . . . , N)th position to the primary storage apparatus 102A is sometimes called the 'Mth secondary storage apparatus 102BM' and the local site RS in which the Mth secondary storage apparatus 102BM is installed may be called the Mth local site RSM.

In this computer system 100, similarly to the third embodiment, if a sequential write request is transmitted to the primary storage apparatus 102A, the host apparatus 101 embeds a code which indicates that the write request is a sequential write request in the sequential code embed position of the write request.

If, while a flashcopy is being executed in the primary storage apparatus 102A and each of the secondary storage apparatuses 102B, a write request in which the data write destination is a logical track in the target range of the flashcopy is supplied from the host apparatus 101, the primary storage apparatus 102A refers to the write request sequential code embed position and determines whether or not the write request is a sequential write request.

Furthermore, upon obtaining an affirmative result in this determination, the primary storage apparatus 102A refers to each of the differential bitmaps representing the progress states of corresponding flashcopies being executed in each of the secondary storage apparatuses 102B and stored in the shared memory 13A, and thus determines whether or not, among the plurality of secondary storage apparatuses 102B, a secondary storage apparatus 102B for which the flashcopies of all five consecutive logical tracks, the first of which is the logical track specified by the LUN and track number designated in the write request, are not complete. Further, upon obtaining an affirmative result in this determination, the primary storage apparatus 102A transmits the on-demand-copy advance notification 70 described earlier in FIG. 17 to the first secondary storage apparatus 102B1. Here, the primary storage apparatus 102A configures the sequential information of the on-demand-copy advance notification 70 as '1'.

In addition, the primary storage apparatus 102A refers to the corresponding differential bitmap used for its own storage apparatus which is connected to the shared memory 13A and thus determines whether or not the flashcopy to the logical track in the primary storage apparatus 102A which is specified by the LUN and track number designated in the write request of the primary storage apparatus 102A is complete. Further, upon obtaining a negative result in this determination, the primary storage apparatus 102A on-demand-copies the data stored in the logical track to the corresponding secondary volume. Furthermore, the primary storage apparatus 102A subsequently transfers the write request and write target data of the subsequent-stage secondary storage apparatus 102B (the first secondary storage apparatus 102B1).

Upon receiving the on-demand-copy advance notification 70, the first secondary storage apparatus 102B1 first refers to the sequential information stored in the on-demand-copy advance notification 70 and determines whether or not the write request transmitted to the primary storage apparatus 102A from the host apparatus 101 is a sequential write request.

Further, upon obtaining affirmative result in this determination, the first secondary storage apparatus 102B1 refers to each differential bitmap which represents the progress states of the corresponding flash copies being executed in each of the subsequent-stage secondary storage apparatuses 102B and which is stored in the shared memory 13A and thus determines whether or not there is a secondary storage apparatus 102B for which a flashcopy has not been completed for all five consecutive logical tracks the first of which is the logical track in the first secondary storage apparatus 102B1 specified by the LUN and track number which are designated in the on-demand-copy advance notification 70. Furthermore, upon obtaining an affirmative result in this determination, the first secondary storage apparatus 102B 1 transfers the on-demand copy advance notification 70 to the second secondary storage apparatus 102B2.

Thereafter, the first secondary storage apparatus 102B1 refers to the corresponding differential bitmaps which are stored in the shared memory 13A, and thus executes an on-demand copy for logical tracks for which flashcopy processing is incomplete among the logical tracks in the first secondary storage apparatus 102B1 specified by the LUN and track number designated in the on-demand copy advance notification 70, is incomplete. Furthermore, upon obtaining an affirmative result in this determination, the first secondary storage apparatus 102B1 transfers the on-demand-copy advance notification 70 to the second secondary storage apparatus 102B2.

In addition, upon receiving the write request and write target data transferred from the primary storage apparatus 102A, the first secondary storage apparatus 102B1 subsequently writes the write target data to the logical track in the first secondary storage apparatus 102B1 which is specified by the LUN and track number designated in the write request, and transfers the write request and write target data to the subsequent-stage secondary storage apparatus 102B (the second secondary storage apparatus 102B2).

Furthermore, except for the second secondary storage apparatus 102B2 and the final-stage secondary storage apparatus 102B (the Nth secondary storage apparatus 102BN), the other secondary storage apparatuses 102B each also execute the same processing as the first secondary storage apparatuses 102B1. If, as a result of this processing, a write request, in which the data write destination is the logical track in the target range of the flashcopies executed in the primary storage apparatus 102A and each of the secondary storage apparatuses 102B, is supplied to the primary storage apparatus 102A from the host apparatus 101, an on-demand copy is executed of data stored in the five consecutive logical tracks in all secondary storage apparatuses 102B for which the flashcopy, to all five consecutive logical tracks the first of which is the logical track specified by the LUN and track number designated in the write request, is incomplete.

As means for implementing the data backup method according to this embodiment hereinabove, the shared memory 13A of the primary storage apparatus 102A stores a sequential instruction table 110, shown in FIG. 33A, a volume information table 111, shown in FIG. 33B, an information table 112, shown in FIG. 33C, and a plurality of differential bitmaps 113, shown in FIG. 33D.

The sequential instruction table 110 is a table which, if write requests in which the foregoing consecutive logical tracks are designated respectively as the data write destination are supplied in sequence by the host apparatus 101, is used to transmit the on-demand-copy advance notification 70 in which the sequential information is configured as '1' in a ratio of one out of five of these write requests to the subsequent-stage secondary storage apparatus 81B and, as shown in FIG. 33A, is configured from a volume number field 71A, a write track number field 110B, and a final value field 110C.

Furthermore, the volume number field 110A stores the LUN of the primary volume which is designated as the data write destination in the on-demand-copy advance notification 70 when an on-demand-copy advance notification 70 in which the sequential information is configured as '1' is transmitted to the subsequent-stage secondary storage apparatus 81B. Furthermore, the write track number field 110B stores the track number of a logical track designated as the data write destination in the on-demand-copy advance notification 70, and the final value field 110C stores the track number (put simply, a value obtained by adding four to a numerical value stored in the write track field) of the last logical track among the five consecutive logical tracks which undergo on-demand copying in the secondary storage apparatus 81B as a result of the on-demand-copy advance notification 70 being supplied to the secondary storage apparatus 81B.

The volume information table 111, the pair information table 112, and the differential bitmaps 113 have the same configuration as the corresponding volume information table 90, pair information table 91, or differential bitmap 92 according to the fourth embodiment described earlier in FIG. 25 and hence a detailed description thereof is not included.

Figure 34:
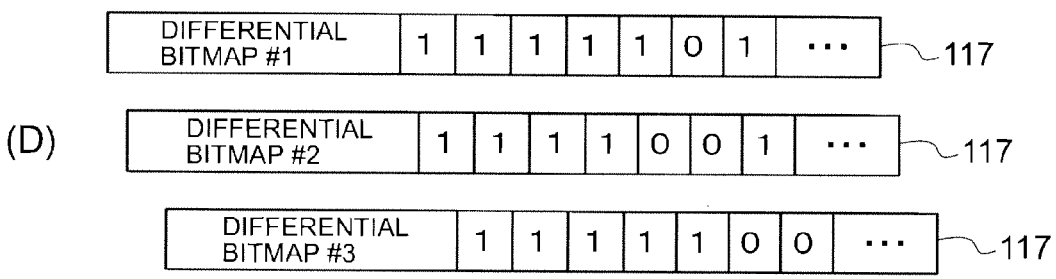
FIG. 34A is a conceptual view of the configuration of a sequential instruction table held by a secondary storage apparatus other than the final cascade-connection stage according to the fifth embodiment.
FIG. 34B is a conceptual view of the configuration of the volume information table held by the secondary storage apparatus.
FIG. 34C is a conceptual view of the configuration of the pair information table held by the secondary storage apparatus.
FIG. 34D is a conceptual view of the configuration of the differential bitmap held by the secondary storage apparatus.

Meanwhile, except for the secondary storage apparatus 102B in the final cascade-connection stage, the shared memory 13B of each of the secondary storage apparatuses 102B stores the sequential instruction table 114, shown in FIG. 34A, the volume information table 115, shown in FIG. 34B, the pair information table 116, shown in FIG. 27C, and the plurality of differential bitmaps 117 shown in FIG. 34D. Note that FIG. 34 shows an example of the configuration of the sequential instruction table 114, the volume information table 115, the pair information table 116, and the differential bitmap 117 which are held by the secondary storage apparatus 102B (the Mth secondary storage apparatus 102BM) which is cascade-connected in the M (M=1, 2, . . . , N-1)th position to the primary storage apparatus 81A.

The sequential instruction table 114, volume information table 115, pair information table 116, and differential bitmap 117 are the same as the sequential instruction table 110, volume information table 111, pair information table 112, and the differential bitmap 113 described earlier in FIG. 33, and hence a detailed description thereof is not included.

Figure 35:
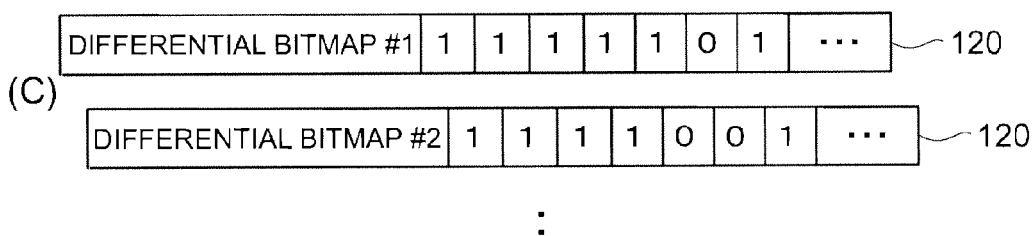
FIG. 35A is a conceptual view of the configuration of a sequential instruction table held by a secondary storage apparatus in the final cascade-connection stage according to the fifth embodiment.
FIG. 35B is a conceptual view of the configuration of the volume information table held by the secondary storage apparatus.
FIG. 35C is a conceptual view of the configuration of the pair information table held by the secondary storage apparatus.

Meanwhile, the secondary storage apparatus 102B (Nth storage apparatus 102BN) in the final cascade-connection stage stores a volume information table 118, shown in FIG. 35A, a pair information table 119, shown in FIG. 35B, and a plurality of differential bitmaps 120 which are shown in FIG. 35C. The volume information table 118, pair information table 119, and differential bitmaps 120 are the same as the corresponding volume information table 41, pair information table 42, or differential bitmaps 43 according to the first embodiment described earlier in FIG. 8, and hence a detailed description thereof is not included.

Figure 36:
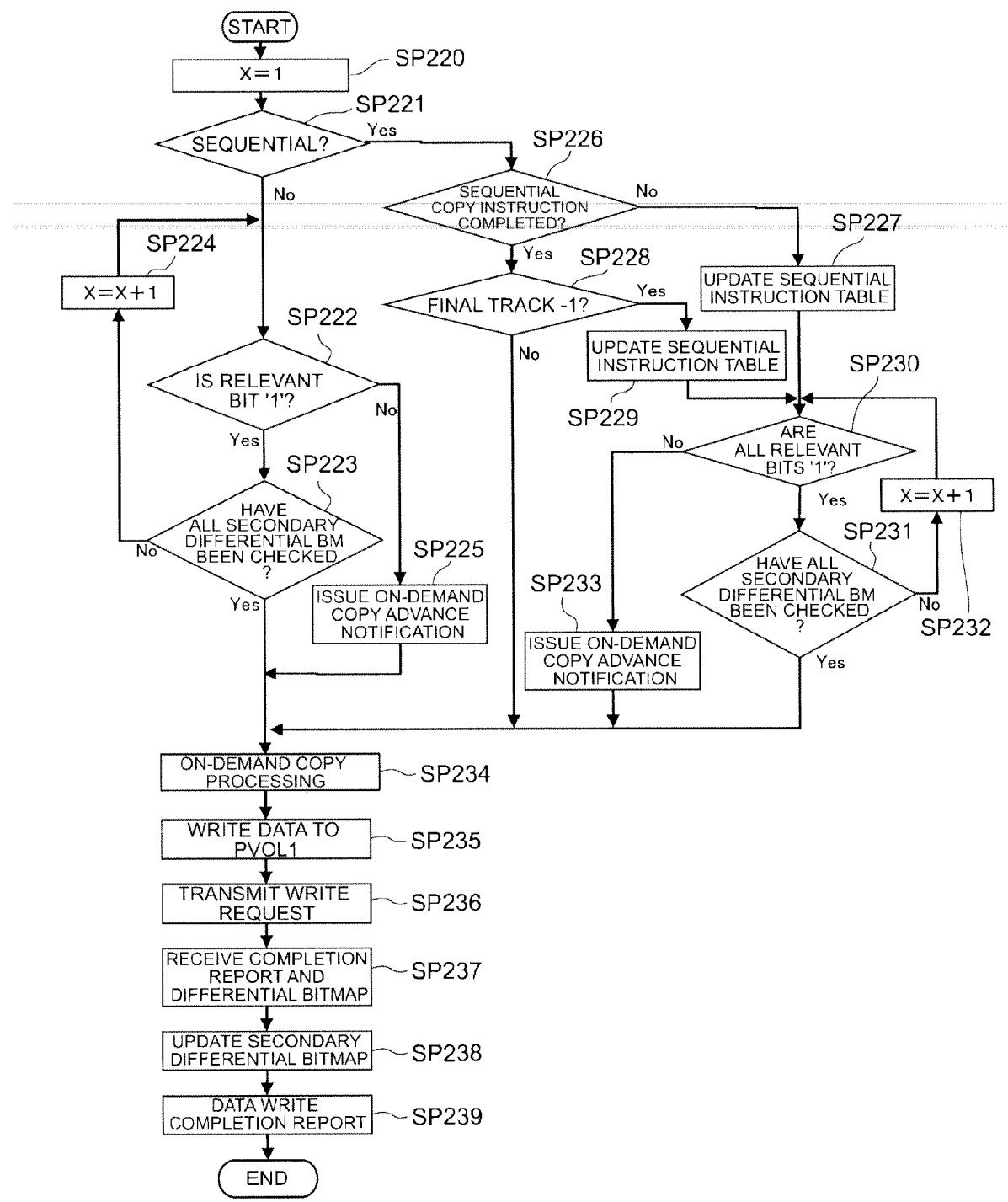
FIG. 36 is a flowchart showing a processing routine for primary backup copy processing according to the fifth embodiment.

(5-2) Backup Copy Processing According to this Embodiment (5-2-1) Primary Backup Copy Processing The processing routine for backup copy processing according to this embodiment will be described next. FIG. 36 shows a processing routine for primary backup copy processing which is executed by the primary processor unit 103A of the primary storage apparatus 102A if, while the flashcopy processing (FIG. 10) is being executed in the primary storage apparatus 102A and each of the secondary storage apparatuses 102B, a write request in which the data write destination is the logical track in the flash-copy target area is issued to the primary storage apparatus 102A by the host apparatus 101.

In this case, upon receiving a write request from this host apparatus 101, the primary processor unit 103A starts the primary backup copy processing and then initializes parameter x, which represents the secondary storage apparatus 102B being targeted, at '1' (SP220). Therefore, if x is '1', for example, the secondary storage apparatus 102B being targeted is the first secondary storage apparatus 102B1 and, if x is '2', the secondary storage apparatus 102B which is then the target is the second secondary storage apparatus 102B2.

Subsequently, the primary processor unit 103A refers to the sequential code embed position in the write request and determines whether or not the write request is a sequential write request (SP221).

Furthermore, upon obtaining a negative result in this determination, the primary processor unit 103A advances to step SP222 and subsequently processes steps SP222 to SP225 in the same way as steps SP161 to SP164 of the primary backup copy processing according to the fourth embodiment described earlier in FIG. 28. Accordingly, when, among all the secondary storage apparatuses 102B which are cascade-connected to the primary storage apparatus 102A, there is even one secondary storage apparatus 102B for which a flash-copy to the logical track corresponding to the logical track in the primary storage apparatus 102A which is specified by the LUN and track number designated in the write request received by the primary storage apparatus 102A at the time is incomplete, the primary processor unit 103A transmits the on-demand-copy advance notification 70 and a write request to the subsequent-stage secondary storage apparatus 102B (first secondary storage apparatus 102B1) and, when there is no such secondary storage apparatus 102B, transmits only the write request to the subsequent-stage secondary storage apparatus 102B.

Furthermore, the primary processor unit 103A subsequently processes steps SP234 to SP239 in the same way as steps SP165 to SP170 of the primary backup copy processing according to the fourth embodiment described in FIG. 28. However, in this embodiment, the processing differs from the primary backup copy processing according to the fourth embodiment in that, in step SP237, the primary storage apparatus 102A receives all the differential bitmaps transmitted from all the secondary storage apparatuses 102B which are cascade-connected to the primary storage apparatus 102A and in that the primary storage apparatus 102A updates each of the corresponding differential bitmaps 113 (FIG. 33D) stored in the shared memory 13A based on the differential bitmap. As a result of the foregoing processing, the primary storage apparatus 102A executes an on-demand copy as necessary while writing write target data to the logical track in the primary storage apparatus 102A which is specified by the LUN and track number designated in the write request. The primary processor unit 103A then subsequently terminates the primary backup copy processing.

However, when an affirmative result is obtained in the determination of step SP221, the primary processor unit 103A advances to step SP226 and subsequently processes steps SP226 to SP229 in the same way as steps SP123 to SP126 of the primary backup copy processing according to the third embodiment described earlier in FIG. 20.

Furthermore, the primary processor unit 103A subsequently refers to the differential bitmap 113 (FIG. 3C) provided so as to correspond to the secondary storage apparatus 102B being targeted (the secondary storage apparatus 102B corresponding to the value of parameter x at this time), and thus determines whether or not, in the differential bitmap 113, the values of all the bits, which correspond respectively to the five logical tracks in each of the secondary storage apparatuses 102B determined as logical tracks which are to undergo execution of on-demand copy in steps SP227 or SP229, are '1' (SP230).

Upon obtaining an affirmative result in this determination, the primary processor unit 103A determines whether or not the processing of step SP230 has been executed for all the secondary storage apparatuses 102B in a subsequent stage to the secondary storage apparatus 102B being targeted (SP231). Upon obtaining a negative result in this determination, the primary processor unit 103A then increments parameter x (increases its value by one) (step SP232), returns to step SP230 and subsequently repeats the processing of steps SP230 to SP232.

As a result, in any of the secondary storage apparatuses 102B in a subsequent stage to the secondary storage apparatus 102B being targeted, if the flashcopy of any of the logical tracks among the five logical tracks determined as logical tracks which are to undergo execution of an on-demand copy in step SP227 or SP229 is incomplete, a negative result is obtained in step SP230.

Thus, at this point the primary processor unit 103A generates an on-demand-copy advance notification 70 (FIG. 17) according to the registered content that has been newly registered in the sequential instruction table 110 (FIG. 33A) in step SP227 or SP229 as per step SP128 in FIG. 20, and transmits the generated on-demand copy advance notification 70 to the subsequent-stage secondary storage apparatus 102B (SP233). Furthermore, the primary processor unit 103A advances to step SP234 and subsequently processes steps SP234 to SP239 as described earlier and terminates the primary backup copy processing.

However, in cases where, in all the secondary storage apparatuses 102B in a subsequent stage to the secondary storage apparatus 102B being targeted, the flashcopy to all the logical tracks among the five logical tracks determined as logical tracks which are to undergo execution of an on-demand copy in step SP227 or SP229 is complete, an affirmative result is obtained in step SP230. Thus, at this point, the primary processor unit 103A advances to step SP234 and then, after processing steps SP234 to SP239 as described earlier, terminates the primary backup copy processing.

Figure 37:
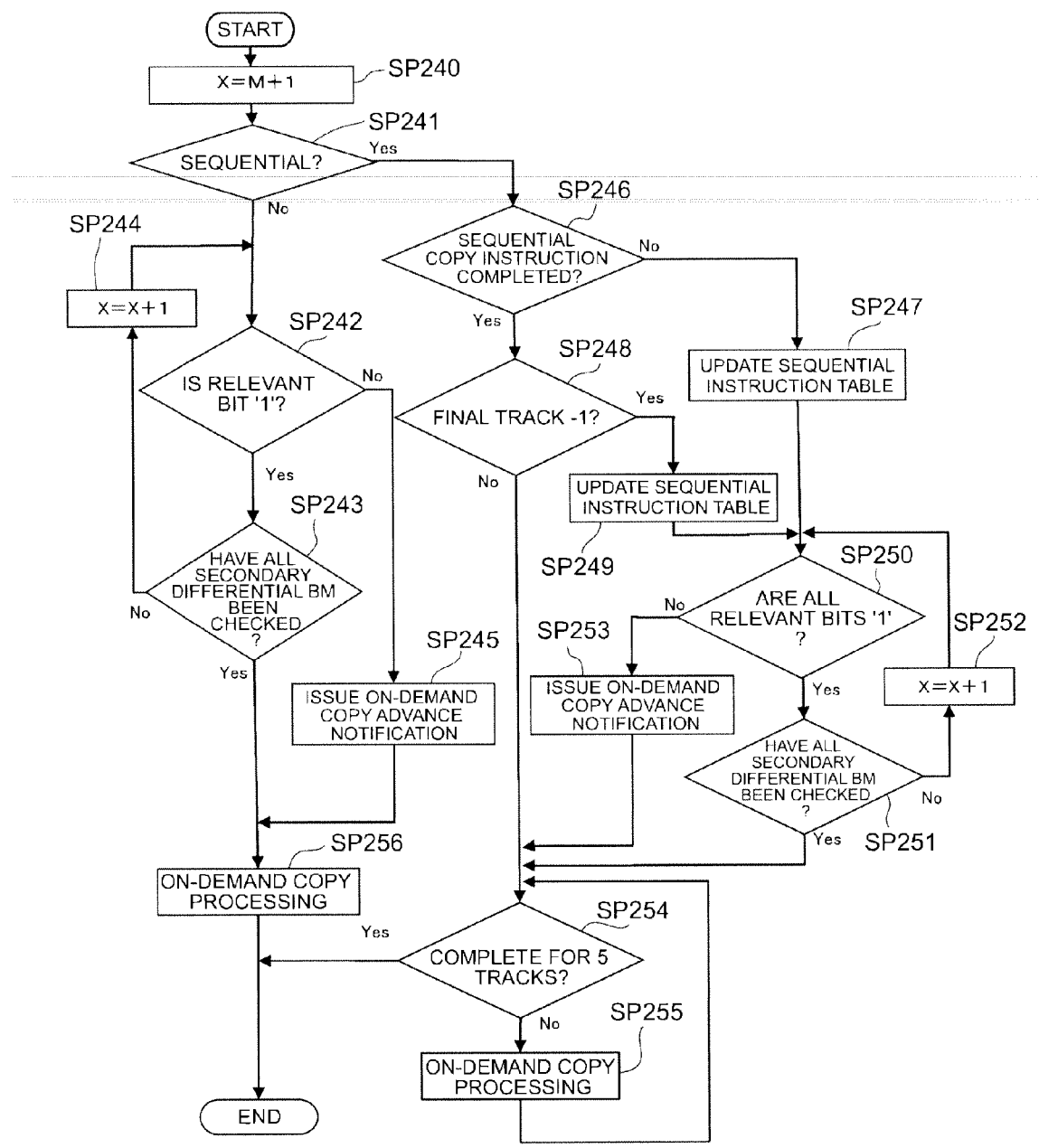
FIG. 37 is a flowchart showing a processing routine for first secondary on-demand copy processing advance notification reception processing according to the fifth embodiment.

(5-2-2) Secondary On-demand Copy Processing Advance Notification Reception Processing Meanwhile, FIG. 37 shows a processing routine for first secondary on-demand copy processing advance notification reception processing which is executed by the secondary processor unit 103B of the secondary storage apparatus 102B when the secondary storage apparatuses 102B, except for the secondary storage apparatus 102B in the final cascade-connection stage, receives the foregoing on-demand-copy advance notification 70 (FIG. 17) issued by the previous-stage primary storage apparatus 102A or secondary storage apparatus 102B. Note that, in the following description, the description is taken a step further in that the secondary processor unit 103B of the Mth storage apparatus 81BM (M=1, 2, . . . , N−1) executes the first secondary on-demand copy processing advance notification reception processing.

Upon receiving the on-demand-copy advance notification 70, the secondary processor 103B starts the first secondary on-demand copy processing advance notification reception processing and initializes parameter x, which represents the secondary storage apparatus 102B being targeted, at '1' (SP240). Note that, in subsequent processing, the secondary storage apparatus 102B being targeted is a secondary storage apparatus 102B in a subsequent stage to the Mth secondary storage apparatus 102B executing the first secondary on-demand copy processing advance notification reception processing. Therefore, if x is '1', for example, the secondary storage apparatus 102B being targeted is the (M+1)th secondary storage apparatus 102B (M+1) and, if x is '2', the secondary storage apparatus 102B which is then the target is the (M+2)th secondary storage apparatus 102B (M+2).

Thereafter, the secondary processor unit 103B refers to the sequential code embed position of the received on-demand-copy advance notification 70 to determine whether or not the on-demand-copy advance notification 70 is a sequential write request (SP241).

Furthermore, upon obtaining a negative result in this determination, the secondary processor unit 103B advances to step SP242 and subsequently processes steps SP242 to SP245 in the same way as steps SP222 to SP225 of the foregoing primary backup copy processing in FIG. 36. Accordingly, the secondary processor unit 103B transmits an on-demand-copy advance notification 70A and a write request to the subsequent-stage secondary storage apparatus 102B ((M+1)th secondary storage apparatus 102B (M+1)) when, among each of the secondary storage apparatuses 102B in a subsequent stage to the Mth secondary storage apparatus 102BM, there is even one secondary storage apparatus 102B for which the flash-copy to the logical track corresponding to the logical track in the Mth secondary storage apparatus 102BM which is specified by the LUN and track number designated in the write request received by the Mth secondary storage apparatus 102BM, is incomplete, and when there is no such secondary storage apparatus 102B, the secondary processor unit 103B transmits only the write request to the subsequent-stage secondary storage apparatus 102B.

Further, the secondary processor unit 103B subsequently writes write target data to the logical track in the Mth secondary storage apparatus 102B which is specified by the LUN and track number designated in the write request by executing the on-demand copy processing (SP256) described earlier in FIG. 12. The secondary processor unit 103B then terminates the first secondary on-demand copy processing advance notification reception processing.

However, upon obtaining an affirmative result in the determination of step SP241, the secondary processor unit 103B advances to step SP246 and subsequently processes the steps SP246 to SP253 in the same way as steps SP226 to SP233 in the primary backup copy processing described earlier in FIG. 33.

Furthermore, the secondary processor unit 103B ends the processing of step SP253 or, when an affirmative result is obtained in step SP251, advances to step SP254, refers to the on-demand-copy advance notification 70, the volume information table 115 described earlier in FIG. 34 which is stored in the shared memory 13B (FIG. 23), and the differential bitmap 117 which corresponds to the pair information table 116 and its own storage apparatus (the Mth secondary storage apparatus 102B) and thus determines whether or not, in the differential bitmap 117, the values of all the bits corresponding to each of the five consecutive logical tracks the first of which is the logical track in the Mth secondary storage apparatus 102BM which is specified by the LUN and track number designated in the on-demand-copy advance notification 70, are '1' (SP254).

Obtaining an affirmative result in the determination of step SP254 means that the flashcopy of the data stored in these five logical tracks has already been completed. Thus, at this point, the secondary storage apparatus 102B terminates the first secondary on-demand copy processing advance notification reception processing.

However, obtaining a negative result in the determination of step SP254 means that a flash copy to at least one logical track among the five logical tracks has not been completed. Accordingly, at this point, the secondary storage apparatus 102B refers to the differential bitmap 117 corresponding to the volume information table 115, the pair information table 116, and its own storage apparatus, selects one logical track for which the flashcopy is not complete among the five logical tracks and, after executing on-demand copy processing to copy (on-demand-copy) the data stored in the selected logical track to the corresponding secondary volume (SP255), returns to step SP254.

Further, the secondary storage apparatus 102B subsequently executes the same processing on each of the logical tracks for which a flashcopy has not been completed (SP254, then SP255, then SP254), and upon obtaining an affirmative result in step S254 as a result of the completion of the flashcopy or on-demand copy to these five logical tracks, terminates the first secondary on-demand copy processing advance notification reception processing.

Figure 38:
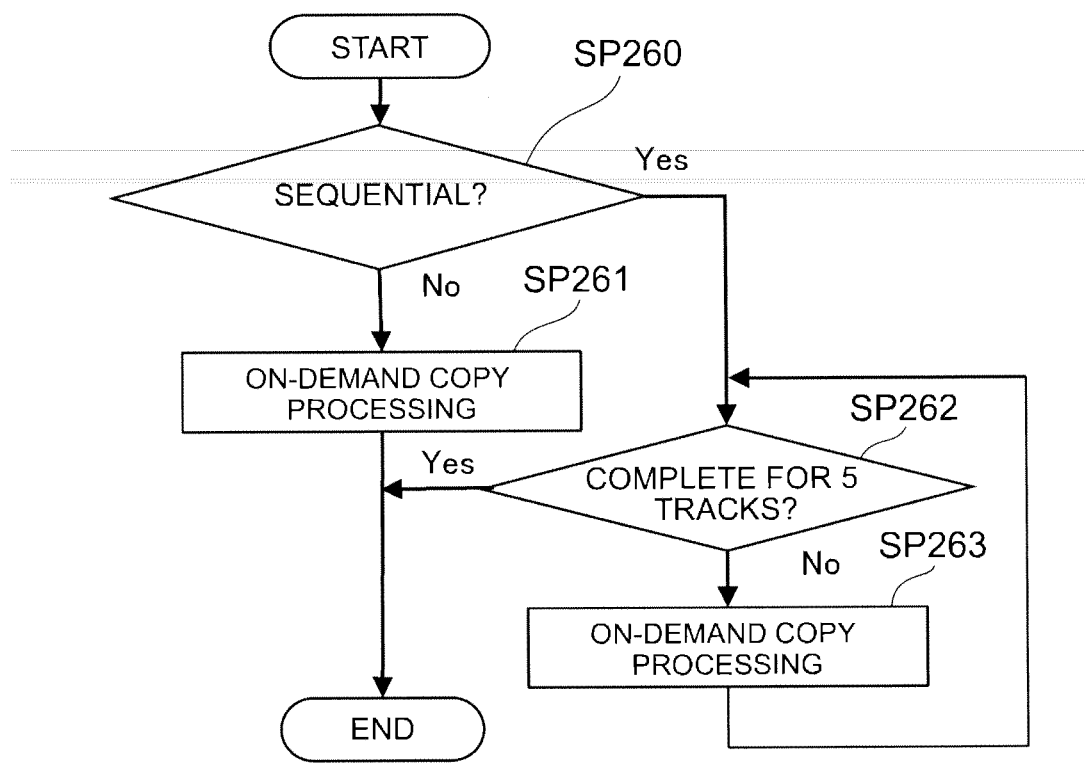
FIG. 38 is a flowchart showing a processing routine for a second secondary on-demand copy processing advance notification reception processing according to the fifth embodiment.

Meanwhile, FIG. 38 shows a processing routine for second secondary on-demand copy processing advance notification reception processing which is executed by the secondary processor unit 103B of the secondary storage apparatus 102B when the secondary storage apparatus 102B in the final cascade-connection stage (the Nth secondary storage apparatus 102BN) receives the foregoing on-demand-copy advance notification 70 (FIG. 17) which is issued by the previous-stage secondary storage apparatus 102B.

Upon receiving the on-demand-copy advance notification 70, the secondary processor unit 103B starts the second secondary on-demand copy processing advance notification reception processing and processes steps SP260 to SP263 in the same way as steps SP140 to SP143 of the secondary on-demand copy processing advance notification reception processing described earlier in FIG. 21. The secondary processor unit 103B then subsequently terminates the second secondary on-demand copy processing advance notification reception processing.

Note that, according to this embodiment, when each secondary storage apparatus 102B transmits a completion report to the effect that write processing according to the write request is complete to the previous-stage primary storage apparatus 102A or previous-stage secondary storage apparatus 102B as described earlier, the corresponding differential bitmap 117, 120 of the secondary storage apparatus 102B and the differential bitmap 117, 120 transferred from the subsequent-stage secondary storage apparatus 102B are transmitted together with the completion report to the primary storage apparatus 102A or the secondary storage apparatus 102B, but each secondary storage apparatus 102B may transmit the differential bitmap 117, 120 to the previous-stage primary storage apparatus 102A or previous-stage secondary storage apparatus 102B at regular intervals by executing the processing of the foregoing primary differential bitmap update processing (FIG. 40A), the first secondary differential bitmap transmission processing (FIG. 40B), and the second secondary differential bitmap transmission processing (FIG. 40C), for example.

(5-3) Effect of this Embodiment

With this embodiment as described hereinabove, even if the secondary storage apparatus 81 exists in a plurality, the time required for the series of processes can be shortened similarly to the fourth embodiment and, as per the third embodiment, it is possible to prevent transmission of unnecessary on-demand-copy advance notifications 70 from the primary storage apparatus 102A to the secondary storage apparatus 102B. Accordingly, it is possible to implement a computer system whereby the network 4 can be more effectively utilized while improving in the response performance of a storage apparatus to a write request from the host apparatus 2.

(6) Further Embodiments

Note that, although cases have been described in the foregoing first to third embodiments in which the LUN of the primary volumes in the primary storage apparatuses 3A, 51A, and 62A and the LUN of the primary volumes in the secondary storage apparatuses 3B, 51B, and 62B which are configured as remote-copy copy pairs to the primary volumes are configured as the same, and although cases have been described in the foregoing fourth and fifth embodiments in which, additionally, the LUN of the primary volumes in the primary storage apparatuses 81A, 102A and the LUN of the primary volumes in each of the secondary storage apparatuses 81B, 102B to which data stored in the primary volumes are directly or indirectly remote-copied are all configured as the same LUN, the present invention is not limited to these configurations and the LUN of the primary volumes may also differ.

However, in such a case, upon transmitting or transferring a write request or the on-demand-copy advance notification 40, 70 to the subsequent-stage secondary storage apparatus 3B, 51B, 62B, 81B, 102B, the primary storage apparatus 3A, 51A, 62A, 81A, 102A and the secondary storage apparatus 62B, 102B must configure the LUN and track number stored in the write request or on-demand-copy advance notification 40, 70 as the address of the corresponding logical track in the subsequent-stage secondary storage apparatuses 3B, 51B, 62B, 81B, 102B respectively (the LUN of the primary volume and the track numbers of the corresponding logical tracks in the primary volume).

Furthermore, in the foregoing third and fifth embodiments, cases were described in which, as the method for acquiring the differential bitmaps of each of the secondary storage apparatuses 62B, 102B, a method is applied in which the secondary storage apparatuses 62B, 102B each sequentially transmit the differential bitmaps of their own storage apparatuses and differential bitmaps transmitted from subsequent-stage secondary storage apparatuses 62B, 102B to the previous-stage secondary storage apparatus 62B, 102B; however, the present invention is not limited to this method and instead, for example, the primary storage apparatus 62A, 102A and each of the secondary storage apparatuses 62B, 102B may be connected via a communication line used for control other than data transfer such that the primary storage apparatus 62A, 102A are able to acquire differential bitmaps individually from each of the secondary storage apparatuses 62B, 102B via this communication line.

In addition, in the foregoing third and fifth embodiments, cases were described in which on-demand copies are executed in 5-track units in the secondary storage apparatuses 62B, 102B on the basis of the on-demand-copy advance notification 70 transmitted from the primary storage apparatus 62A, 102A, but the present invention is not limited to this execution and the secondary storage apparatuses 62B, 102B may also execute an on-demand copy in units of a plurality of tracks other than 5-track units on the basis of the on-demand-copy advance notification 70.

INDUSTRIAL APPLICABILITY

The present invention can be widely applied to a computer system in which a data backup function obtained by combining a flash copy function and a remote copy function is installed.

REFERENCE SIGNS LIST 1, 50, 60, 80, 100 Computer system
2, 61, 101 Host apparatus
3A, 51A, 62A, 81A, 102A Primary storage apparatus
3B, 51B, 62B, 81B, 102B Secondary storage apparatus
10AA Physical disk
10A Physical disk unit
13A, 13B, 13BN Shared memory
16A, 52A, 63A, 82A, 103A Primary processor unit
16B, 52B, 63B, 82B, 103B Secondary processor unit
40, 70 On-demand copy advance notification
41, 53, 56, 72, 75, 90, 93, 96, 111, 115, 118 Volume information table
42, 54, 57, 73, 76, 91, 94, 97, 112, 116, 119 Pair information table
43, 55, 58, 74, 77, 92, 95, 98, 113, 117, 120 Differential bitmap
71, 110, 114 Sequential instruction table

The invention claimed is:

1. A computer system, comprising:
a primary storage apparatus including a first primary volume to and from which a host apparatus reads and writes data and a first secondary volume configured as a copy pair to the first primary volume; and
a secondary storage apparatus including a second primary volume configured as a remote-copy pair to the first primary volume and a second secondary volume which is configured as a copy pair to the second primary volume, and wherein the primary storage apparatus,
upon receiving a first copy instruction designating a first copy target area in the first primary volume from the host apparatus, is configured to copy data in the first copy target area to the first secondary volume as a first intra-enclosure copy processing and to transmit a second copy instruction designating a second copy target area, which is related to the first copy target area, in the second primary volume;
the secondary storage apparatus,
upon receiving the second copy instruction from the primary storage apparatus, is configured to copy data in the second copy target area to the second secondary volume as a second intra-enclosure copy processing;
the primary storage apparatus,
during the first intra-enclosure copy processing, upon receiving a first write request with write target data from the host apparatus designating a first storage area included in the first copy target area in the first primary volume, is configured to transmit an advance notification designating a second storage area, which is related to the first storage area, in the second primary volume to the secondary storage apparatus before copying data stored in the first storage area to the first secondary volume; and
to copy the data stored in the first storage area to the first secondary volume;
the secondary storage apparatus,
upon receiving the advance notification from the primary storage apparatus, when data stored in the second storage area designated by the advance notification in the second primary volume have not been copied to the second secondary volume, is configured to copy the data stored in the second storage area to the second secondary volume while the primary storage apparatus copies the data stored in the first storage area to the first secondary volume;
the primary storage apparatus,
after copying the data stored in the first storage area to the first secondary volume, is configured to write the write target data to the first storage area in the first primary volume designated in the first write request, and to transmit the write target data and a second write request designating the second storage area in the second primary volume corresponding to the first storage area to the secondary storage apparatus; and
the secondary storage apparatus,
upon receiving the second write request from the primary storage apparatus, is configured to write the write target data to the second storage area designated in the second write request in the second primary volume.

2. The computer system according to claim 1,
wherein the primary storage apparatus is configured to:
acquire progress state information representing a progress state of the second intra-enclosure copy processing from the secondary storage apparatus, and determine, based on the acquired progress state information, whether or not the second intra-enclosure copy processing to the second storage area in the secondary storage apparatus corresponding to the first storage area designated in the first write request from the host apparatus is complete; and
when the second intra-enclosure copy processing is complete, not transmit the advance notification to the secondary storage apparatus.

3. The computer system according to claim 2,
wherein the first write request issued by the host apparatus includes first sequential information which indicates whether or not the first write request is a sequential write request, and
the primary storage apparatus is configured to:
store second sequential information indicating whether or not the first write request is a sequential write request in the advance notification, based on the first sequential information contained in the first write request, and
the secondary storage apparatus,
upon determining that the first write request issued by the host apparatus is a sequential write request on the basis of the second sequential information stored in the advance notification,
is configured to copy data, stored in each of a plurality of consecutive storage areas, the first of which is the second storage area in the second primary volume designated in the advance notification, to the second secondary volume.

4. The computer system according to claim 2, comprising:
a plurality of the secondary storage apparatuses,
wherein the primary storage apparatus and the plurality of secondary storage apparatuses are logically connected using a cascade-connection format with the primary storage apparatus in first position,
wherein the primary storage apparatus and each of the secondary storage apparatuses are configured to:
transmit the progress state information from all of the secondary storage apparatuses located in a subsequent cascade-connection stage to their own storage apparatus, and
upon receiving the first write request from the host apparatus or from the primary storage apparatus or a secondary storage apparatus from a previous stage, transmit the corresponding advance notification to the subsequent-stage secondary storage apparatuses when, based on the progress state information of each of the secondary storage apparatuses located in a subsequent cascade-connection stage, the second intra-enclosure copy processing to the second storage area corresponding to the first storage area in the second primary volume designated as the first storage area in the first write request is not complete in at least one secondary storage apparatus located in a subsequent cascade-connection stage.

5. The computer system according to claim 4,
wherein the first write request issued by the host apparatus includes first sequential information indicating whether or not the first write request is a sequential write request,
wherein the primary storage apparatus is configured to:
store second sequential information, indicating whether or not the first write request is a sequential write request in the advance notification based on the first sequential information included in the first write request, and
wherein each of the secondary storage apparatuses is configured to:
copy, to the second secondary volume, data stored in each of a plurality of consecutive storage areas, the first of which is the second storage area in the second primary volume designated in the advance notification upon determining, based on the second sequential information stored in the advance notification transmitted by the previous-primary storage apparatus or the secondary storage apparatus in the previous stage, that the first write request issued by the host apparatus is a sequential write request.

6. A data backup method of a computer system, which comprises a primary storage apparatus and a secondary storage apparatus,
wherein the primary storage apparatus comprises a first primary volume to and from which a host apparatus reads and writes data and a first secondary volume configured as a copy pair to the first primary volume, and
wherein the secondary storage apparatus comprises a second primary volume configured as a remote-copy copy pair to the first primary volume and a second secondary volume which is configured as a copy pair to the second primary volume,
the data backup method comprising:
upon receiving a first copy instruction designating a first copy target area in the first primary volume from the host apparatus, using the primary storage apparatus to copy data in the first copy target area to the first secondary volume as a first intra-enclosure copy processing and to transmit a second copy instruction designating a second copy target area, which is related to the first copy target area, in the second primary volume;
upon receiving the second copy instruction from the primary storage apparatus, using the secondary storage apparatus to copy data in the second copy target area to the second secondary volume as a second intra-enclosure copy processing;
during the first intra-enclosure copy processing, upon receiving a first write request with write target data from the host apparatus designating a first storage area included in the first copy target area in the first primary volume, using the primary storage apparatus to transmit an advance notification designating a second storage area, which is related to the first storage area, in the second primary volume to the secondary storage apparatus before copying data stored in the first storage area to the first secondary volume; and
to copy the data stored in the first storage area to the first secondary volume;
upon receiving the advance notification from the primary storage apparatus, when data stored in the second storage area designated by the advance notification in the second primary volume have not been copied to the second secondary volume, using the secondary storage apparatus to copy the data stored in the second storage area to the second secondary volume while the primary storage apparatus copies the data stored in the first storage area to the first secondary volume;
after copying the data stored in the first storage area to the first secondary volume, using the primary storage apparatus to write the write target data to the first storage area in the first primary volume designated in the first write request, and to transmit the write target data and a second write request designating the second storage area in the second primary volume corresponding to the first storage area to the secondary storage apparatus; and
upon receiving the second write request from the primary storage apparatus, using the secondary storage apparatus to write the write target data to the second storage area designated in the second write request in the second primary volume.

7. The data backup method according to claim 6, further comprising using the primary storage apparatus to:
acquire progress state information representing a progress state of the second intra-enclosure copy processing from the secondary storage apparatus and determine, based on the acquired progress state information, whether or not the second intra-enclosure copy processing to the second storage area in the secondary storage apparatus corresponding to the first storage area designated in the first write request from the host apparatus is complete; and when the second intra-enclosure copy processing is complete, not transmit the advance notification to the secondary storage apparatus.

8. The data backup method according to claim 7,
wherein the first write request issued by the host apparatus includes first sequential information which indicates whether or not the first write request is a sequential write request; and wherein the method further comprises:

using the primary storage apparatus to store second sequential information indicating whether or not the first write request is a sequential write request in the advance notification based on the first sequential information contained in the first write request; and upon determining that the first write request issued by the host apparatus is a sequential write request on the basis of the second sequential information stored in the advance notification, using the secondary storage apparatus to copy data, stored in each of a plurality of consecutive storage areas, the first of which is the second storage area in the second primary volume designated in the advance notification, to the second secondary volume.

9. The data backup method according to claim 7,
wherein the computer system comprises a plurality of the secondary storage apparatuses,
wherein the primary storage apparatus and the plurality of secondary storage apparatuses are logically connected using a cascade-connection format with the primary storage apparatus in first position, and wherein the method further comprises:

using the primary storage apparatus and each of the secondary storage apparatuses to
transmit the progress state information from all of the secondary storage apparatuses located in a subsequent cascade-connection stage to their own storage apparatus; and upon receiving the first write request from the host apparatus or from the primary storage apparatus or a secondary storage apparatus from a previous stage, using the primary storage apparatus to transmit the corresponding advance notification to the subsequent-stage secondary storage apparatuses, when, based on the progress state information of each of the secondary storage apparatuses located in a subsequent cascade-connection stage, the second intra-enclosure copy processing to the second storage area corresponding to the first storage area in the second primary volume designated as the first storage area in the first write request is not complete in at least one secondary storage apparatus located in a subsequent cascade-connection stage.

10. The data backup method according to claim 9,
wherein the first write request issued by the host apparatus includes first sequential information indicating whether or not the first write request is a sequential write request, and wherein the method further comprises:

using the primary storage apparatus to store second sequential information, indicating whether or not the first write request is a sequential write request, in the advance notification based on the first sequential information included in the first write request, and using the each of the secondary storage apparatuses to copy, to the second secondary volume, data stored in each of a plurality of consecutive storage areas the first of which is the second storage area in the second primary volume designated in the advance notification upon determining, based on the second sequential information stored in the advance notification transmitted by the primary storage apparatus or the secondary storage apparatus in the previous stage, that the first write request issued by the host apparatus is a sequential write request.

\* \* \* \* \*